United States Patent [19]

Watanabe et al.

[11] Patent Number: 5,758,201
[45] Date of Patent: May 26, 1998

[54] CAMERA HAVING LINE OF SIGHT DETECTING DEVICE

[75] Inventors: Toshimi Watanabe, Machida; Isao Kishikawa, Saitama-ken; Yosuke Kusaka, Yokohama; Shigemasa Sato, Chiba; Masao Owashi, Kawasaki; Kenji Tazaki, Funabashi; Fumio Suzuki, Yokohama; Hiroyuki Iwasaki, Kawasaki; Tsutomu Narisawa, Saitama-ken, all of Japan

[73] Assignee: Nikon Corporation, Tokyo, Japan

[21] Appl. No.: 598,141

[22] Filed: Feb. 7, 1996

Related U.S. Application Data

[63] Continuation of Ser. No. 337,513, Nov. 8, 1994, abandoned, which is a continuation of Ser. No. 246,557, May 19, 1994, abandoned, which is a continuation of Ser. No. 40,389, Mar. 30, 1993, abandoned, which is a continuation of Ser. No. 903,346, Jun. 24, 1992, abandoned.

[30] Foreign Application Priority Data

| Jun. 28, 1991 | [JP] | Japan | 3-183694 |
| Oct. 4, 1991 | [JP] | Japan | 3-283946 |
| Oct. 4, 1991 | [JP] | Japan | 3-283947 |
| Oct. 4, 1991 | [JP] | Japan | 3-283948 |
| Oct. 4, 1991 | [JP] | Japan | 3-283949 |
| Oct. 4, 1991 | [JP] | Japan | 3-283950 |
| Oct. 15, 1991 | [JP] | Japan | 3-266225 |
| Dec. 20, 1991 | [JP] | Japan | 3-355178 |

[51] Int. Cl.[6] ............................................. G03B 17/00
[52] U.S. Cl. ............................................................ 396/51
[58] Field of Search .................................................. 396/51

[56] References Cited

U.S. PATENT DOCUMENTS

| 4,464,037 | 8/1984 | Terui et al. | 354/400 |
| 4,574,314 | 3/1986 | Weinblatt | 354/400 X |
| 5,036,347 | 7/1991 | Tsunekawa et al. | 354/400 |
| 5,055,933 | 10/1991 | Hidaka | 354/400 X |
| 5,122,827 | 6/1992 | Saegusa et al. | 354/219 X |
| 5,138,354 | 8/1992 | Okada et al. | 354/400 |
| 5,144,355 | 9/1992 | Hamada et al. | 354/400 |
| 5,182,443 | 1/1993 | Suda et al. | 354/219 X |
| 5,200,774 | 4/1993 | Nakajima | 354/62 |
| 5,204,749 | 4/1993 | Toyama et al. | 354/402 X |
| 5,210,566 | 5/1993 | Nishida | 354/402 |
| 5,214,466 | 5/1993 | Nagano et al. | 354/62 X |
| 5,225,862 | 7/1993 | Nagano et al. | 354/62 |
| 5,461,453 | 10/1995 | Watanabe et al. | 396/51 |
| 5,515,130 | 5/1996 | Tsukahara et al. | 396/51 |
| 5,546,158 | 8/1996 | Konishi et al. | 396/51 |
| 5,623,703 | 4/1997 | Takagi et al. | 396/51 |

FOREIGN PATENT DOCUMENTS

| 1-241511 | 9/1989 | Japan. |
| 2-5 | 1/1990 | Japan. |

*Primary Examiner*—Russell E. Adams
*Attorney, Agent, or Firm*—Shapiro and Shapiro

[57] ABSTRACT

A camera having a line of sight detecting device, includes a line of sight detection portion for detecting the line of sight position of a photographer, a portion of selection of a line of sight mode for selecting one of a single mode for locking a line of sight position obtained when a plurality of previous detection results of the line of sight detection portion satisfy a predetermined eye-gazing condition and a continuous mode for renewing the line of sight position on the basis of the latest line of sight position from the line of sight detection portion, a control mode setting portion for selecting a control mode for setting a camera phototaking condition, and a phototaking control for setting the camera phototaking condition in accordance with the line of sight position of the photographer when the control mode is selected, wherein when the control mode is selected by the control mode setting portion, the continuous mode is selected by the portion of selection of a line of sight mode, and the camera phototaking condition is set by the phototaking control in accordance with the line of sight position in the continuous mode.

65 Claims, 56 Drawing Sheets

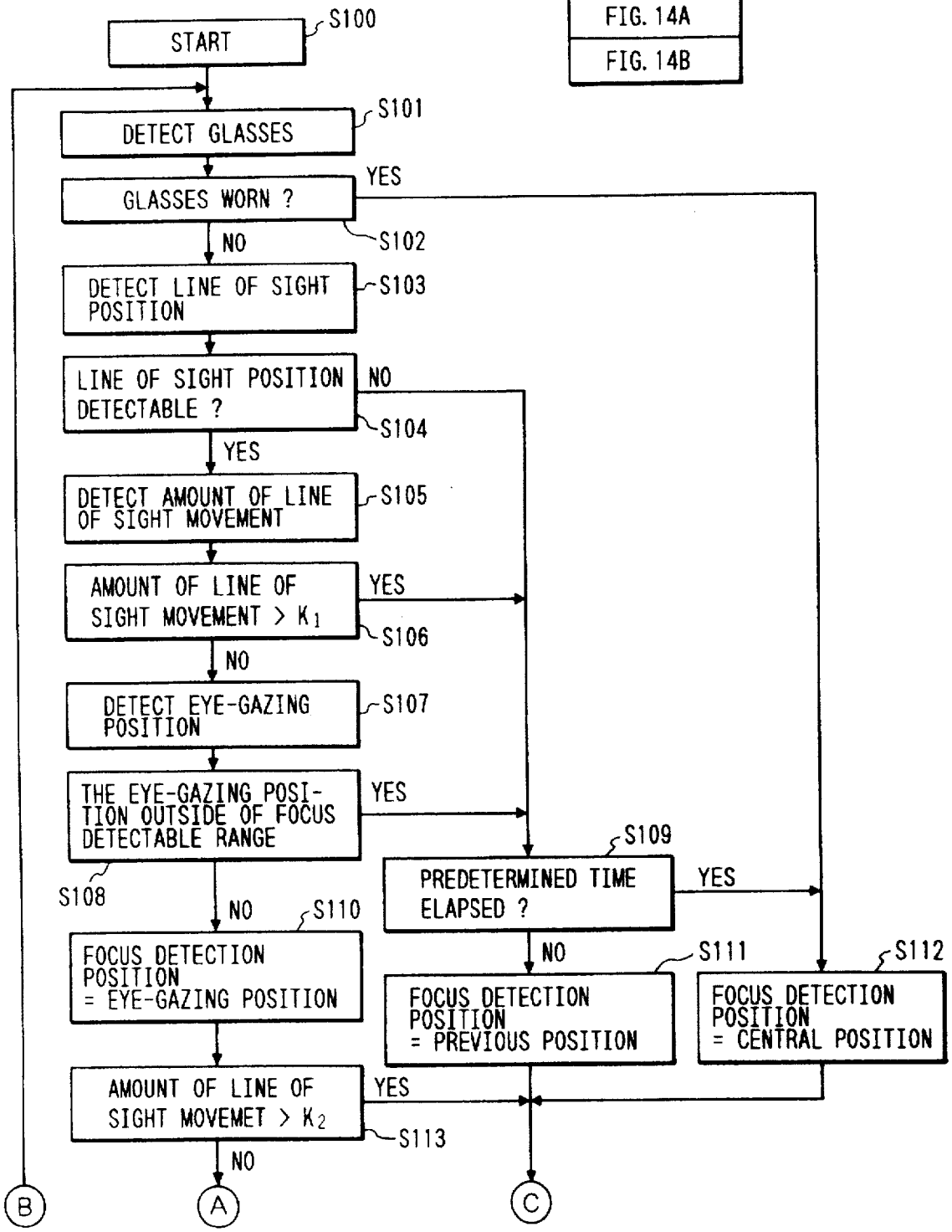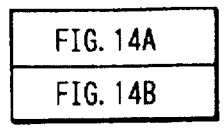

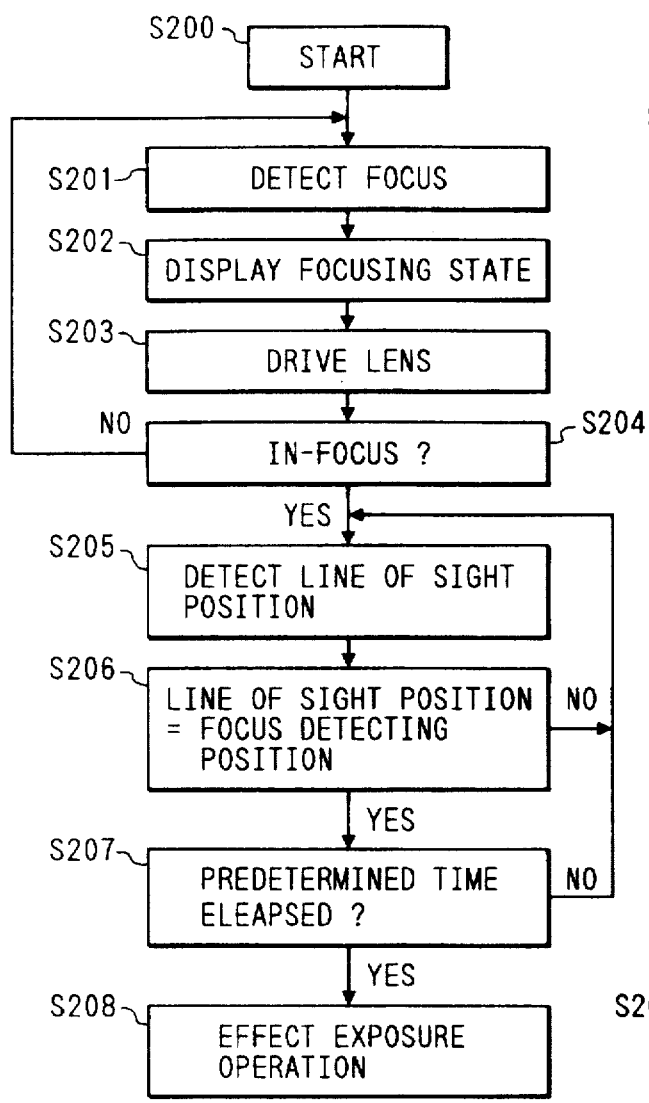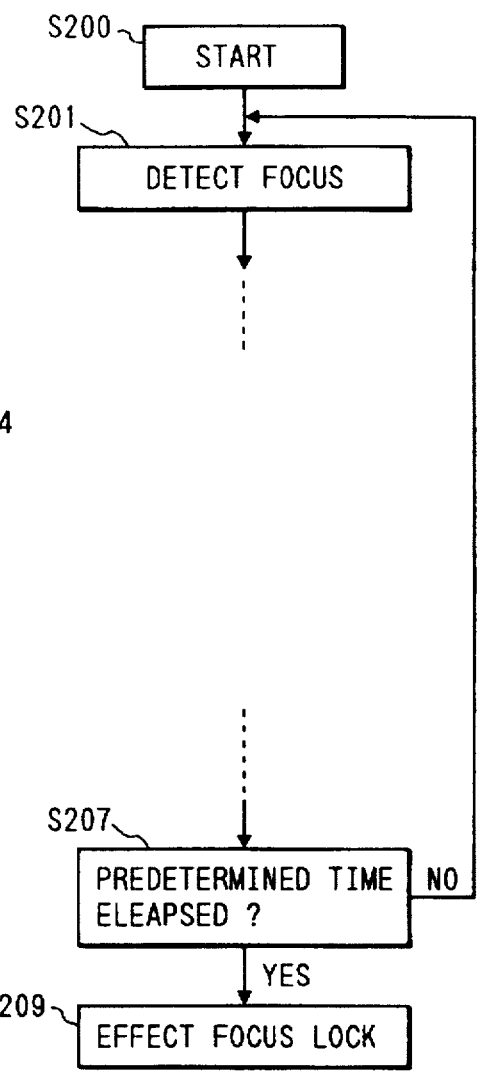

CENTER

RIGHT

LEFT

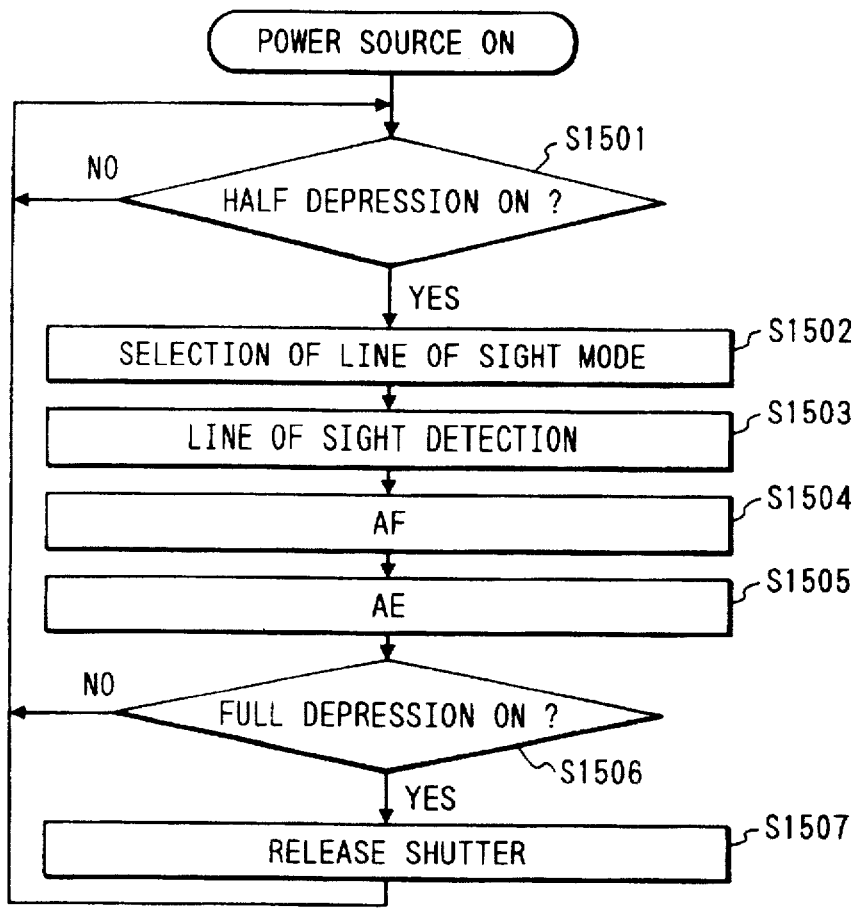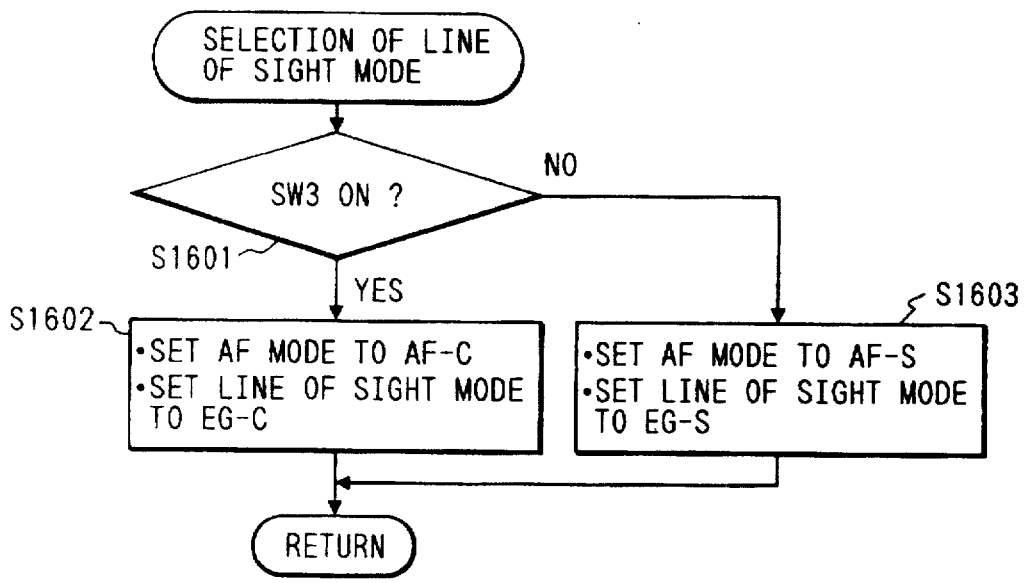

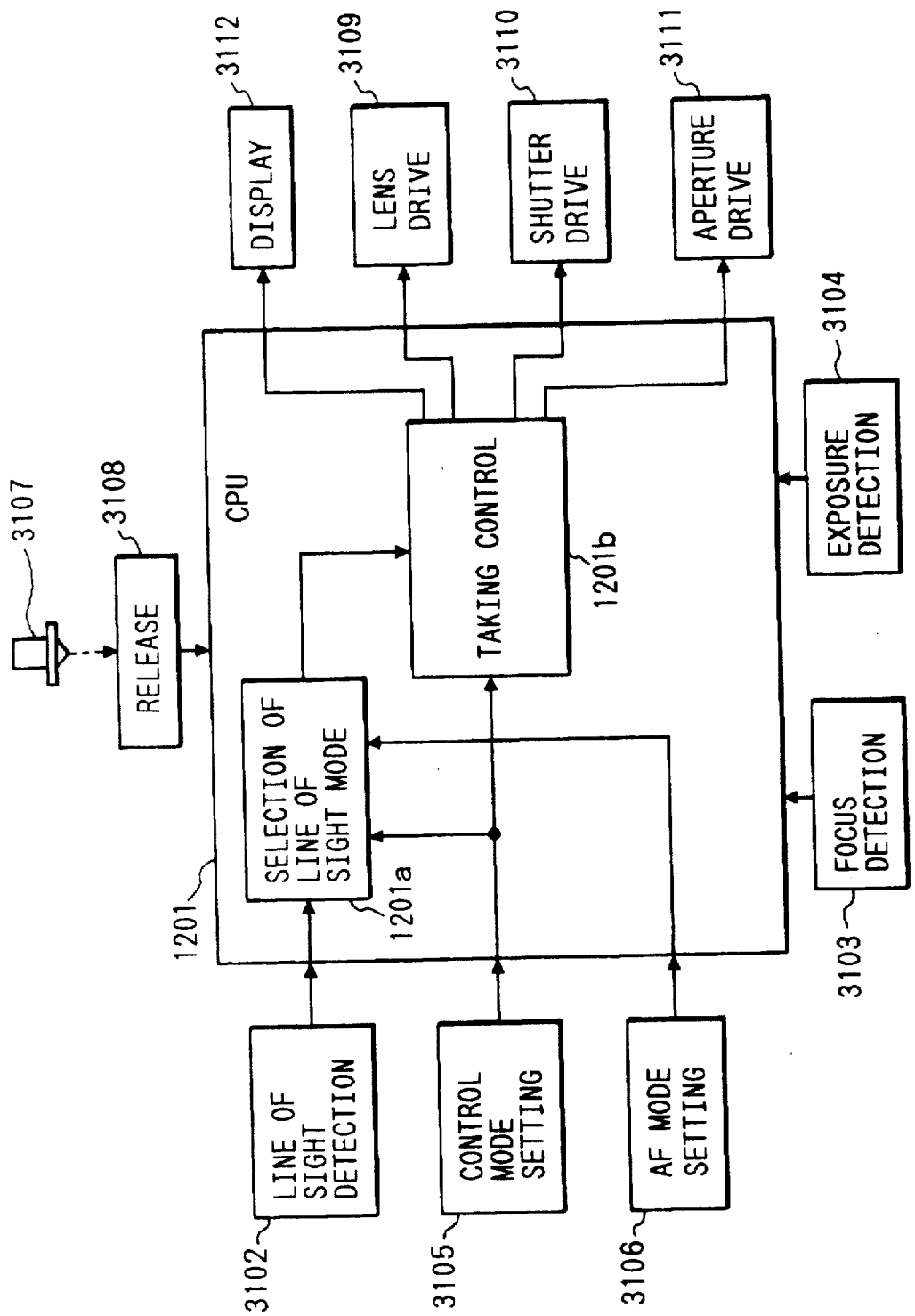

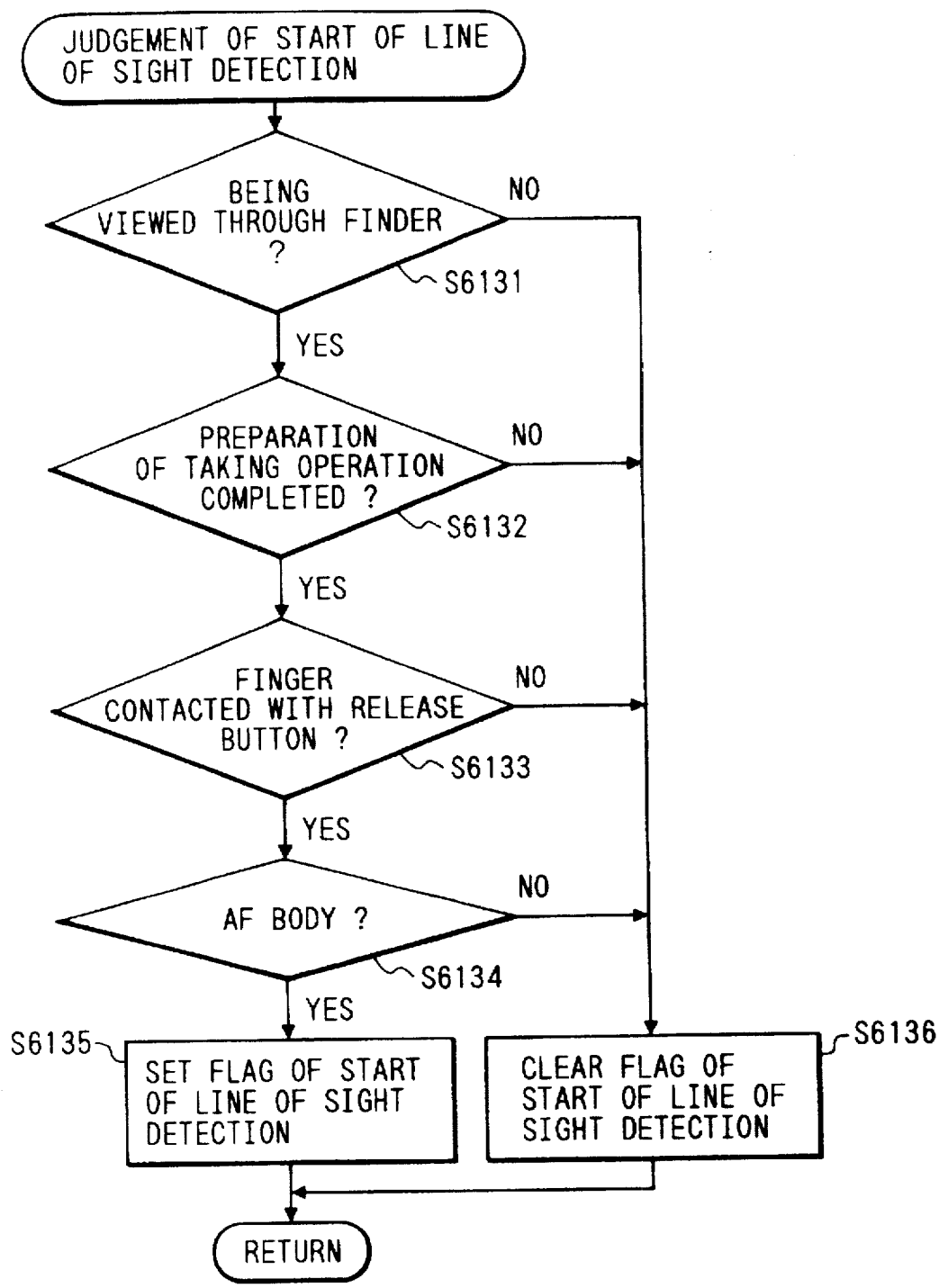

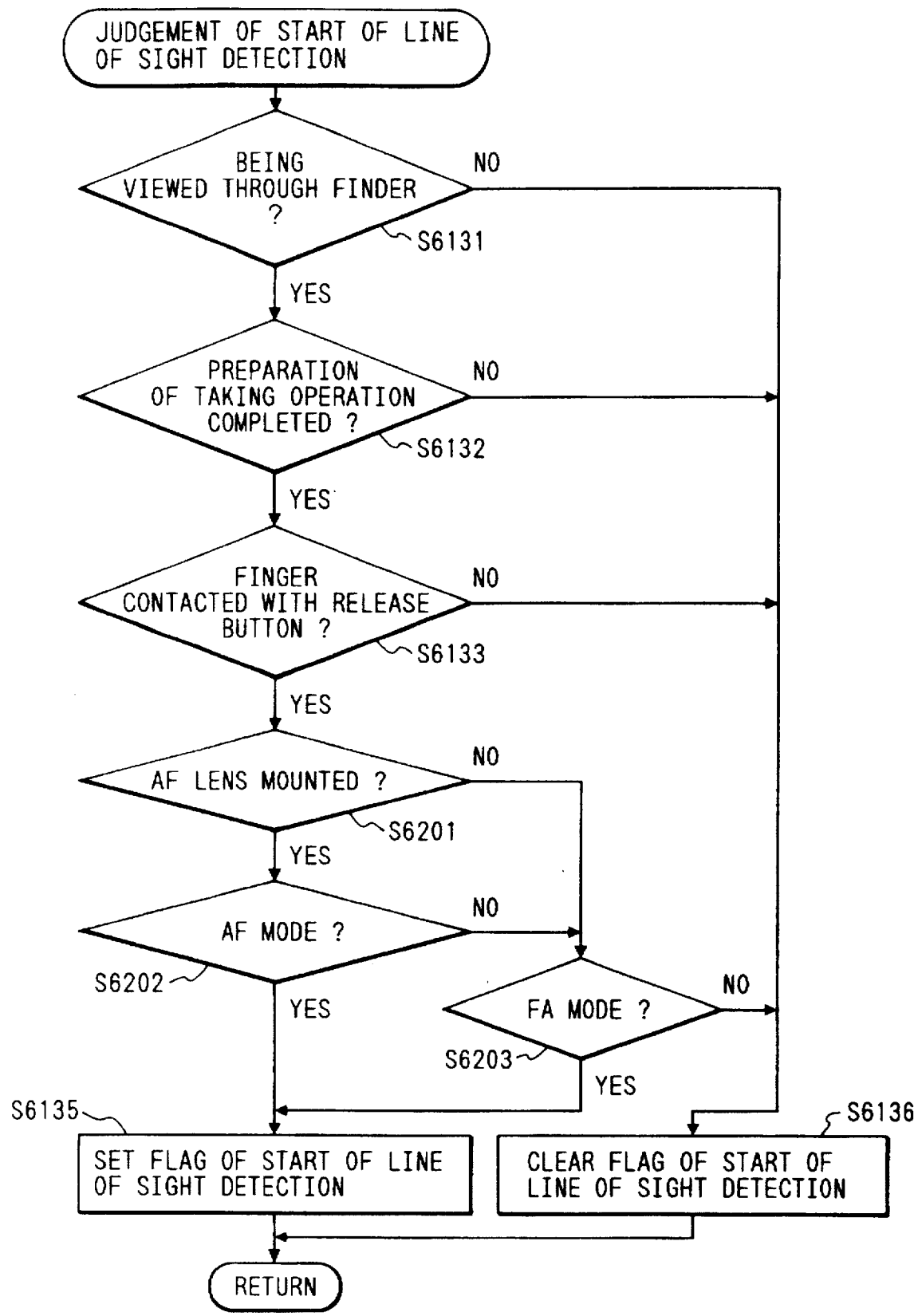

CAMERA HAVING LINE OF SIGHT DETECTING DEVICE

This is a continuation of application Ser. No. 08/337,513 filed Nov. 8, 1994, which is a continuation of application Ser. No. 08/246,557 filed May 19, 1994, which is a continuation of application Ser. No. 08/040,389 filed Mar. 30, 1993, which is a continuation of application Ser. No. 07/903,346 filed Jun. 24, 1992, all abandoned.

BACKGROUND OF THE INVENTION

1. Field of the Invention

The present invention relates to a camera having a line of sight detecting device for controlling a phototaking state of the camera on the basis of the line of sight position of a photographer.

2. Related Background Art

Various line of sight detecting devices applied to cameras have been proposed (Japanese Patent Application Laid-open Nos. 2-5 and 1-241511). The principle of line of sight detection will be briefly described with reference to FIGS. 39A to 39C and FIG. 40.

Four bright points are observed in an intraocular optical system. These bright points are images of light reflected from the front surface of the cornea of an eye of an observer to the rear surface of the crystal lens and are called Purkinje's images. These images are called Purkinje'nns images 1, 2, 3, and 4 from the side of the front surface of the cornea.

A line of sight detecting device detects a line of sight position using the Purkinje's images 1 and 4. The Purkinje's images 1 and 4 change upon rotation of the eyeball. When the line of sight is located at the central position, the Purkinje's images 1 and 4 overlap each other, as shown in FIG. 39A. However, when the line of sight is shifted to the right or left, the Purkinje's images 1 and 4 are separated from each other, as shown in FIG. 39B or 39C.

The amounts of movements of the Purkinje's images 1 and 4 are as shown in FIG. 40 when they are represented using the coordinates of the center of the pupil. In the range of rotation angles of about ±30°, the Purkinje's images 1 and 4 almost linearly change as a function of the rotation angle. Therefore, the rotation angle of the eyeball can be known by measuring the amounts of movements of the Purkinje's images 1 and 4.

A line of sight detecting device is incorporated in a finder of a camera, and the above two bright points are detected by a light-receiving element such as a two-dimensional CCD. The position of the center of gravity of each bright point is detected, and the rotation angle of the eyeball is detected in accordance with the relationship shown in FIG. 40, thereby detecting the line of sight position of the photographer within the finder. In addition to the use of the Purkinje's images 1 and 4, a method using the Purkinje's image 1 and the center of the pupil, a method using a sinus reflection method, and the like are known.

In each of cameras having these line of sight detecting devices, line of sight position detection is started upon an operation of a specific button (e.g., a release button or a line of sight detection button), and focus detection and autoexposure (AE) are performed within the AF area of the line of sight position.

These devices, however, require an operation of a specific button to fix the AF area judged by the line of sight. In addition, a similar button operation is required if an object to be photographed moves within the AF area.

The amount of line of sight movement is large for a moving object and is small for a still object. A continuous mode (C mode) for a moving object for always driving a phototaking lens in accordance with a focus detection result, and a one-shot mode (S mode) for a still object for driving the phototaking lens in accordance with a focus detection result prior to an in-focus state and inhibiting driving of the phototaking lens once the in-focus state is established are provided as two lens drive modes. Selection of one of the lens drive modes is not interlocked with the amount of line of sight movement.

SUMMARY OF THE INVENTION

It is an object of the present invention to provide a camera having a line of sight detecting device, which can solve the conventional problems described above, requires a small number of button operations, and allows the photographer to concentrate himself on phototaking.

In order to solve the conventional problems described above, a camera having a line of sight detecting device according to the present invention includes a phototaking lens, eye-gazing detecting means for detecting an eye-gazing position of the photographer on a phototaking frame formed by the phototaking lens, operating means, and focus detecting means having a line of sight one-shot focus detection mode for performing focus detection at an eye-gazing position detected by the eye-gazing detecting means for the first time after a start of an operation of the operating means until an end of the operation of the operating means.

According to the present invention, there is also provided a camera having a line of sight detecting device, comprising line of sight detecting means for detecting a line of sight position of a photographer, and line of sight control means, having a single mode for locking a line of sight position obtained when a plurality of previous detection results of the line of sight detecting means satisfy a predetermined eye-gazing condition and a continuous mode for renewing the line of sight position on the basis of a latest line of sight position from the line of sight detecting means, for changing a phototaking state of the camera on the basis of the line of sight position.

According to the present invention, there is further provided a camera having a line of sight detecting device, comprising line of sight detecting means for detecting a line of sight position of a photographer, line of sight mode selecting means for selecting one of a single mode for locking a line of sight position obtained when a plurality of previous detection results of the line of sight detecting means satisfy a predetermined eye-gazing condition and a continuous mode for renewing the line of sight position on the basis of a latest line of sight position from the line of sight detecting means, control mode setting means for selecting a control mode for setting a camera phototaking condition, and phototaking control means for setting the camera phototaking condition in accordance with the line of sight position of the photographer when the control mode is selected, wherein when the control mode is selected by the control mode setting means, the continuous mode is selected by the line of sight mode selecting means, and the camera phototaking condition is set by the phototaking control means in accordance with the line of sight position in the continuous mode.

According to the present invention, there is further provided a camera having a line of sight detecting device, comprising line of sight position detecting means for detecting a line of sight position of a photographer within a phototaking frame, line of sight detection setting means for setting whether the line of sight position detecting means is to be operated, and line of sight detection start judging means for judging whether detection of the line of sight position by the line of sight position detecting means is to be started on the basis of a predetermined judgement condition when the operation of the line of sight position detecting means is set by the line of sight detection setting means and for operating the line of sight position detecting means when the start of detection of the line of sight position is judged.

According to the present invention, there are provided at least two modes, i.e., the single mode for locking the line of sight position when the movement of the line of sight detected by the line of sight detecting means satisfies the predetermined condition such as eye-gazing of a specific position and the continuous mode for continuously detecting the line of sight. When the control mode setting means is used to select the control mode, the continuous mode is automatically selected. The camera phototaking conditions such as an f-number, a shutter speed, and an exposure mode are set on the basis of the latest line of sight position from the line of sight detecting means in the selected continuous mode.

In addition, according to the present invention, whether the line of sight position detecting means is to be operated is set in the line of sight detection setting means in accordance with an external input. When this operation is set, the line of sight detection start judging means judges on the basis of the predetermined judging condition whether detection of the line of sight position by the line of sight position detecting means is to be started. If so, the line of sight position detecting means is operated.

BRIEF DESCRIPTION OF THE DRAWINGS

FIGS. 25A and 25B are flow charts showing operations of a camera having a line of sight detecting device according to the third embodiment of the present invention;

FIG. 41 is a flow chart showing a main flow of a CPU of the ninth embodiment;

FIG. 42 is a flow chart showing a subroutine of selection of a line of sight mode according to the ninth embodiment;

FIG. 67 is a block diagram showing an arrangement according to the twentieth embodiment according to the present invention;

FIG. 84 is a flow chart showing judgement of start of line of sight detection in a camera having a line of sight detecting device according to the twenty-second embodiment of the present invention;

FIG. 85 is a flow chart showing another judgement of line of sight detection start in the camera having the line of sight detecting device of the twenty-second embodiment;

DESCRIPTION OF THE PREFERRED EMBODIMENTS (First Embodiment)

The first embodiment of the present invention will be described in detail with reference to the accompanying drawings.

Figure 1:
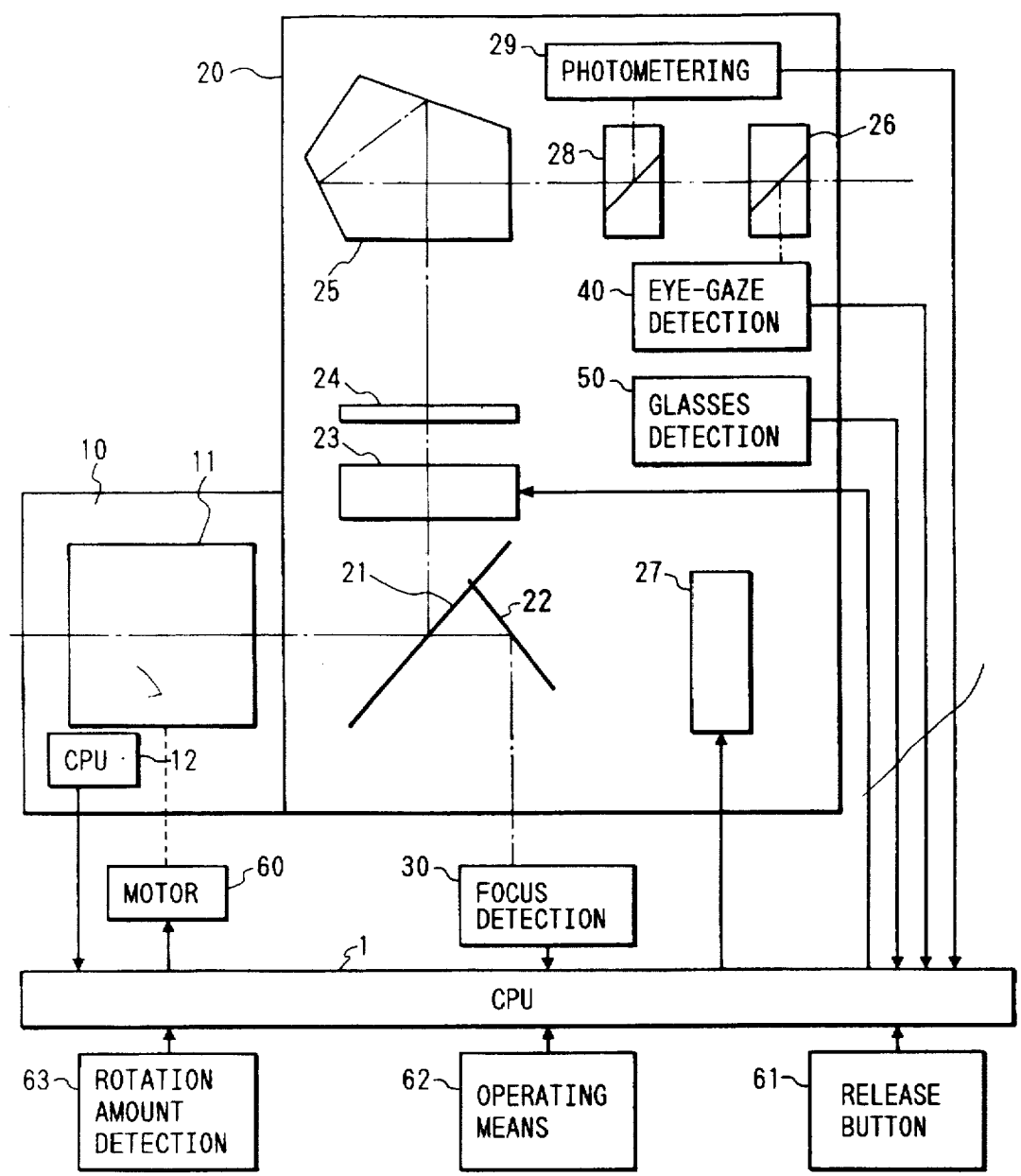
FIG. 1 is a block diagram of a camera having a line of sight detection device according to the first embodiment of the present invention.

FIG. 1 is a block diagram showing a camera having a line of sight detecting device according to the first embodiment of the present invention.

A lens barrel 10 is interchangeably mounted on a camera body 20. A phototaking lens 11 is incorporated in the lens barrel 10. This phototaking lens 11 is a lens whose focal point is adjustable upon movement along the optical axis.

When the lens barrel 10 is mounted on the camera body 20, phototaking light received from an object to be photographed is guided to a main mirror 21 arranged in the camera body 20 through the phototaking lens 11.

One part of the phototaking light is reflected toward the finder by the main mirror 21 and is guided through a display portion 23, a screen 24, a pentagonal prism 25, and an eyepiece lens 26. Therefore, a screen image is observed by a photographer.

The other part of the phototaking light passes through the main mirror 21, is reflected by a submirror 22, and is guided to a focus detection portion 30 as a focus detection beam.

The camera body 20 also incorporates a known camera internal mechanism such as a winding mechanism (not shown) near the eyepiece lens 26 in addition to a line of sight detection portion 40, a glasses detection portion 50, and a shutter 27 (to be described later).

A photometering portion 29 performs spot photometering or centralized photometering of the central point in the phototaking frame by using finder light split by a half mirror 28.

Figure 2:
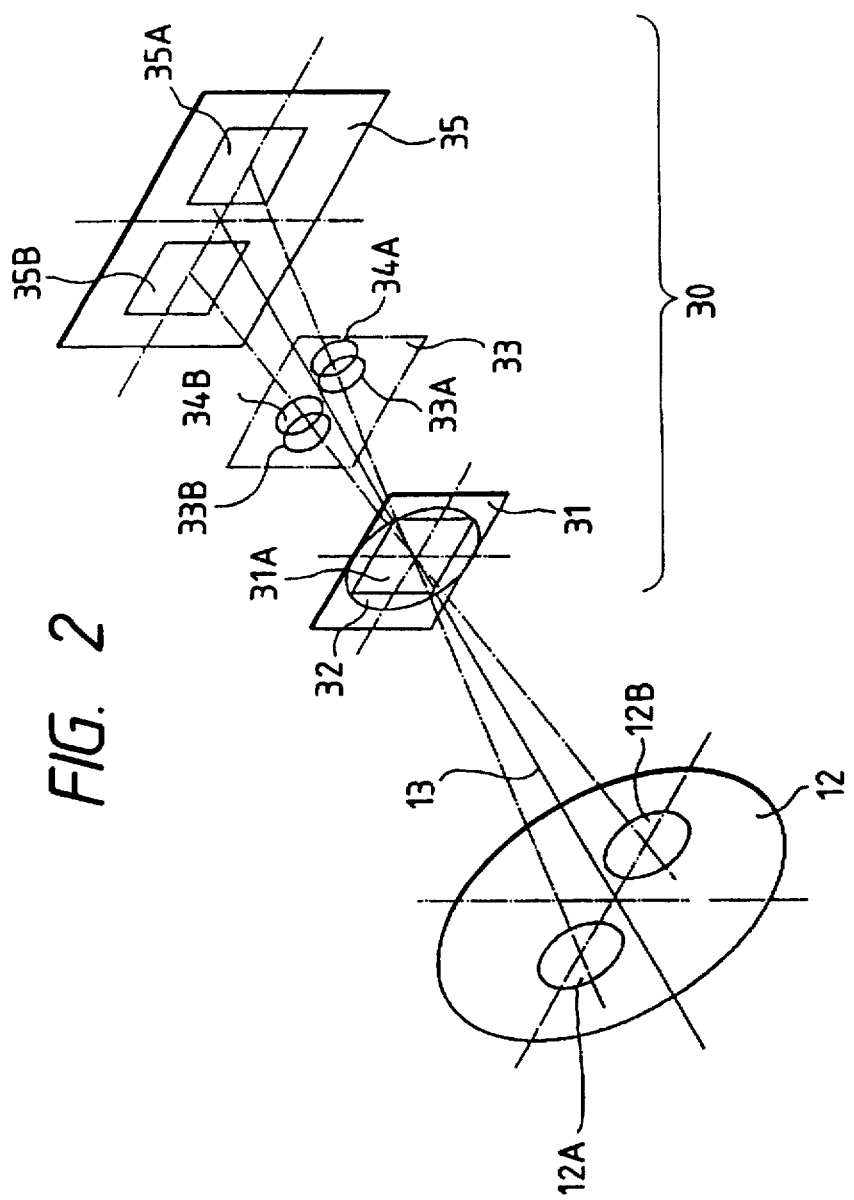
FIG. 2 is a perspective view showing an arrangement of a focus detection means incorporated in the camera of the first embodiment.

FIG. 2 is a perspective view showing an arrangement of the focus detection portion incorporated in the camera of the first embodiment.

The focus detection portion 30 comprises a view mask 31 having a two-dimensional aperture 31A, a field lens 32, a stop mask 33 having a pair of apertures 33A and 33B, a pair of refocusing lenses 34A and 34B, and a photoelectric transducer 35 having light-receiving portions 35A and 35B each having two-dimensionally arranged light-receiving elements.

A pair of regions 12A and 12B symmetrical about an optical axis 13 are included in an exit pupil 12 of the phototaking lens 11. Rays passing through the regions 12A and 12B are focused near the view mask 31 to form a primary image. The view mask 31 has an aperture corresponding to a focal point detectable range M, as shown in FIG. 3.

The primary image formed on the aperture 31A of the view mask 31 is formed as a pair of secondary images on the pair of light-receiving portions 35A and 35B of the photoelectric transducer 35 by the field lens 32, the pair of apertures 33A and 33B of the stop mask 33, and the pair of refocusing lenses 34A and 34B.

The photoelectric transducer 35 detects a relative positional relationship between the pair of secondary images in the alignment direction of the light-receiving portions 35A and 35B by using an object image signal generated by the photoelectric transducer 35, thereby detecting a defocus amount of the phototaking lens 11.

Figure 3:
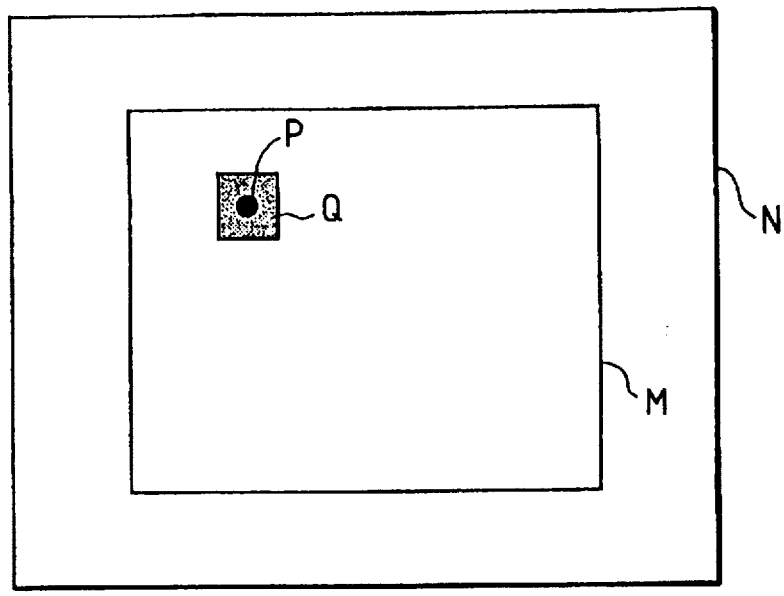
FIG. 3 is a view showing display contents of a focus detection region of the camera of the first embodiment.

As shown in FIG. 3, the light-receiving portions 35A and 35B of the photoelectric transducer 35 cover a region M on a frame N. This region M defines a focus detectable range.

The positional relationship described above can be detected by a position P designated on the phototaking frame and a region Q having a designated size. Within the focus detectable region M, focus detection can be performed using a focus detection region having an arbitrary position and an arbitrary size. For example, the focus detection region can be arbitrarily changed in accordance with a line of sight position detection result (to be described later).

A CPU 1 shown in FIG. 1 serves as an arithmetic operation unit for performing glasses detection processing, line of sight detection processing, focus detection processing, photometering processing, rotation amount detection processing, operating detection processing, lens drive control, shutter control, display control, and the like (which are to be described later).

Outputs from the light-receiving portions 35A and 35B of the focus detection portion 30 are connected to the CPU 1. The CPU 1 performs a focus detection arithmetic operation to obtain a defocus amount from the positional relationship between the two images described above. The CPU 1 controls a motor 60 in accordance with the calculated defocus amount and drives the phototaking lens 11 to an in-focus position.

A lens CPU 12 is incorporated in the lens barrel 10 and transmits various lens data (e.g., focus length) to the body CPU 1.

Figure 4:
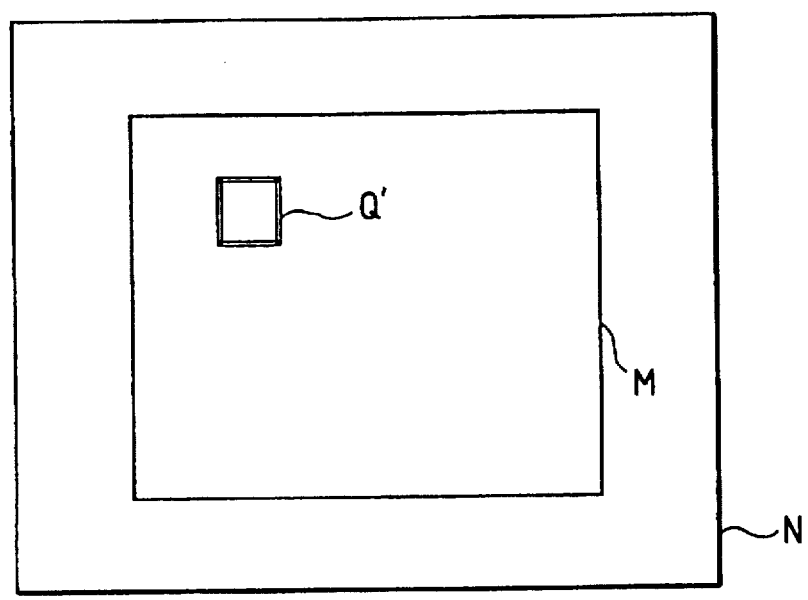
FIG. 4 is a view showing display contents of the focus detection region of the camera of the first embodiment.

The focus detection region and the focus detection result are displayed on the finder by the display portion 23. In an out-of-focus state, the focus detection region Q is displayed as halftone dots by the display portion 23, as shown in FIG. 3. However, once an in-focus state is established, a frame having a transparent inner area of a focus detection region Q' is displayed, as shown in FIG. 4.

When a release button 61 is depressed half from the release state, the operations of the CPU 1 are reset to set a phototaking ready state. When the release button 61 is fully depressed, an exposure operation by the shutter 27 is started for the CPU 1 in the normal operation mode. Note that the exposure operation by the shutter 27 is not started until an in-focus state is obtained in the AF priority mode even if the shutter 27 is fully depressed.

An operating portion 62 is a portion for selecting a line of sight single (to be referred to as an EG-S hereinafter) focus detection mode or a line of sight continuous (to be referred to as EG-C hereinafter) focus detection mode. The CPU 1 switches the operating mode in accordance with selection by this operating portion 62.

The EG-S focus detection mode is a mode in which a focus detection region is fixed to an eye-gaging position detected for the first time after the release button 61 is depressed half. The EG-C focus detection mode is a mode in which a focus detection region is always set at the eye-gazing position.

A rotation amount detection portion 63 is a portion for detecting the rotation amount of the body 20. The rotation amount information is sent to the CPU 1.

Figure 5:
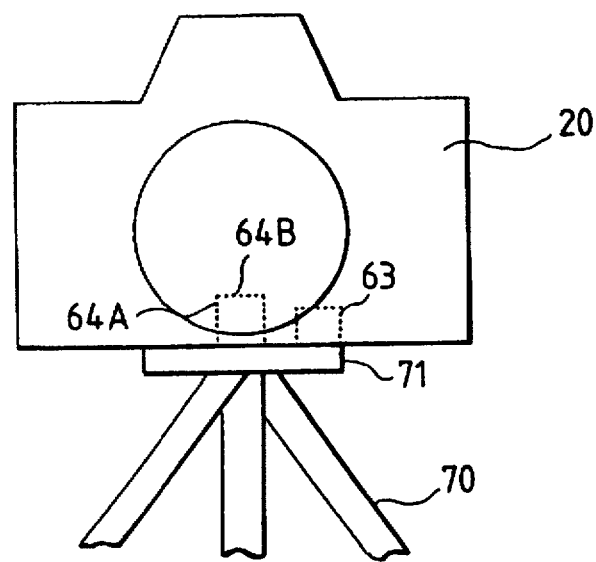
FIG. 5 is a front view showing a rotation amount detection means used in the camera of the first embodiment.
Figure 6:
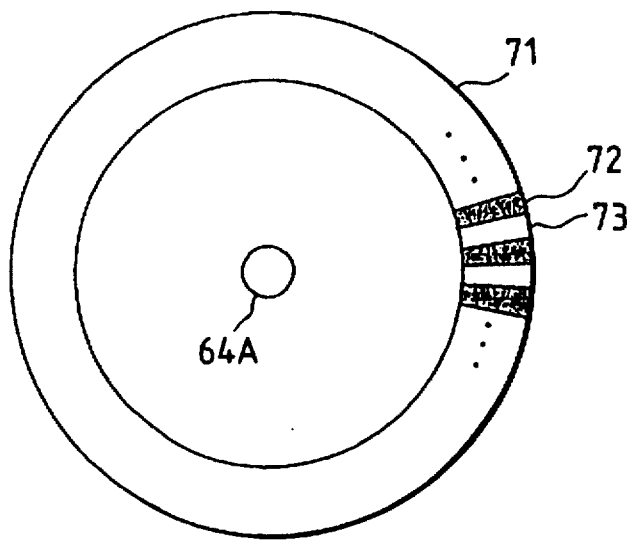
FIG. 6 is a plan view showing an encoder of the rotation amount detection means used in the camera of the first embodiment.
Figure 7:
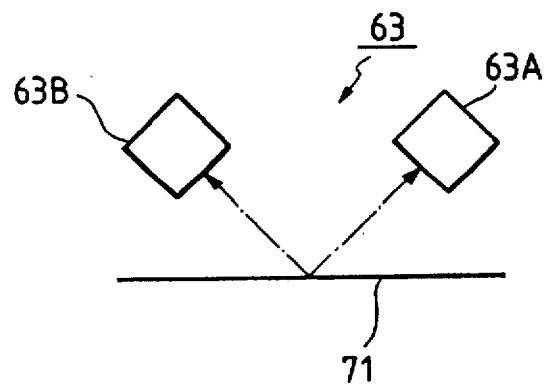
FIG. 7 is a view showing a detecting portion of the rotation amount detection means used in the camera of the first embodiment.

FIGS. 5 to 7 are views showing the rotation amount detection portion used in the camera of this embodiment. FIG. 5 is a front view of the rotation amount detection portion, FIG. 6 is a plan view showing an encoder, and FIG. 7 is a view showing a detection portion.

The rotation amount detection portion 63 is located at the bottom surface of the body 20. At this time, the body 20 is mounted on a camera platform 71 of a tripod 70 by a tripod internal thread 64B and a tripod external thread 64A.

An encoder consisting of high-reflectance portions 73 and low-reflectance portion 72 formed in the circumferential direction is formed having the tripod external thread 64A as the center on the upper surface of the camera platform 71, as shown in FIG. 6.

As shown in FIG. 7, the rotation amount detection portion 63 uses a reflection detecting unit consisting of a light-emitting portion 63A and a light-receiving portion 63B. When the body 20 is rotated about the tripod external thread 64A, its rotation amount is detected as the number of reflected light pulses, which represents a relative movement between the camera platform 71 and the encoder.

The rotation direction can be detected such that two light-receiving portions are shifted from each other and a relationship between the phases of two pulse signals from these portions is judged. The rotation amount detection portion 63 is not limited to this arrangement, but can be constituted by any unit capable of detecting the rotation amount and the rotation direction of the body 20.

Figure 8:
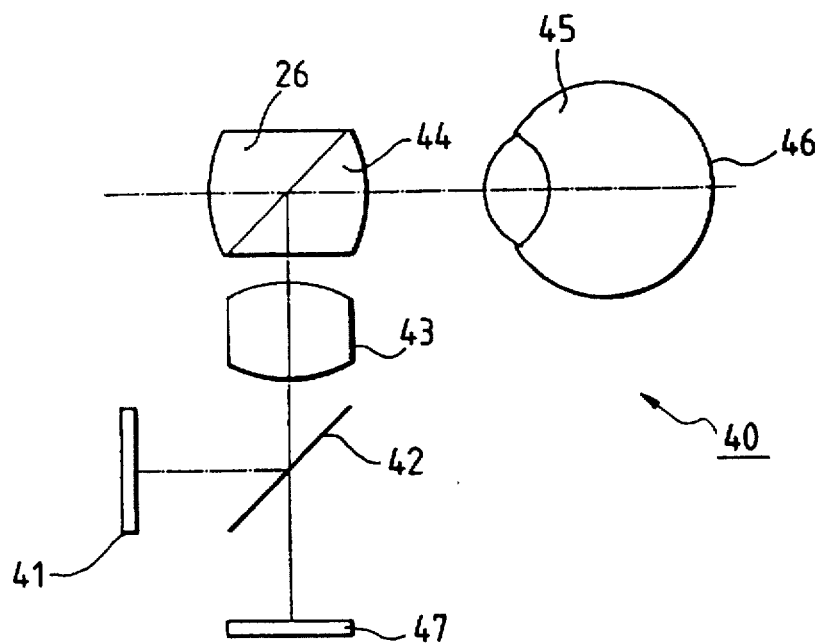
FIG. 8 is a view showing a line of sight detecting means used in the camera of the first embodiment.

FIG. 8 is a view showing a line of sight detection portion used in the camera of this embodiment. The line of sight detection portion 40 includes an infrared surface emission element 41, an optical system 1209 (to be described later), a half mirror 42, a lens 43, and a dichroic mirror 44.

An infrared ray emitted from the infrared surface emission element 41 is reflected by the half mirror 42 and passes through the lens 43 and the dichroic mirror 44, which mirror is located in the eyepiece lens 26 and reflects an infrared ray. The infrared ray is projected on an eye 45 of a finder observer.

In this optical system, the shapes and positions of the optical members are set such that the shape and position of the light-emitting surface of the infrared surface emission element 41 overlap those of the finder frame.

The infrared ray projected on the eye 45 of the observer is reflected by a cornea 46 and returns to the eyepiece lens 26 again. The infrared ray then propagates through the path reverse to the incident path; is reflected by the infrared light reflection dichroic mirror 44, passes through the lens 43 and the half mirror 42, and is received by a surface emission element 47.

The surface emission element 47 may be a two-dimensional position sensor or a two-dimensional image sensor. The operation of the infrared surface emission element 41 is controlled by the CPU 1. An output from the surface emission element 47 is supplied to the CPU 1 and is processed by the CPU 1.

Figure 9:
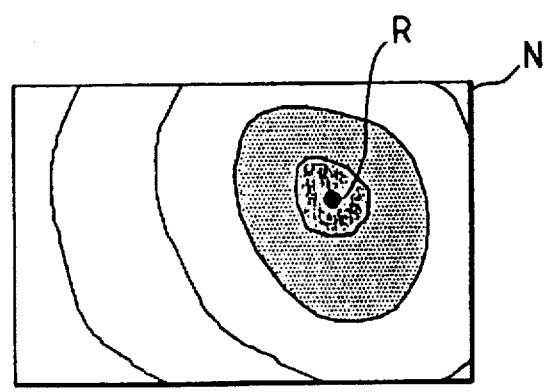
FIG. 9 is a view for explaining reflection efficiency at a line of sight position of the camera of the first embodiment.

In the above arrangement, as shown in FIG. 9, since reflection efficiency at the line of sight position is higher than that in other directions, the received light amount at the position on the surface emission element 47 which corresponds to the position at which the observer views an image on the finder screen 24 is larger than that of any other region.

In order to eliminate an influence of the infrared ray externally incident from the finder, a difference (FIG. 9) between the received light amount of the surface emission element 47 during emission and that during non-emission is calculated, and a line of sight position on the frame N can be detected in accordance with a position R representing a maximum received light amount of this distribution. When the absolute value of the maximum received light amount is small, observation through the finder is disabled, and the line of sight position detection is judged to be disabled.

In the above arrangement, scanning using a two-dimensional beam may be performed in place of the use of the surface emission element 41. Line of sight detection may be performed using an arrangement other than the above arrangement.

Figure 10:
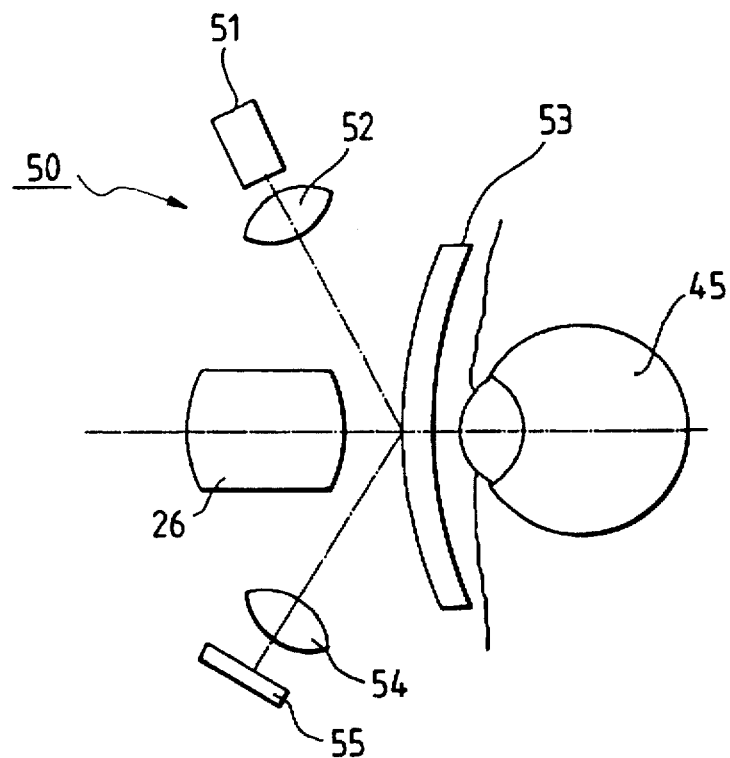
FIG. 10 is a plan view showing an arrangement of a glasses detecting means of the camera of the first embodiment.
Figure 11:
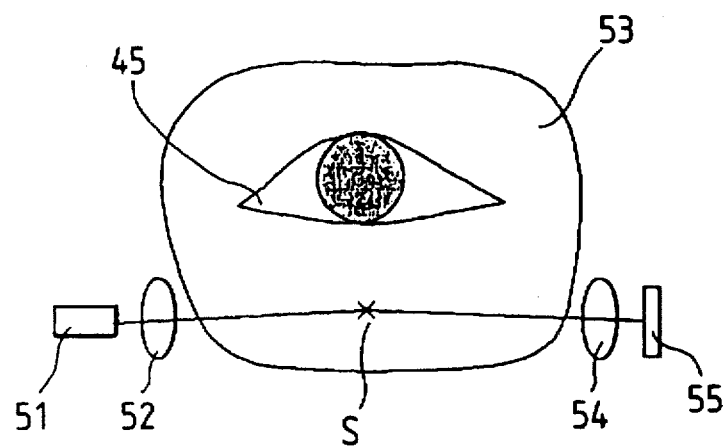
FIG. 11 is a front view showing an arrangement of a glasses detecting means of the camera of the first embodiment.

FIGS. 10 and 11 are a plan view and a front view, respectively, showing an arrangement of a glasses detection portion according to this embodiment.

The glasses detection portion 50 includes an infrared emission element 51, lenses 52 and 54, and a surface light-receiving element 55.

An infrared ray emitted from the infrared emission element 51 is projected on a finder observer through the lens 52. A light projection portion S (FIG. 11) is located in each glass 53 below the corresponding eye 45 so as to prevent reflection by the eyeball. The glasses detection portion 50 is preferably located in the lower portion of the eyepiece lens 26 in the body 20.

When an observer wears the glasses 53 at a normal finder observation position, the infrared ray is reflected by the surface of the corresponding glass 53 and is received by the surface light-receiving element 55 through the lens 54, as shown in FIG. 11. The operation of the infrared emission element 51 is controlled by the CPU 1, and an output from the surface light-receiving element 55 is supplied to and processed by the CPU 1.

The light projection angle on the corresponding glass 53 is set to be small on the surface of the corresponding glass 53 so as to increase the reflectance. In addition, the surface light-receiving element 55 may be a two-dimensional position sensor or a two-dimensional image sensor.

With the above arrangement, in the presence of the glasses 53, reflection in a specific direction is higher than that in other directions. For this reason, the received light amount in a small region on the surface light-receiving element 55 is greater than that in other regions.

In order to eliminate an influence of externally incident infrared rays, a difference between the received light amount distribution of the surface light-receiving element 55 during emission of the surface emission element 51 and that during non-emission thereof is calculated. When the maximum received light amount of this distribution exceeds a predetermined value and is concentrated on one small region, it is judged that the observer wears the glasses 53. Even when the observer does not wear the glasses 53, light is slightly reflected by the skin of the observer. When the maximum received light amount is extremely small, it is judged that a finder observation is not currently performed.

With the above arrangement, only one infrared surface emission element 51 is arranged. However, the direction of a projection beam may be two-dimensionally scanned because detection errors may be caused by variations in reflection directions in accordance with a variation in distance between the finder and the corresponding glass 53 and a variation in an incident angle on the front surface of the corresponding glass 53.

Figure 12:
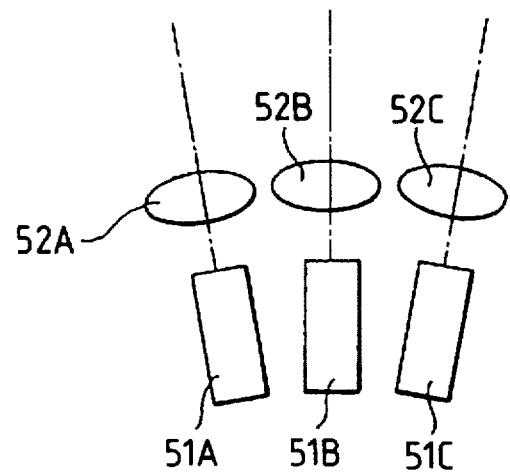
FIG. 12 is a plan view showing a modification of the glasses detecting means of the camera of the first embodiment.

As shown in FIG. 12, the glasses detection portion 50 may be constituted by infrared emission elements 51A, 51B, and 51C and lenses 52A, 52B, and 52C to project beams in a plurality of directions.

Figure 13:
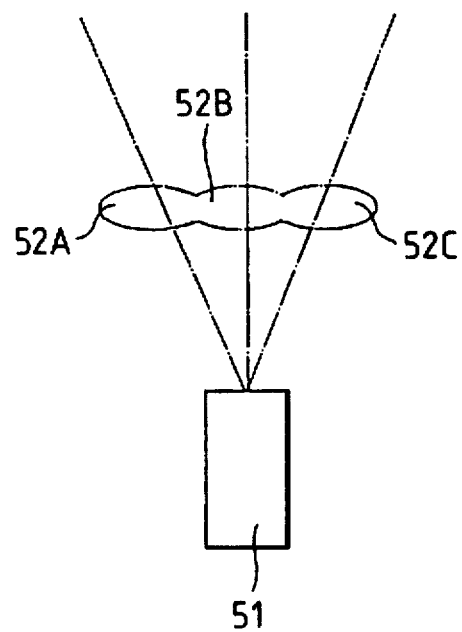
FIG. 13 is a plan view showing another modification of the glasses detecting means of the camera of the first embodiment.

Alternatively, as shown in FIG. 13, one infrared emission element 51 and lenses 52A, 52B, and 52C may be integrally formed to project beams in a plurality of directions.

Figure 14B:
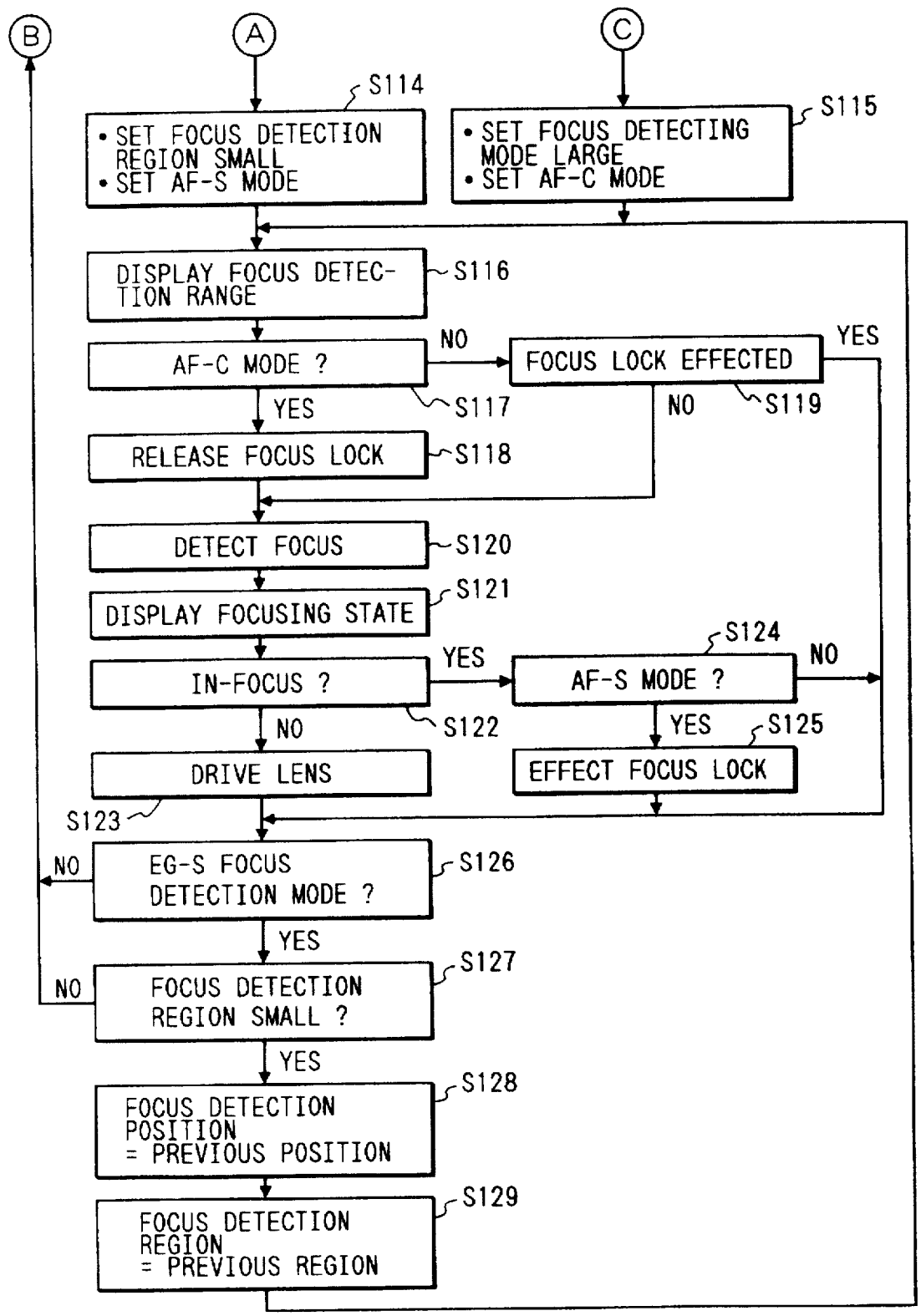
FIG. 14 is a flow chart showing an operation of a CPU of the camera of the first embodiment.

FIG. 14 is a flow chart showing operations of the body CPU of this embodiment.

In step S100, the CPU 1 starts its operation by half-depression of the release button 11.

In step S101, the CPU 1 detects that the photographer who observes an image through the finder wears the glasses 53 in accordance with a signal from the glasses detection portion 50.

When the presence of the glasses 53 is detected in step S102, line of sight detection from step S103 may be erroneously performed. The flow advances to step S112 without performing line of sight detection. If no glasses are detected, the flow advances to step S103.

In step S103, a line of sight position of the photographer who observes an image through the finder is detected on the basis of a signal from the line of sight detection portion 40. Although the line of sight position is detected once in each focus detection sequence in this flow chart, line of sight detection may be performed at a timing (e.g., a timer interruption generated every predetermined time) independent of the focus detection sequence.

The CPU 1 judges in step S104 whether the line of sight position is detectable. If NO in step S104, the flow advances to step S109. However, if YES in step S104, the flow advances to step S105.

In step S105, an amount of line of sight movement is detected.

A method of detecting the amount of line of sight movement will be described below.

Figure 15:
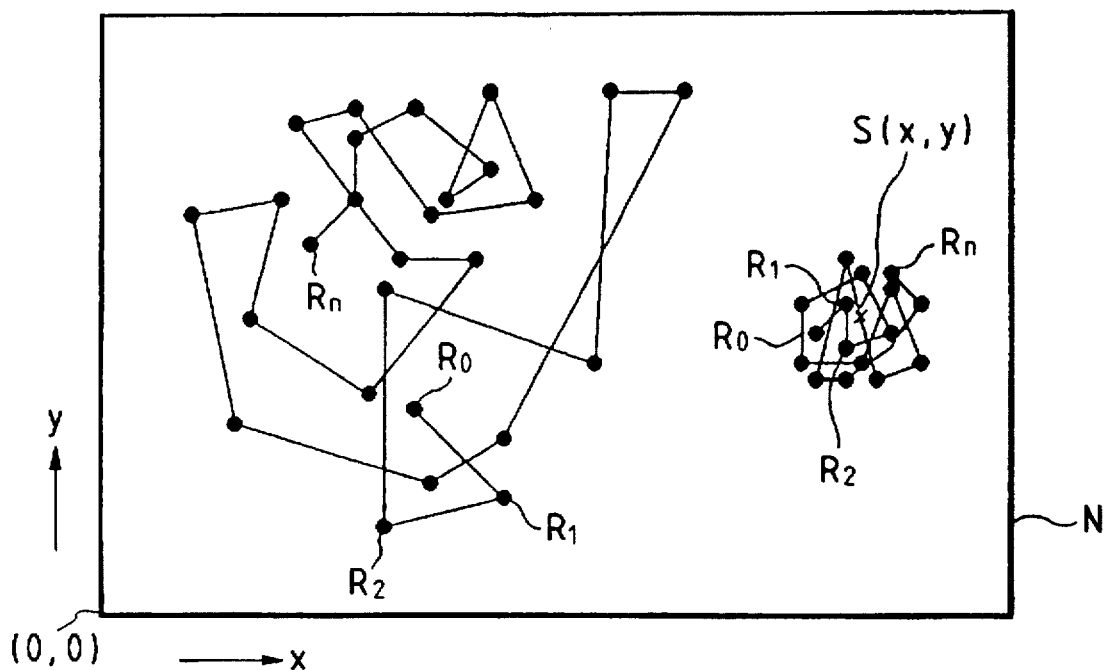
FIG. 15 is a view showing a state of a line of sight position movement.

FIG. 15 is a view showing the line of sight movement. The left side of the frame N in FIG. 15 indicates a large line of sight movement, and the right side thereof indicates a small line of sight movement.

$R(X_0,Y_0)=R_0$: the latest line of sight position $R(X_1,Y_1)=R_1$: the line of sight position in the immediately previous line of sight position detection $R(X_n,Y_n)=R_n$: the line of sight position in nth previous line of sight position detection (Movement Detection Method 1)

Figure 16:
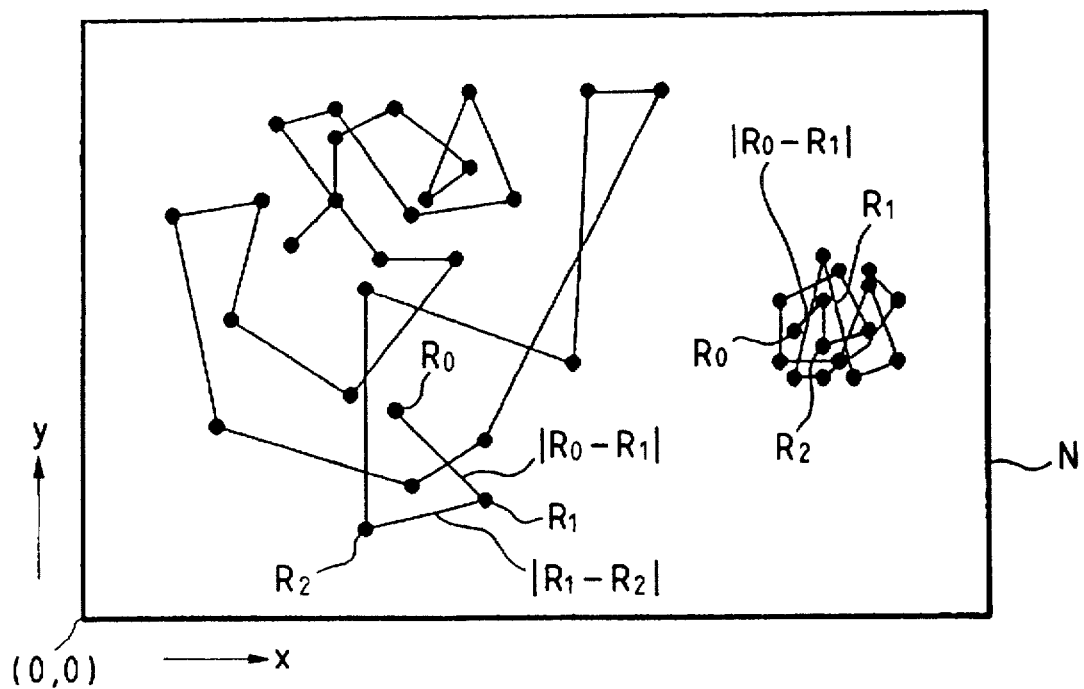
FIG. 16 is a view for explaining a method of detecting the amount of line of sight position movement.

In a movement detection method shown in FIG. 16, an integral value of a distance of the line of sight position moved within a predetermined time is defined as a parameter P of the movement. That is, $$P = \sum_{i=0}^{k-1} |R_i - R_{(i+1)}| \quad (1)$$

In equation (1), the line of sight positions $R_i$ (i.e., $R_0$ to $R_k$) are calculated within the predetermined time from the current time.

(Movement Detection Method 2)

Figure 17:
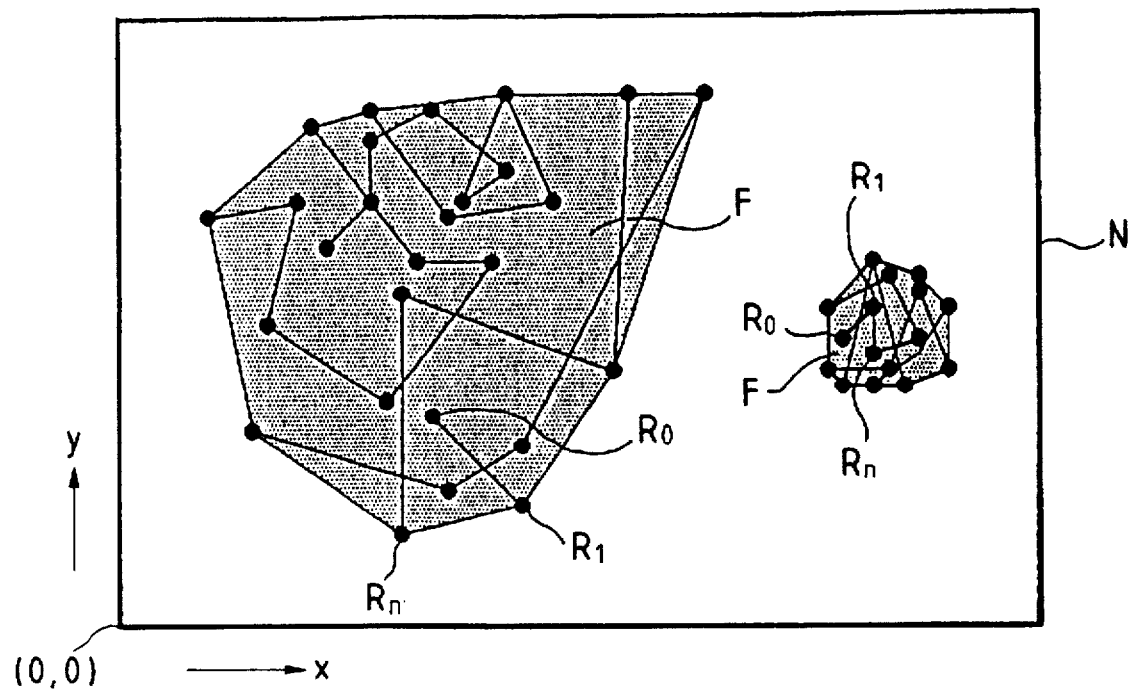
FIG. 17 is a view for explaining another method of detecting the amount of line of sight position movement.

In a movement detection method shown in FIG. 17, an area F of a circumscribed polygon including all the line of sight positions within a predetermined period of time is defined as a parameter P of the movement. That is, $$P = F \quad (2)$$

In equation (2), the line of sight positions (i.e., $R_0$ to $R_k$) are calculated within the predetermined time from the current time.

(Movement Detection Method 3)

Figure 18:
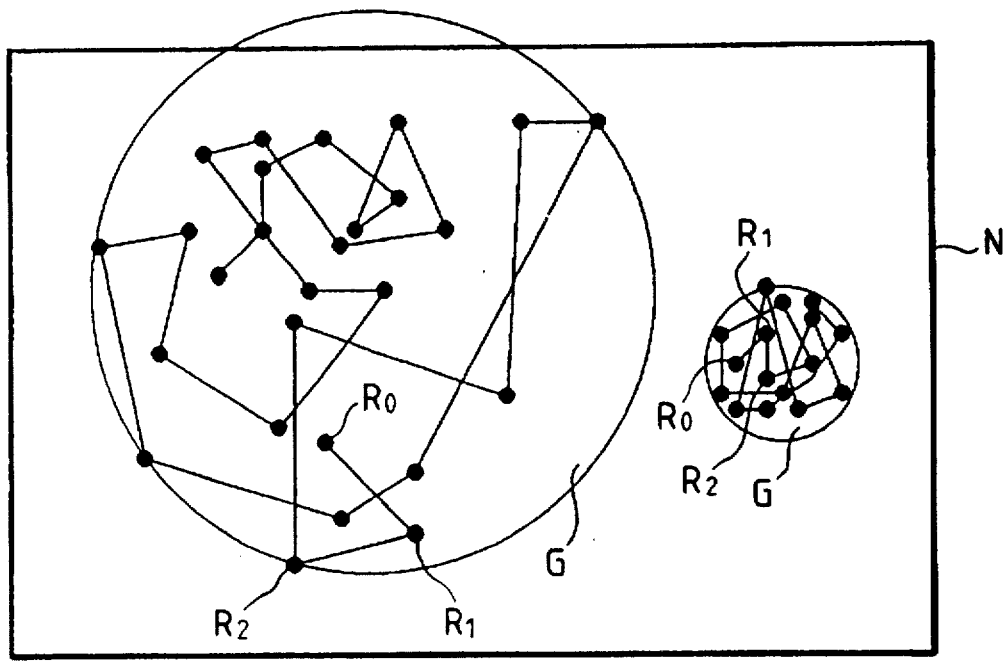
FIG. 18 is a view for explaining still another method of detecting the amount of line of sight position movement.

In a movement detection method shown in FIG. 18, an area of radius G of a circumcircle including all the line of sight positions within a predetermined time is defined as a parameter P of the movement. That is, $$P = G \quad (3)$$

In equation (3), the line of sight positions (i.e., $R_0$ to $R_k$) are calculated within the predetermined time from the current time.

(Movement Detection Method 4)

Figure 19:
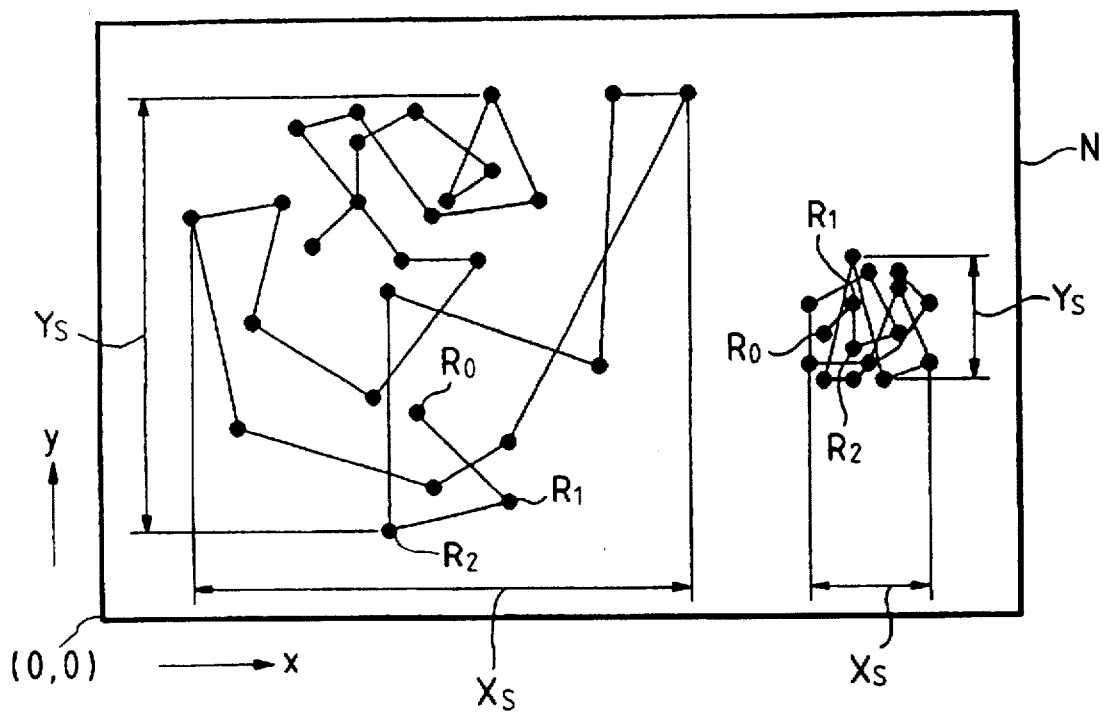
FIG. 19 is a view for explaining still another method of detecting the amount of line of sight position movement.

In a movement detection method shown in FIG. 19, a sum or large value H of differences $X_s$ and $Y_s$ between maximum and minimum values of the line of sight positions in the $\underline{x}$ and $\underline{y}$ directions within a predetermined time is defined as a parameter P of the movement. That is, $$P = H = X_s + Y_s, \text{ or } \text{MAX}(X_s, Y_s) \quad (4)$$
$$X_s = \text{MAX}(X_0, X_1, \ldots, X_k) - \text{MIN}(X_0, X_1, \ldots, X_k)$$
$$Y_s = \text{MAX}(Y_0, Y_1, \ldots, Y_k) - \text{MIN}(Y_0, Y_1, \ldots, Y_k)$$

In equations (4), the line of sight positions (i.e., $R_0$ to $R_k$) are calculated within the predetermined time from the current time.

(Movement Detection Method 5)

In this movement detection method, a sum or maximum value a of standard deviations $\sigma_x$ and $\sigma_y$ of the line of sight positions in the X and Y directions within a predetermined time is defined as a parameter P of the movement. That is, $$P = \sigma = \sigma_x + \sigma_y, \text{ or } \text{MAX}(\sigma_x, \sigma_y) \quad (5)$$
$$\mu_x = \sum_{i=1}^{k} (X_i)/(k+1)$$
$$\mu_y = \sum_{i=1}^{k} (Y_i)/(k+1)$$
$$\sigma_x = \left[ \left( \sum_{i=1}^{k} (X_i - \mu_x)^2 \right) / k \right]^{1/2}$$
$$\sigma_y = \left[ \left( \sum_{i=1}^{k} (Y_i = \mu_y)^2 \right) / k \right]^{1/2}$$

In equations (5), the line of sight positions (i.e., $R_0$ to $R_k$) are calculated within the predetermined time from the current time.

Referring back to FIG. 14, in step S106, the amount P of line of sight movement is compared with a predetermined value K1. If the amount P of line of sight movement is larger than the predetermined value K1, the flow advances to step S109. Otherwise, the flow advances to step S107.

In step S107, i.e, when the movement P of line of sight movement is smaller than the predetermined value K1, the CPU 1 judges that the photographer is set in an eye-gazing state. The CPU 1 detects an eye-gazing position on the basis of an eye-gazing position S(X,Y) (FIG. 15).

Methods of detecting eye-gazing positions are exemplified as follows.

(Eye-Gazing Position Detection Method 1)

The position of the center of gravity of an area F of a circumscribed polygon including all the line of sight positions within a predetermined time is defined as an eye-gazing position S(X,Y).

(Eye-Gazing Position Detection Method 2)

The central position of a circumcircle including all the line of sight positions within a predetermined time is defined as an eye-gazing position S(X,Y).

(Eye-Gazing Position Detection Method 3)

An average value of the maximum and minimum values of the line of sight positions in the X and Y directions within a predetermined time is defined as an eye-gazing position S(X,Y). That is $$X=(\text{MAX}(X_0,X_1,\ldots,X_k)+\text{MIN}(X_0,X_1,\ldots,X_k))/2$$
$$Y=(\text{MAX}(Y_0,Y_1,\ldots,Y_k)+\text{MIN}(Y_0,Y_1,\ldots,Y_k))/2 \quad (6)$$

In equations (6), the line of sight positions (i.e., $R_0$ to $R_k$) are calculated within the predetermined time from the current time.

(Eye-Gazing Position Detection Method 4)

Average values $\mu_x$ and $\mu_y$ (equations (5)) of the line of sight positions in the X and Y directions within a predetermined time are defined as an eye-gazing position S(X,Y).

Figure 20:
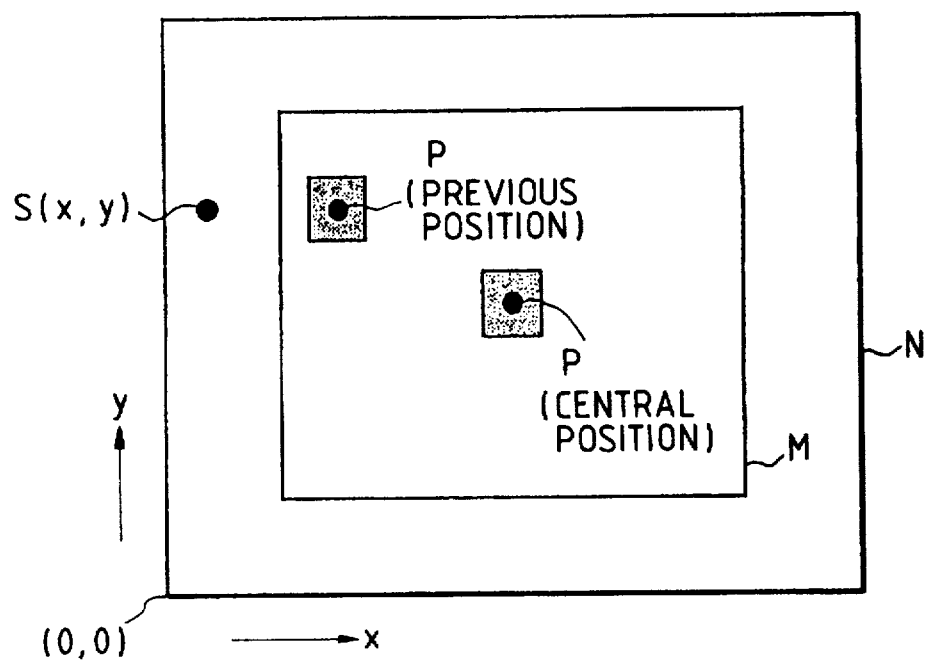
FIG. 20 is a view for explaining a method of setting a focus detection region.

Referring back to FIG. 14 again, in step S108, the CPU 1 judges whether the eye-gazing position S(X,Y) falls outside the focus detectable range M. If YES in step S108, the flow advances to step S109 (FIG. 20). However, if NO in step S108, i.e., when the eye-gazing position S(X,Y) falls within the focus detectable range M, the flow advances to step S110.

In step S109, the CPU 1 judges whether the predetermined time has elapsed from the start of operation in this step. If the time lapse falls within the predetermined time, the flow advances to step S111. However, if the lapse exceeds the predetermined time, the flow advances to step S112.

In step S110, the focus detection position P is defined at the eye-gazing position S(X,Y), and the flow advances to step S113. When the line of sight movement of the photographer is small, focus detection is performed at the eye-gazing position.

In step S111, the focus detection position P is defined at the previous focus detection position, and the flow advances to step S115. If the line of sight position cannot be detected, if the amount of line of sight movement is large, or if the eye-gazing position fell outside the. focus detectable range and the predetermined time has not yet elapsed after the eye-gazing position fell outside the focus detectable range, focus detection is performed at the focus detection position obtained immediately before the eye-gazing position fell outside the focus detectable range (FIG. 20).

In step S112, the focus detection position P is defined at the central position, and the flow advances to step S115. If the line of sight position cannot be detected, if the amount of line of sight movement is large, if the eye-gazing position falls outside the focus detectable range and the predetermined time has not yet elapsed after the eye-gazing position fell outside the focus detectable range, or if the CPU 1 judges that the observer wears the glasses, focus detection is forcibly performed at the central position of the frame (FIG. 20).

In step S113, the amount P of line of sight movement is compared with a predetermined value K2 (<K1). When the amount P of line of sight movement is larger than the predetermined value K2, the flow advances to step S115. Otherwise, the flow advances to step S114.

Figure 21:
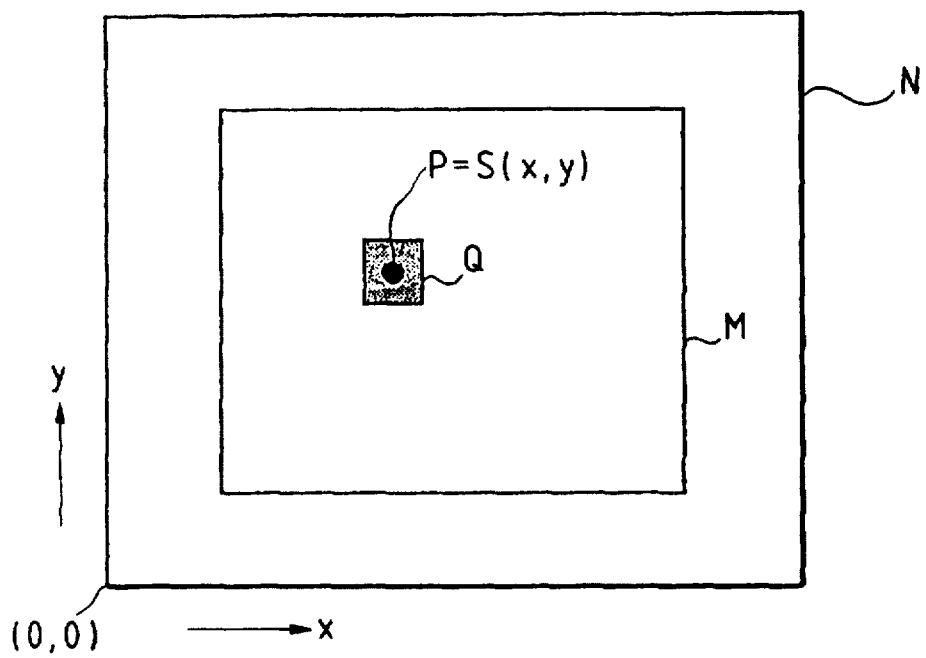
FIG. 21 is a view for explaining another method of setting a focus detection region.

In step S114, the focus detection region Q is set to be a small region around the focus detection position P (FIG. 21), and an auto-focus control mode is set to be an AF single (to be referred to as AF-S hereinafter) mode for performing focus lock after an in-focus state is established. The flow then advances to step S116.

When the line of sight movement is very small, spot focus detection is performed at the eye-gazing position. In this case, the state is judged such that the object stands still or a change in framing is not performed. Therefore, a focus lock mode is set after an in-focus state is established.

Figure 22:
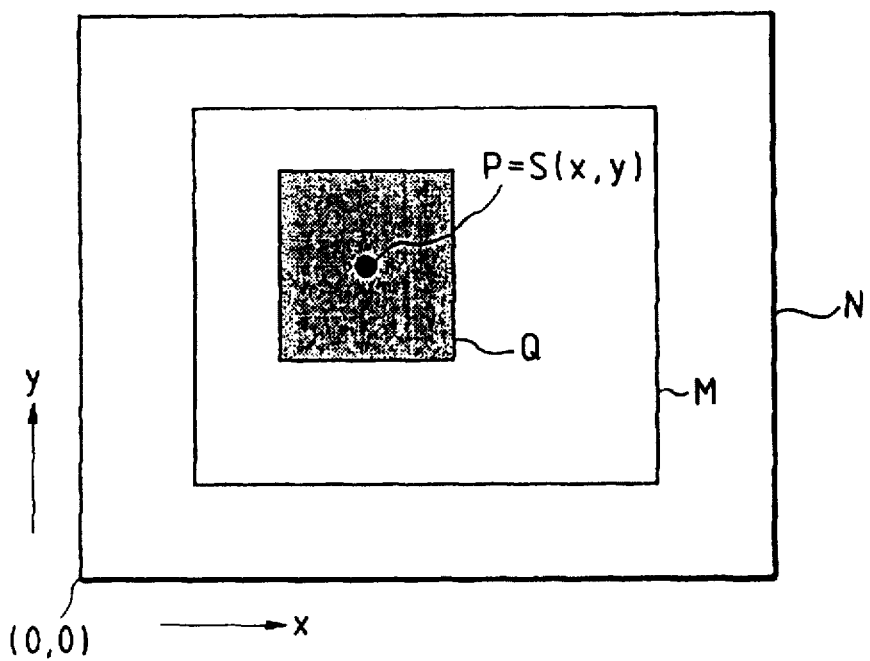
FIG. 22 is a view for explaining still another method of setting a focus detection region.

In step S115, the focus detection region Q is set to be a large area around the focus detection position P (FIG. 22). The auto-focus control mode is changed to an AF continuous (to be referred to as AF-C hereinafter) mode for continuing the servo operation without performing focus lock after an in-focus state is established. The flow then advances to step S116.

If the line of sight movement is very small, if the line of sight position is not detectable or the amount of line of sight movement is large, or if the eye-gazing position falls outside the focus detectable range or the observer wears glasses, focus detection is performed in a large region centered on the eye-gazing position. If the object is judged to be moving or a change in framing is judged to be performed, a mode for continuing lens driving even after an in-focus state is established is set.

In step S116, the set focus detection region is displayed on the frame by the display portion 23, and the flow advances to step S117.

The CPU 1 judges in step S117 whether the set AF mode is the AF-C mode. If YES in step S117, the flow advances to step S118. However, if the set AF mode is judged as an AF-S mode in step S117, the flow advances to step S119.

In step S118, a flag of focus lock is reset, and the flow advances to step S120.

In step S119, when the flag of focus lock is set, focus detection and lens driving are not performed, and the flow advances to step S126. When the flag of focus lock is not set, the flow advances to step S120.

In step S120, known focus detection arithmetic operations are performed for the set focus detection region by using an output signal from the photoelectric transducer 35 to obtain a focus detection result (defocus amount). The flow then advances to step S121.

In step S121, the focus detection result is displayed on the frame by the display portion 23, and the flow advances to step S122.

The CPU 1 judges in step S122 whether the focus detection result (defocus amount) represents an in-focus state. If YES in step S122, the flow advances to step S124. Otherwise, the flow advances to step S123.

In step S123, the motor 60 is controlled in accordance with the focus detection result (defocus amount) to drive the phototaking lens 11 to an in-focus position. The flow then advances to step S124.

The CPU 1 judges in step S124 whether the set AF mode is an AF-C mode. If YES in step S124, the flow advances to step S126. However, if the set AF mode is judged as an AF-S mode, the flow advances to step S125.

In step S125, the flag of focus lock is set, and the flow advances to step S126.

The CPU 1 judges in step S126 whether a set state represents an EG-S focus detection mode. If YES in step S126, the flow advances to step S127. However, if the set state represents an EG-C focus detection mode, the flow returns to step S101.

Figure 23:
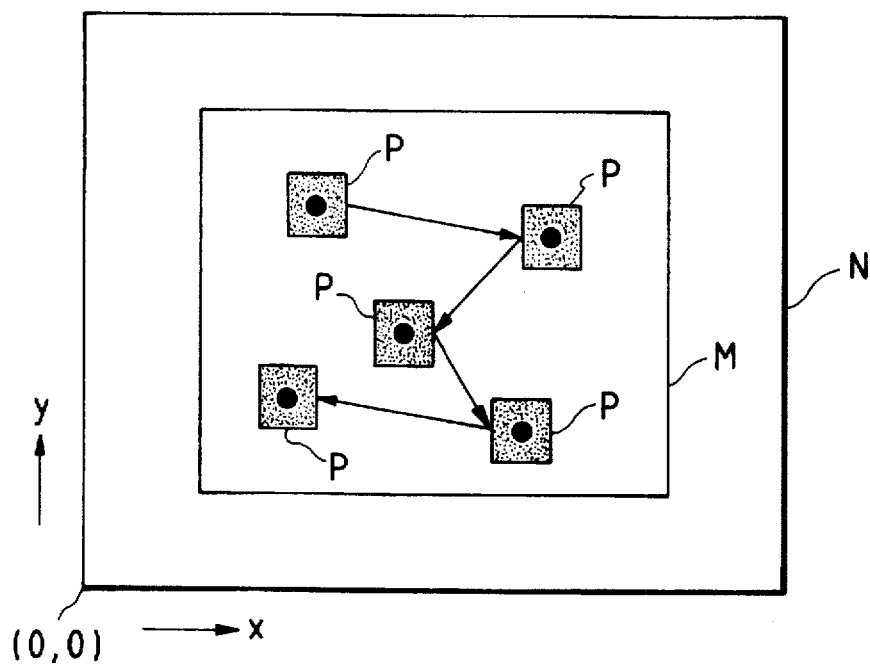
FIG. 23 is a view for explaining still another method of setting a focus detection region.

The eye-gazing position is always detected in the EG-C focus detection mode. When the eye-gazing position is detected, focus detection is performed at this position (FIG. 23).

In step S127, if the currently set focus detection region is a small region, the flow advances to step S128. Otherwise, the flow returns to step S101.

Even in the EG-S focus detection mode, unless the line of sight movement is extremely small, the eye-gazing position is always monitored. If the eye-gazing position is detected, focus detection is performed at this position.

In step S128, the focus detection position P is defined as the previous focus detection position, and the flow advances to step S129.

In step S129, the focus detection region is defined as a small region around the previous focus detection region, i.e., the focus detection position P, and the flow returns to step S116.

In the EG-S focus detection mode, once the line of sight movement becomes very small, the focus detection position and the size of the focus detection region are fixed (FIG. 3).

(Second Embodiment)

Figure 24:
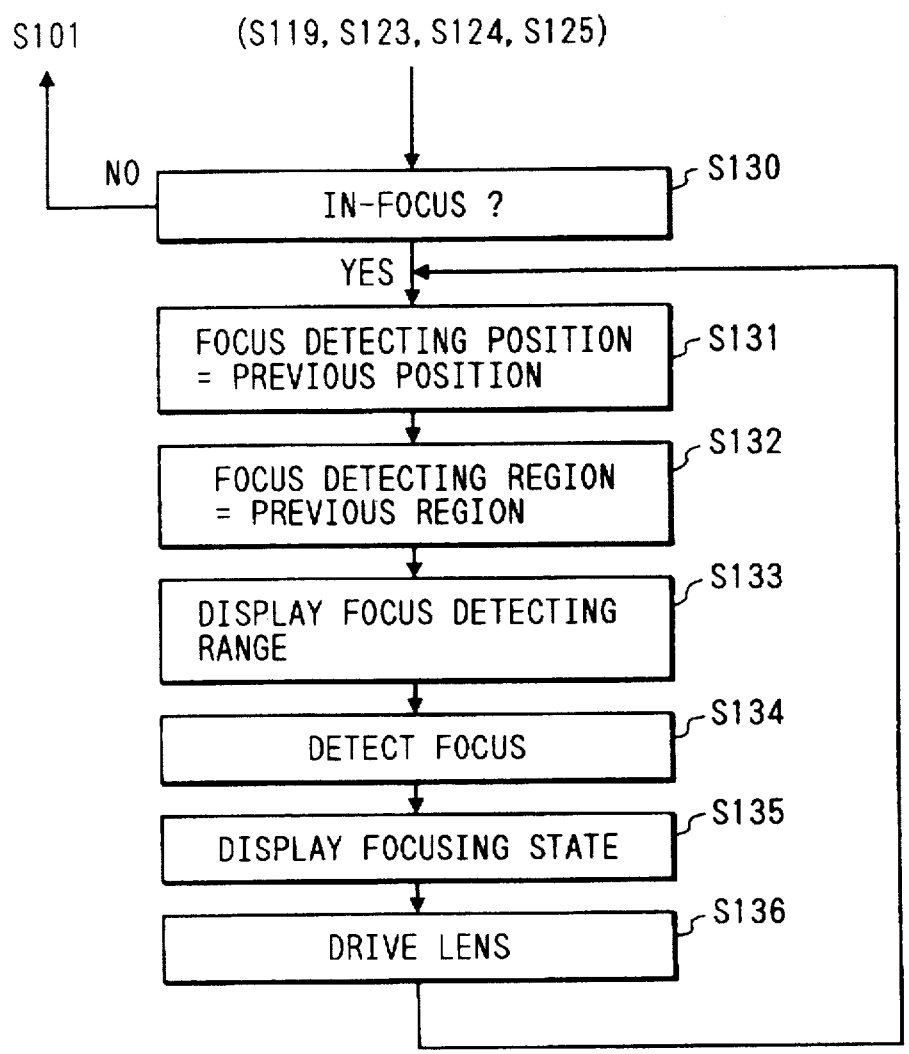
FIG. 24 is a flow chart showing operations of a camera having a line of sight detecting device according to the second embodiment of the present invention.

FIG. 24 is a flow chart showing operations of a camera having a line of sight detecting device according to the second embodiment of the present invention.

In this embodiment, steps S126 to S129 of the flow chart of the embodiment shown in FIG. 14 are changed, and the flow advances from steps S119, S123, S124, and S125 to step S130.

More specifically, in step S130, if the CPU 1 judges in accordance with the focus detection result that an in-focus state is not established, the flow advances to step S101. However, if an in-focus state is detected, the flow advances to step S131.

The eye-gazing position is always monitored in an out-of-focus state. When an eye-gazing position is detected, focus detection is performed at this position (FIG. 23).

In step S131, a focus detection position P is defined at the previous focus detection position, and the flow advances to step S132.

In step S132, the focus detection region is defined at a small region around the previous focus detection region, i.e., the focus detection position P, and the flow advances to step S133.

In step S133, the set focus detection region is displayed on the frame by a display portion 23. The flow then advances to step S134.

In step S134, known focus detection arithmetic operations are performed for the set focus detection region by using an output signal from a photoelectric transducer 35 to obtain a focus detection result (defocus amount). The flow then advances to step S135.

In step S135, the focus detection result is displayed on the frame by the display portion 23, and the flow advances to step S136.

In step S136, a motor 60 is controlled in accordance with the focus detection result (defocus amount) to drive a phototaking lens 11 to an in-focus position. The flow then returns to step S131.

Once an in-focus position is obtained by the above operations, the focus detection position and the size of the focus detection region which are obtained in correspondence with the in-focus position are fixed and subsequently used.

When step S136 is omitted, lens driving can be inhibited once an in-focus state is established.

(Third Embodiment)

FIGS. 25A and 25B are flow charts showing operations of a camera having a line of sight detecting device according to the third embodiment of the present invention.

In step S200 in FIG. 25A, a CPU 1 starts its operations upon half depression of a release button 61.

In step S201, known focus detection arithmetic operations are performed using an output signal from a photoelectric transducer 35 which corresponds to a focus detection region having a predetermined fixed position and a predetermined fixed size, thereby obtaining a focus detection result (defocus amount). The flow then advances to step S202.

In step S202, the focus detection result is displayed on the frame by a display portion 23. The flow advances to step S203.

In step S203, a motor 60 is controlled in accordance with the focus detection result (defocus amount) to drive a phototaking lens 11 to an in-focus position. The flow then advances to step S204.

More specifically, in step S204, if the CPU 1 judges in accordance with the focus detection result that an in-focus state is not established, the flow returns to step S201. However, if an in-focus state is detected, the flow advances to step S205. The eye-gazing position is always monitored in an out-of-focus state. When an eye-gazing position is detected, lens driving is performed in accordance with this result.

In step S205, the line of sight position of the finder observer is detected on the basis of a signal from a line of sight detection portion 40.

Although the line of sight position is detected once in each focus detection sequence in this embodiment, line of sight detection may be performed at a timing (e.g., a timer interruption generated every predetermined time) independent of the focus detection sequence.

In step S206, when the detected line of sight position does not coincide with the focus detection position, the flow returns to step S205. However, if the detected line of sight position coincides with the focus detection position, the flow advances to step S207.

Note that a certain margin is provided in judgement of coincidence of positions. In addition, the eye-gazing position may be compared with the focus detection position.

The CPU 1 determines in step S207 whether a predetermined time has elapsed from the start of operation in this step. If NO in step S207, the flow returns to step S205. Otherwise, the flow advances to step S208.

In step S208, an exposure operation by a shutter 17 is started.

When the line of sight is maintained at the in-focus detection position for a predetermined time or more after an in-focus state is obtained, an automatic exposure operation is performed.

In the above description, the focus detection position is kept fixed. However, the focus detection position may be determined in the EG-S focus detection mode.

FIG. 25B is a flow chart showing a modification of FIG. 25A. Step S208 is omitted. In step S207, when the line of sight is maintained at an in-focus focus detection position for a predetermined time or more after an in-focus state is obtained, focus lock is performed in step S209.

If the focus detection position can be changed in accordance with the line of sight position prior to an in-focus state and if the focus detection position and the size of the focus detection region are fixed to cause the flow to return to step S201 in place of execution of step S208, the focus detection region may be locked at the focus detection position upon establishment of an in-focus state under the condition that the line of sight is maintained at the in-focus focus detection position for the predetermined time or more.

(Fourth Embodiment)

Figure 26:
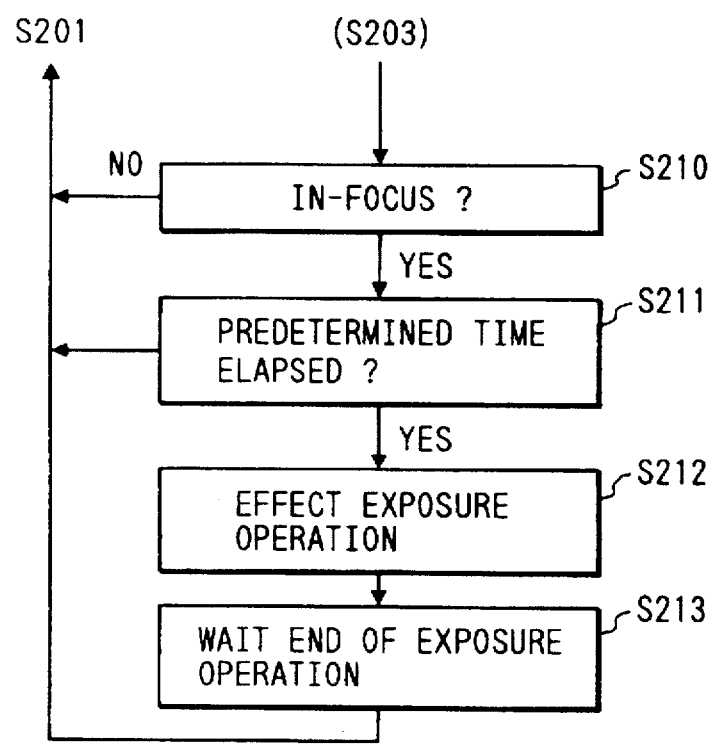
FIG. 26 is a flow chart showing operations of a camera having a line of sight detecting device according to the fourth embodiment of the present invention.

FIG. 26 is a flow chart showing operations of a camera having a line of sight detecting device according to the fourth embodiment of the present invention.

In this embodiment, steps from step S204 in the flow chart of the embodiment of FIG. 25A are changed, and the flow advances from step S203 to step S210.

In step S210, when a CPU 1 determines that an in-focus state is not established as a result of focus detection, the flow returns to step S201. When an in-focus state is established, the flow advances to step S211.

Focus detection is kept performed in an out-of-focus state, and lens driving is performed in accordance with a focus detection result.

In step S211, the CPU 1 judges whether a predetermined time has elapsed from the start of operation in this step. If NO in step S211, the flow returns to step S201. However, if YES in step S211, the flow advances to step S212. Therefore, after an in-focus state is established, focus detection continues for the predetermined time. Lens driving is then performed in accordance with a focus detection result.

In step S212, an exposure operation of a shutter 17 is effected or started. The flow advances to step S213.

The CPU 1 waits for the end of the exposure operation in step S213, and the flow then returns to step S201.

By the above operations, when an in-focus state is kept for the predetermined time or more after this state is established, an automatic exposure operation is performed. This can simplify the conventional operations which result in the following drawbacks. When an in-focus state is detected, and then an exposure operation is immediately performed, no margin in framing is provided. In addition, when an exposure operation and a focus adjustment operation are performed independently of each other, the number of operation members is increased to complicate the operations.

(Fifth Embodiment)

Figure 27:
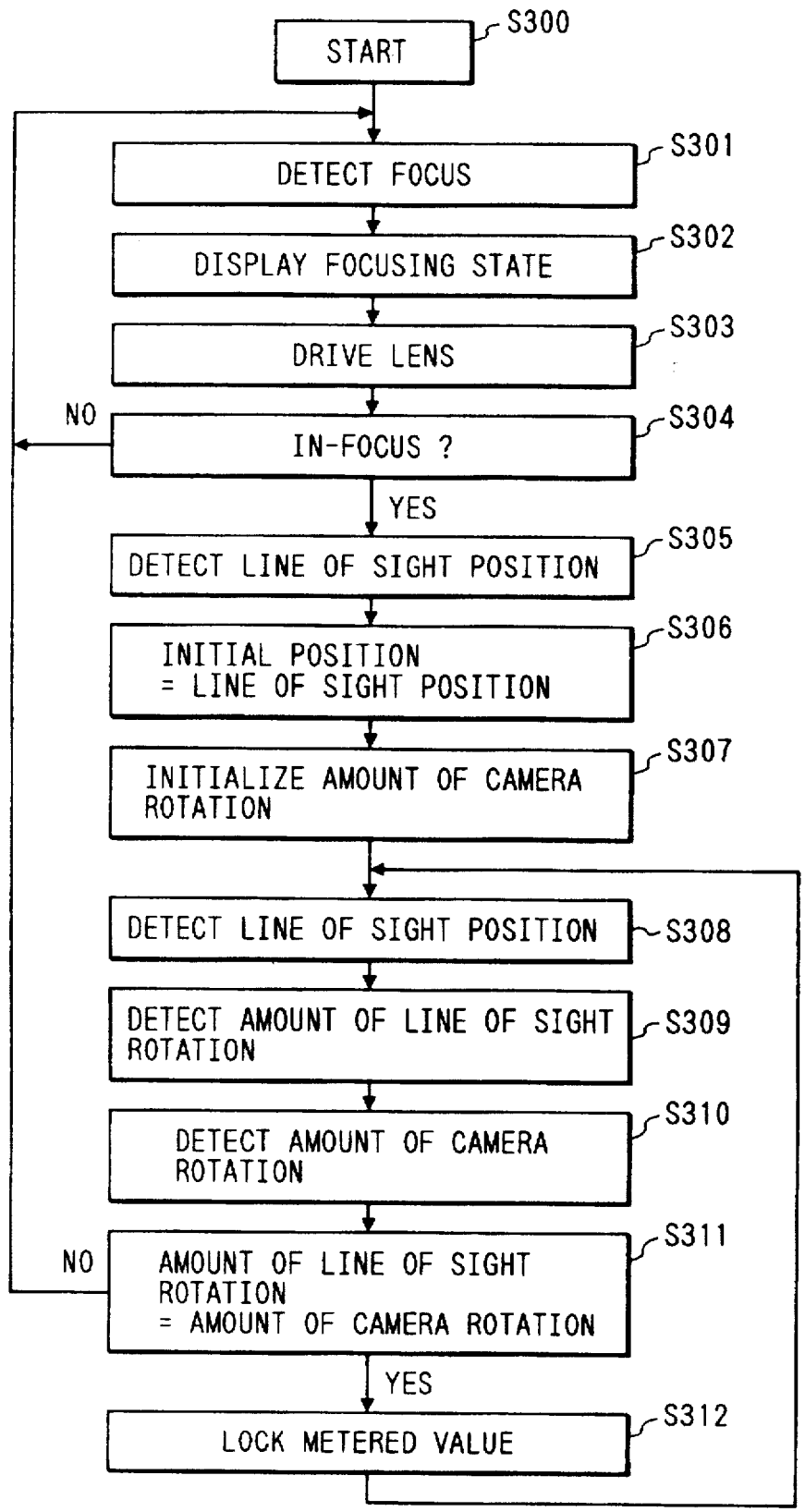
FIG. 27 is a flow chart showing operations of a camera having a line of sight detecting device according to the fifth embodiment of the present invention.

FIG. 27 is a flow chart showing operations of a camera having a line of sight detecting device according to the fifth embodiment of the present invention.

In step S300, a CPU 1 starts its operations upon half depression of a release button 61.

In step S301, known focus detection arithmetic operations are performed using an output signal from a photoelectric transducer 35 which corresponds to a focus detection region having a predetermined fixed position and a predetermined fixed size, thereby obtaining a focus detection result (defocus amount). The flow then advances to step S302.

In step S302, the focus detection result is displayed on the frame by a display portion 23. The flow advances to step S303.

In step S303, a motor 60 is controlled in accordance with the focus detection result (defocus amount) to drive a phototaking lens 11 to an in-focus position. The flow then advances to step S304.

More specifically, in step S304, if the CPU 1 judges in accordance with the focus detection result that an in-focus state is not established, the flow returns to step S301. However, if an in-focus state is detected, the flow advances to step S305.

The eye-gazing position is always monitored in an out-of-focus state. When an eye-gazing position is detected, lens driving is performed in accordance with this result.

In step S305, the line of sight position of the finder observer is detected on the basis of a signal from a line of sight detection portion 40.

Although the line of sight position is detected once in each focus detection sequence in this embodiment, line of sight detection may be performed at a timing (e.g., a timer interruption generated every predetermined time) independent of the focus detection sequence.

In step S306, the line of sight position detected upon establishment of the in-focus state is defined as an initial position R(X0,Y0), and the flow advances to step S307. Note that an eye-gazing position may be used in place of the line of sight position.

In step S307, since the state is changed to the in-focus state, the rotation amount of the camera is initialized, and the flow advances to step S308. Subsequent pulse signals from a rotation amount detection portion 63 are calculated in accordance with the direction of rotation, thereby detecting the rotation angle of the camera body.

Figure 28:
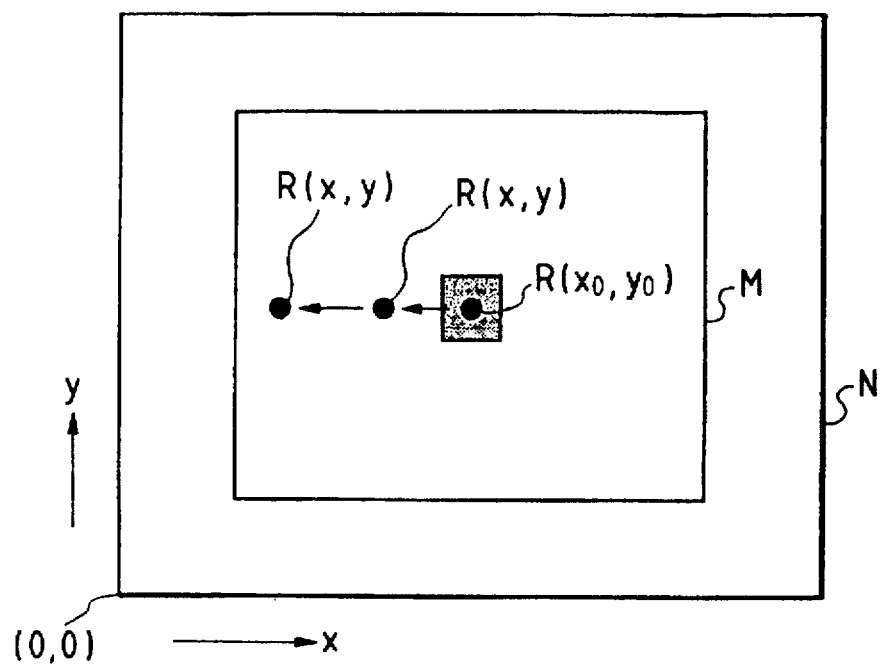
FIG. 28 is a view for explaining a method of detecting a line of sight position of the camera of the fifth embodiment.

In step S308, a line of sight position R(X,Y) of the finder observer is detected on the basis of a signal from the line of sight detection portion 40 (FIG. 28). The flow then advances to step S309.

In step S309, an amount Wa of line of sight rotation on the field of the object is detected in accordance with the amount (X-X0) of line of sight movement from the initial line of sight position and a focal length f of the phototaking lens which is obtained from a lens CPU 12. That is, $$Wa = TAN^{-1}((X-X0)/f) \qquad (7)$$

However, the amount Wa may be expressed using a magnification B and a distance d to the object. That is, $$Wa = TAN^{-1}((X-X0)/(d \cdot B)) \qquad (8)$$

Figure 29:
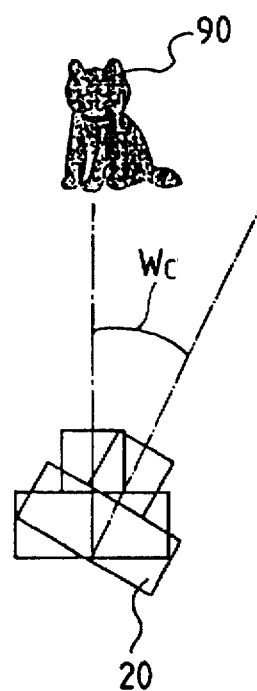
FIG. 29 is a view for explaining a rotation amount detection means of the camera of the fifth embodiment.

In step S310, the pulse signals from the rotation amount detection portion 63 upon establishment of the in-focus state are accumulated to detect a rotation amount Wc of a camera body 20 with respect to a focused object 90 (FIG. 29). The flow then advances to step S311.

In step S311, when the amount Wa of line of sight rotation does not coincide with the rotation amount Wc of the camera, the flow returns to step S301. Otherwise, the flow advances to step S312.

Note that a certain margin is preferably provided in judgement of coincidence. When a displacement (Y-Y0) of the line of sight position in the Y direction exceeds a predetermined value, the flow returns to step S301 regardless of the magnitude of the rotation amount.

In step S312, a metered value from a photometering portion 29 is maintained to be a value obtained immediately after the in-focus state. The flow then returns to step S312.

By the above operations, while the rotation amount of the camera coincides with the amount of line of sight rotation upon establishment of an in-focus state, i.e., while the observer observes the same object with framing being changed, the measured value and the focus adjustment state are automatically locked in the same state as in the in-focus state. Unlike the conventional case, a focus lock or AE lock operation need not be performed after an in-focus state is obtained, and the focus lock mode, the AE lock mode, and remaining modes need not be selectively used after an in-focus state is obtained.

In this embodiment, only the rotation amount in the lateral direction of the frame is detected. However, detection of the rotation amount in the vertical direction of the frame may be performed.

In addition, the arrangement of the camera body rotation amount detection portion is not limited to the one in the above embodiment, but can be replaced with a mechanism utilizing a gyro.

(Sixth Embodiment)

Figure 30:
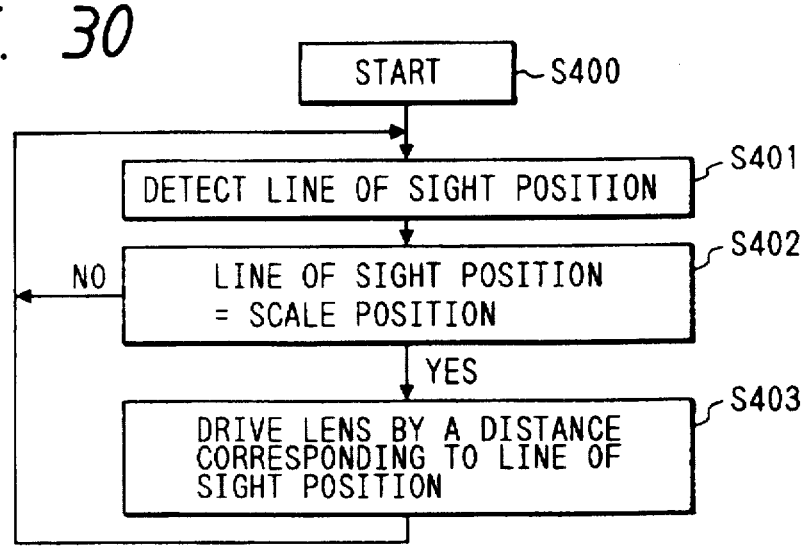
FIG. 30 is a flow chart showing operations of a camera having a line of sight detecting device according to the sixth embodiment of the present invention.

FIG. 30 is a flow chart showing operations of a camera having a line of sight detecting device according to the sixth embodiment of the present invention.

In step S400, a CPU 1 starts its operations upon half depression of a release button 61.

In step S401, the line of sight position of the finder observer is detected on the basis of a signal from a line of sight detection portion 40.

Although the line of sight position is detected once in each focus detection sequence in this embodiment, line of sight detection may be performed at a timing (e.g., a timer interruption generated every predetermined time) independent of the focus detection sequence. An eye-gazing position may be used in place of the line of sight position.

Figure 32:
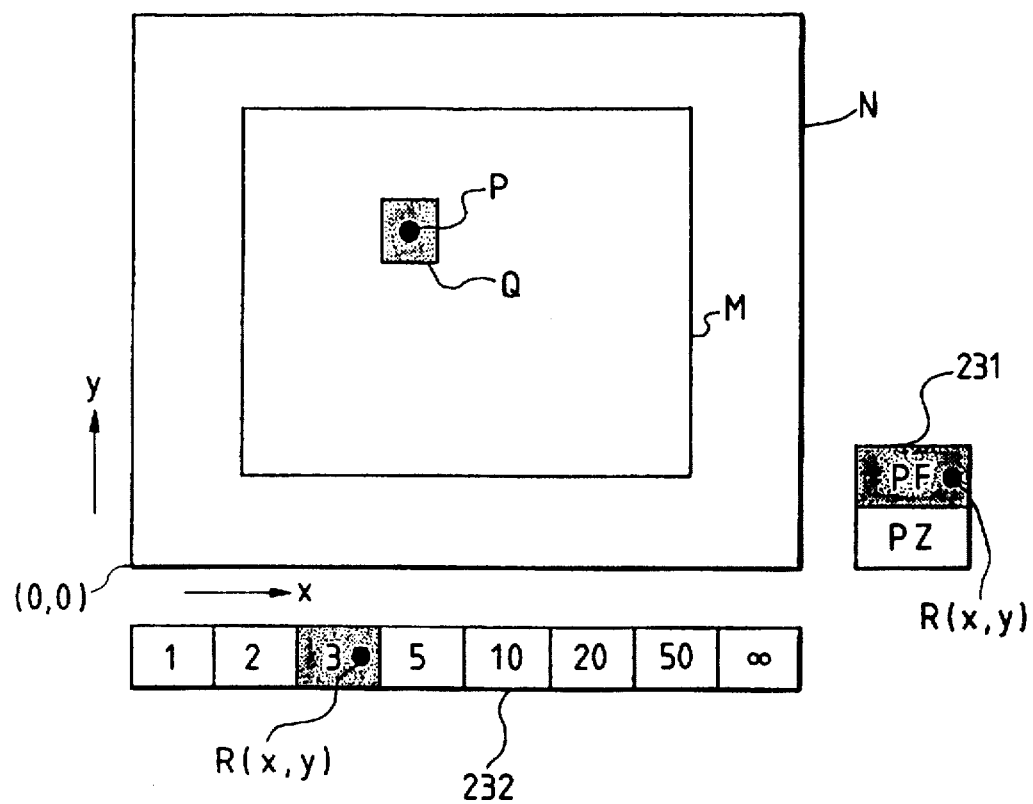
FIG. 32 is a view for explaining a scale displayed by a displaying means of the camera of the seventh embodiment.

In step S402, when the detected line of sight position does not coincide with the position (FIG. 32) of a scale 232 displayed on the finder frame by a display portion 23, the flow returns to step S401. However, if the detected line of sight position coincides with the position of the scale 232, the flow advances to step S403.

Note that a certain margin is preferably provided in judgement of coincidence of positions, and that an eye-gazing position may be compared in place of the line of sight position.

In step S403, a motor 60 is controlled in accordance with a distance indication value (3 m in FIG. 32) of the line of sight position. A phototaking lens 11 is moved to a position corresponding to the distance set by the line of sight. The flow then returns to step S401.

A mode selection display 231 for switching between PF (Power Focus) and PZ (Power Zoom) is present in the finder frame in addition to the scale 232. The PF or PZ mode can be selected in accordance with the line of sight in the same manner as in the above operations. The operations shown in FIG. 30 are performed when the PF is selected.

By the above operations, a desired distance on the scale in the finder frame can be selected in accordance with the line of sight. The distance can be adjusted without any manual operation. This function is very convenient when a photographer holds a camera with a telephoto lens with both hands and takes a picture.

(Seventh Embodiment)

Figure 31:
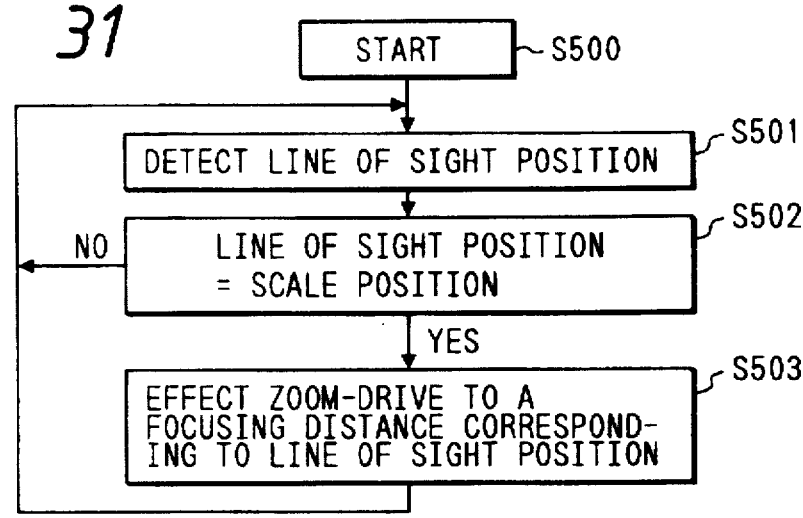
FIG. 31 is a flow chart showing operations of a camera having a line of sight detecting device according to the seventh embodiment of the present invention.

FIG. 31 is a flow chart showing operations of a camera having a line of sight detecting device according to the seventh embodiment of the present invention.

In step S500, a CPU 1 starts its operations upon half depression of a release button 61.

In step S501, the line of sight position of the finder observer is detected on the basis of a signal from a line of sight detection portion 40.

Although the line of sight position is detected once in each focus detection sequence in this embodiment, line of sight detection may be performed at a timing (e.g., a timer interruption generated every predetermined time) independent of the focus detection sequence. An eye-gazing position-may be used in place of the line of sight position.

Figure 33:
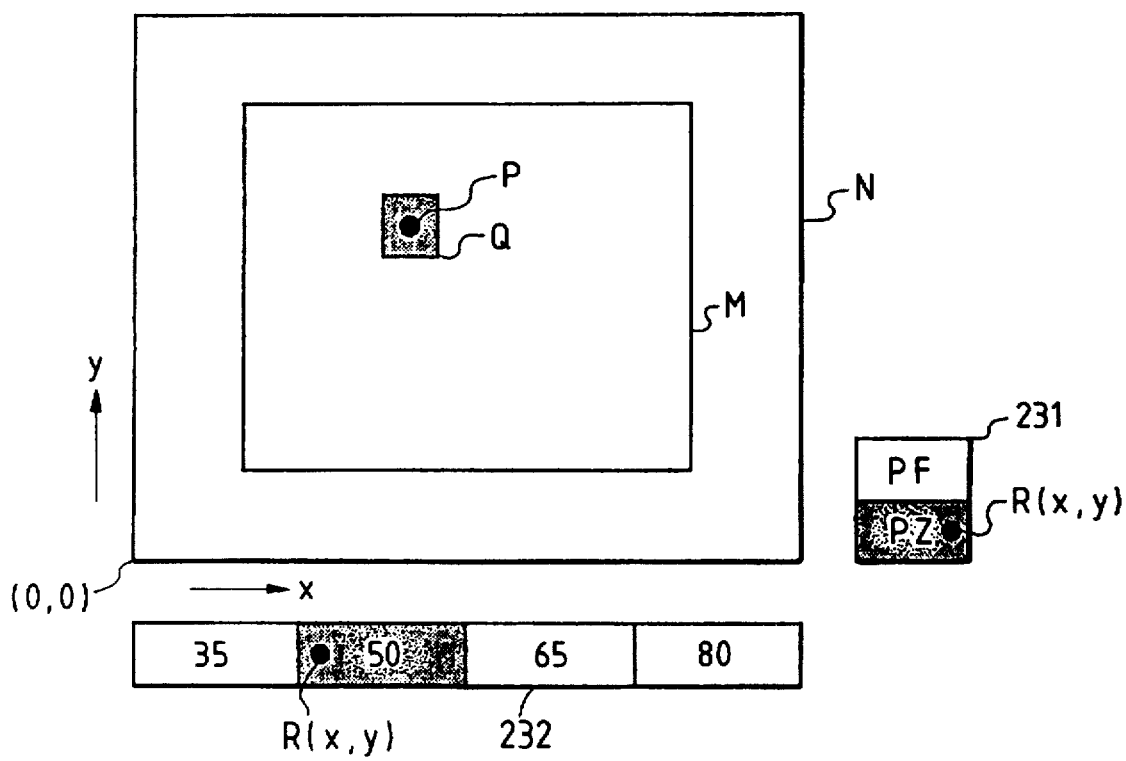
FIG. 33 is a view for explaining another scale displayed by the displaying means of the camera of the seventh embodiment.

In step S502, when the detected line of sight position does not coincide with the position (FIG. 33) of a scale 232 displayed on the finder frame by a display portion 23, the flow returns to step S501. However, if the detected line of sight position coincides with the position of the scale 232, the flow advances to step S503.

Note that a certain margin is preferably provided in judgement of coincidence of positions, and that an eye-gazing position may be compared in place of the line of sight position.

In step S503, a power zoom motor (not shown) is controlled in accordance with a distance indication value (3 m in FIG. 33) of the line of sight position. A zoom lens (not shown) is moved to a position corresponding to the distance set by the line of sight. The flow then returns to step S501.

The operations shown in FIG. 31 are performed when the PZ in the mode selection display 231 is selected by the line of sight position.

By the above operations, a desired distance on the scale in the finder frame can be selected in accordance with the line of sight. The distance can be adjusted without any manual operation. This function is very convenient when a photographer holds a camera with a telephoto lens with both hands and takes a picture.

(Eighth Embodiment)

Figure 34:
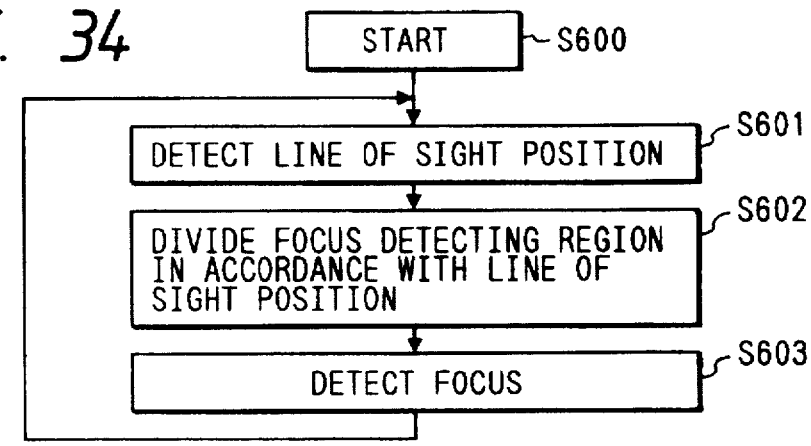
FIG. 34 is a flow chart showing operations of a camera having a line of sight detecting device according to the eighth embodiment of the present invention.

FIG. 34 is a flow chart showing operations of a camera having a line of sight detecting device according to the eight embodiment of the present invention.

In step S600, a CPU 1 starts its operations upon half depression of a release button 61.

In step S601, the line of sight position of the finder observer is detected on the basis of a signal from a line of sight detection portion 40.

Although the line of sight position is detected once in each focus detection sequence in this embodiment, line of sight detection may be performed at a timing (e.g., a timer interruption generated every predetermined time) independent of the focus detection sequence. An eye-gazing position may be used in place of the line of sight position.

Figure 35:
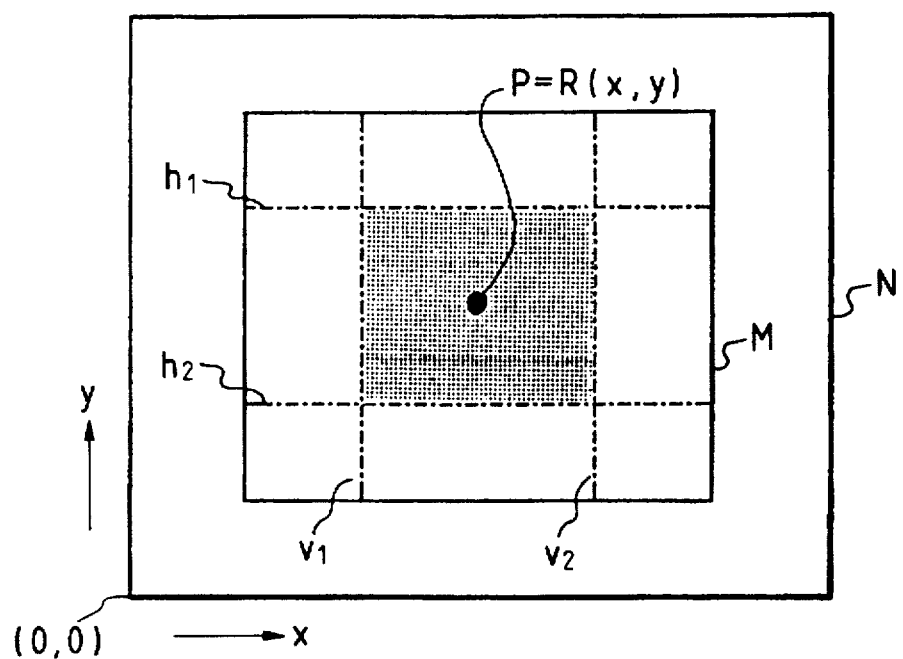
FIG. 35 is a view for explaining a method of dividing a focus detection region of the camera of the eighth embodiment.
Figure 36:
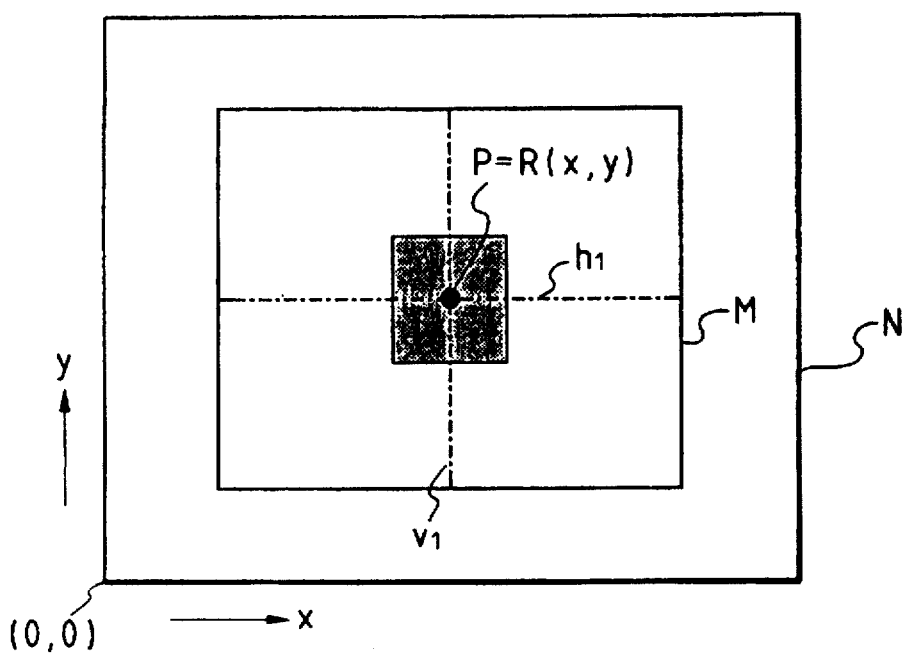
FIG. 36 is a view for explaining problems of a conventional camera having a line of sight detecting device.

In step S602, the focus detection region is divided in accordance with the detected line of sight position. More specifically, when a line of sight position is present near boundaries v1 and h1 (FIG. 36) used for dividing a focus detectable range M into a plurality of predetermined focus detection regions, a principal object is divided into a plurality of focus detection regions, and focus detection is then performed. Since this object is easily influenced by other objects, boundaries are changed so that the line of sight position is located almost at the center of the plurality of focus detection regions (FIG. 35).

In step S603, focus detection operations are respectively performed in the plurality of divided focus detection regions, and only one result is finally derived from the plurality of focus detection results in accordance with a predetermined algorithm (e.g., a weighted average of results of the focus detection regions in which the line of sight positions are located). The flow then returns to step S601.

By the above operations, when the focus detectable range is divided into a plurality of regions and focus detection is to be performed, the focus detection region always centered on the line of sight position can be set. Therefore, an accurate focus detection result of the principal object which is observed by the photographer can be obtained.

(Ninth Embodiment)

Figure 37:
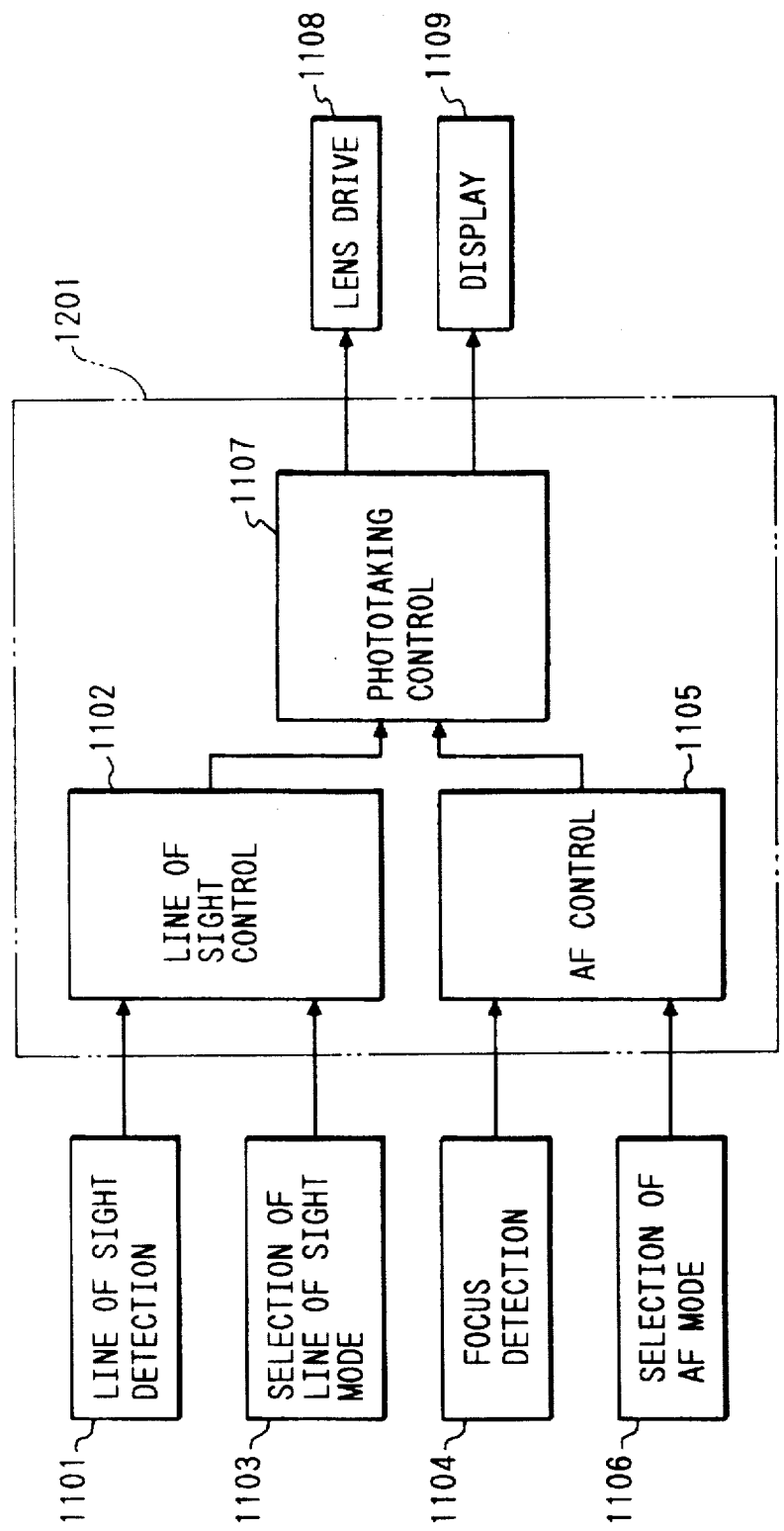
FIG. 37 is a block diagram showing a camera having a line of sight detecting device according to the ninth embodiment of the present invention.
Figure 38:
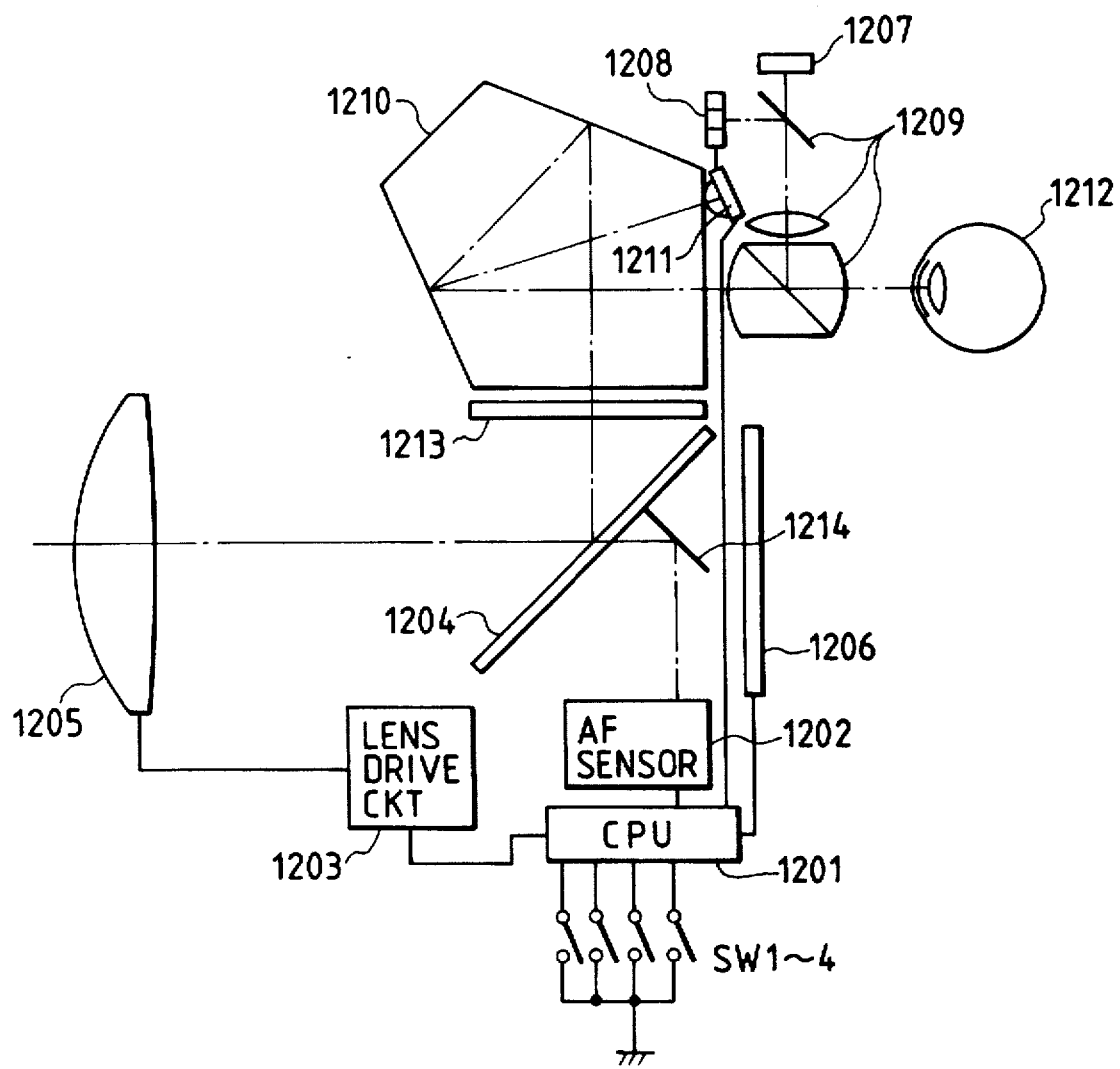
FIG. 38 is a view showing an arrangement including an optical system of the camera of the ninth embodiment.
Figure 39A:
FIGS. 39A to 39C are views for explaining the principle of line of sight detection.
Figure 39B:
Figure 39C:

FIG. 37 is a block diagram of a camera having a line of sight detecting device according to the ninth embodiment of the present invention, and FIG. 38 is a view showing an arrangement including an optical system of the camera of this embodiment.

As shown in FIG. 37, the camera having the line of sight detecting device of this embodiment comprises a line of sight detection portion 1101, and a portion 1102, having a single mode for locking a line of sight position obtained when detection results derived from several previous detection operations of the line of sight detection portion 1101 satisfy a predetermined eye-gazing condition and a continuous mode for renewing a line of sight position on the basis of a latest line of sight position from the line of sight detection portion 1101, for changing a camera phototaking state on the basis of this line of sight position.

The line of sight detection portion 1101 is a portion for performing known line of sight detection using a method of "Purkinje's image 1+Purkinje's image 4", "Purkinje's image 1+center of pupil", a "boundary of black and white regions", or the like.

If the camera is an AF camera, it further includes a portion 1103 of selection of line of sight mode for selecting at least one of EG modes, a focus detection portion 1104 for ranging an object, an AF control 1105 for controlling the focus detection portion 1104 in a plurality of ranging modes, and a portion 1106 of selection of AF mode for selecting at least one of the ranging modes of the AF control 1105.

The portion 1103 of selection of line of sight mode selects at least one of the EG modes on the basis of the selection result of the portion 1106 of selection of AF mode.

When the line of sight control 1102 and the AF control 1105 are set in a predetermined mode, a phototaking control 1107 outputs an in-focus control signal to a lens drive portion 1108 and selects an AF area closest to the line of sight position detected by the line of sight detection portion 1101 and causes a display portion (LCD) 1109 to display the selected AF area.

The above operation will be described in more detail with reference to FIG. 38. Object light passing through a phototaking lens 1205 is split by a main mirror 1204 in two directions. Light passed through the main mirror 1204 is further reflected by a submirror 1214. This light is guided to an AF detection element or sensor 1202. Light reflected by the main mirror 1204 is guided to a finder 1210, so that an object image is formed on a screen 1213.

The AF sensor 1202 has a plurality of focus detection areas. A CPU 1201 generates a lens matching signal on the basis of ranging signals detected by the plurality of focus detection areas. The CPU 1201 drives the phototaking lens 1205 through a lens drive circuit 1203. A photometering element has photometering areas corresponding to the AF areas, and the CPU 1201 generates a photometering output weighted and averaged on the basis of the line of sight position, thereby controlling the exposure time of a shutter 1206.

In this embodiment, the line of sight detection portion 1101 is incorporated in the finder 1210. The optical system for line of sight detection also serves as an optical system for the finder. An infrared ray emitted from an infrared LED 1207 is collimated by an optical system 1209 and is projected on the cornea of an eyeball 1212. The optical system 1209 includes a half mirror for splitting projected light from reflected light, a lens for focusing the reflected light on a light-receiving element 1208, and a dichroic mirror for splitting the projected light and the reflected light from light from the finder 1210. The line of sight light-receiving element 1208 comprises a two-dimensional CCD or the like and detects bright points such as Purkinje's image 1 and Purkinje's image 4.

A half depression switch SW1 is a switch which is turned on by the first stroke of the release button. A full depression switch SW2 is a switch which is turned on by the second stroke of the release button. An AF mode selection switch SW3 is a switch for switching between the AF modes. When the AF mode selection switch SW3 is ON, the AF-C mode is set. However, when the AF mode selection switch SW3 is OFF, the AF-S mode is set. The AF-S mode is a mode for inhibiting lens driving by the result of the focus detection portion 1104 once an in-focus state is established. The AF-C mode is a mode for continuously driving the lens on the basis of the latest detection result from the focus detection portion 1104. A line of sight mode selection switch SW4 is a switch for switching between the EG modes. When the switch SW4 is ON, an EG-C mode is set. However, when the switch SW4 is OFF, an EG-S mode is set. The switches SW1 to SW4 are connected to the CPU 1201.

The camera of this embodiment is controlled by the CPU 1201 in accordance with programs of the flow charts shown in FIGS. 41 to 44, FIG. 46, and the like.

Operations of this embodiment will be described mainly with reference to the flow of the CPU 1201. The main flow shown in FIG. 41 is executed when a power switch (not shown) is turned on. The CPU 1201 tests in step S1510 whether the half depression switch SW1 is ON. If YES in step S1501, the flow advances to step S1502. Otherwise, the CPU 1201 waits in a loop until the half depression switch SW1 is turned on.

A subroutine of selection of a line of sight mode in FIG. 42 is executed in step S1502. In step S1601, the CPU 1201 checks whether the AF mode selection switch SW3 is ON, i.e., whether the AF-C or AF-S mode is set. If the AF-C mode is set, the flow advances to step S1602. The AF mode is set to the AF-C mode, and the EG or line of sight mode is set in an EG-C mode. If the AF-S mode is judged, the flow advances to step S1603. In step S1603, the AF mode is set to the AF-S mode, and the line of sight mode is set to an EG-S mode.

In this embodiment, the AF modes are switched by a hard switch. However, this switching operation may be performed by software as a program stored in a memory such as a RAM, ROM, or EEPROM. When the AF mode is to be automatically switched by the focus detection portion 1104, the line of sight mode is changed in synchronism with switching between the AF modes.

Figure 48:
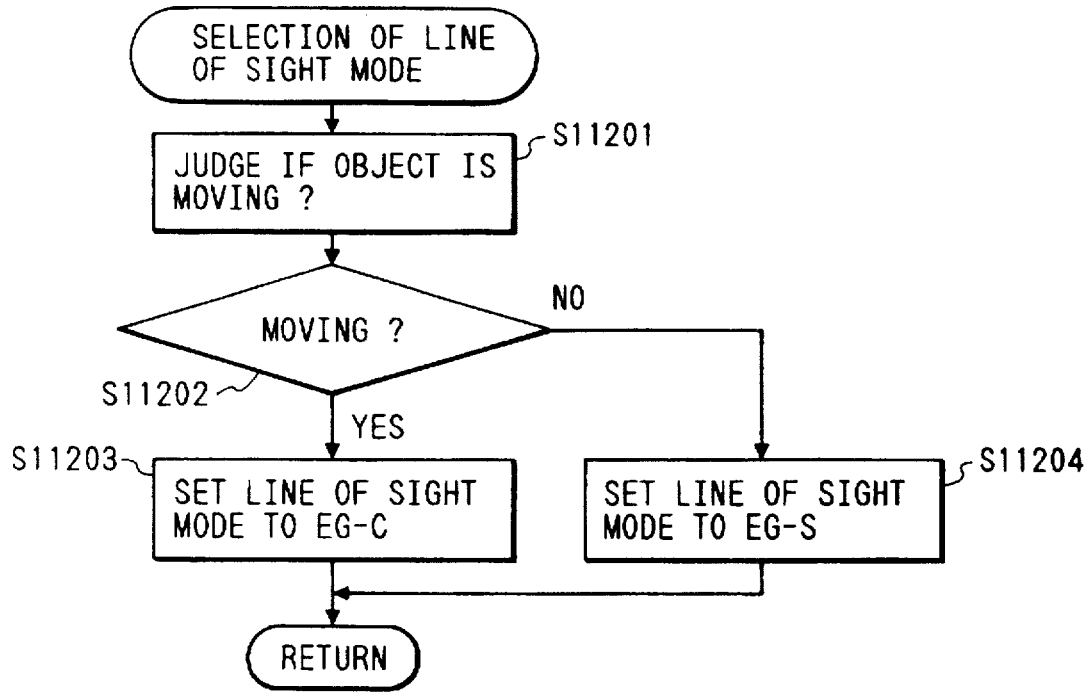
FIG. 48 is a flow chart showing a subroutine of selection of a line of sight mode according to a tenth embodiment of the present invention.

The subroutine returns to the main flow in FIG. 41, and the flow advances to step S1503. A subroutine of line of sight detection shown in FIG. 48 is executed. In step S1701, a known line of sight detection operation is performed. In this embodiment, a line of sight position is detected using Purkinje's images 1 and 4. The infrared LED as the light-emitting element 1207 of the line of sight detection portion 1101 is turned on.

The line of sight light-receiving element 1208 is constituted by a position detection element such as a two-dimensional CCD. The CPU 1201 acquires data including position data of the respective bright points. In step S1702, a line of sight position is calculated on the basis of the data from the line of sight light-receiving element 1208. Positions I1 and I4 of the centers of gravity of the respective bright points are calculated, and an eyeball rotation angle is obtained from a difference I4–I1. This embodiment exemplifies the scheme of Purkinje's images 1 and 4. However, any other line of sight detection scheme may be employed if a line of sight position can be detected.

The CPU 1201 tests in step S1703 whether the line of sight mode is the EG-S or EG-C mode. If the EG-S mode is detected, the flow advances to step S1704. However, if the EG-C mode is detected, the flow advances to step S1306. The CPU 1201 tests in step S1704 whether the line of sight position is locked in the EG-S mode. If the lock state is detected, the subroutine of line of sight detection returns to the main routine. However, if the lock state is not detected, the flow advances to step S1705. The CPU 1201 judges if an S mode lock condition is satisfied, and the flow advances to step S1706. Details of judgement of S mode lock will be described later.

In step S1706, the line of sight position is renewed to the latest line of sight position. In this case, the latest line of sight position is a line of sight position detected at a closest moment. Since an error is included in the detected line of sight position, results of the line of sight positions obtained in a plurality of previous measurements may be statistically processed, and the result may be renewed as the latest line of sight position.

Figure 44:
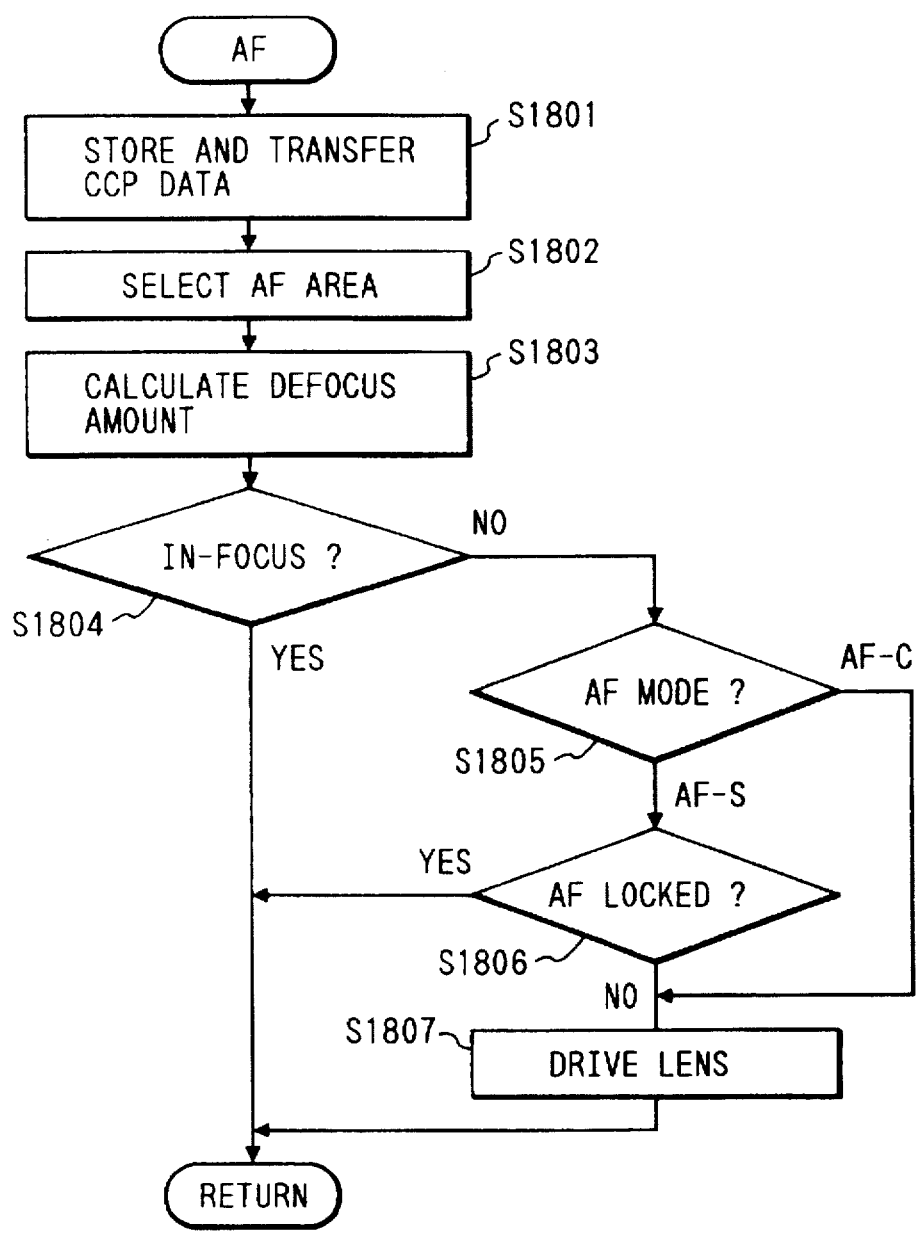
FIG. 44 is a flow chart showing an AF subroutine according to the ninth embodiment.

The flow then advances to step S1504 shown in FIG. 41 to execute an AF subroutine. The AF subroutine is shown in FIG. 44. CCD data from the AF sensor 1202 is stored and transferred in step S1801. In step S1802, an AF area closest to the line of sight position judged in the subroutine of line of sight detection is selected. In the case shown in FIG. 45, an area A1 is selected as the AF area. The AF areas consist of three areas, i.e., the area A1, an area A2, and an area A3. A mark x represents a renewed line of sight position.

In step S1803, a defocus amount of the selected AF area is calculated in accordance with a known correlation operation. In step S1804, the CPU 1201 judges whether the calculated defocus amount falls within the in-focus range. If YES in step S1804, the subroutine returns to the main routine. However, if NO in step S1804, the flow advances to step S1805. The CPU 1201 tests in step S1805 whether the AF mode is the AF-S or AF-C mode. If the AF-C mode is detected, the flow advances to step S1807. However, if the AF-S mode is detected, the flow advances to step S1806.

The CPU 1201 tests in step S1806 whether the AF lock is set. If YES in step S1806, lens driving is not performed, and the subroutine returns to the main routine. If the AF lock is not detected, the flow advances to step S1807, and the phototaking lens 1205 is driven through the lens drive circuit 1203 by a necessary amount. Once an in-focus state is detected, the AF-S mode serves as a mode for locking the phototaking lens. The AF-C mode is a mode for continuously driving the phototaking lens in accordance with the latest defocus amount.

The flow advances to step S1505 in the main flow of FIG. 41 to calculate a metered value obtained when detection is concentrated on the selected AF area position. For example, in the case of FIG. 45, a metered value weighted and averaged in an AE area corresponding to the AF area A1 may be calculated, or spot photometering using only the metered value of the AE area corresponding to the AF area A1 may be performed to calculate a metered value.

The CPU 1201 tests in step S1506 whether the release button is fully depressed (i.e., whether the full depression switch SW2 is ON). If YES in step S1506, the flow advances to step S1507 to perform a mirror-up operation, a shutter traveling operation, a film winding operation, and the like. The flow then returns to step S1501. However, if NO in step S1506, i.e., when the full depression switch SW2 is OFF, the flow returns to step S1501 without performing any operation. Subsequently, this cycle will be repeated.

Figure 46:
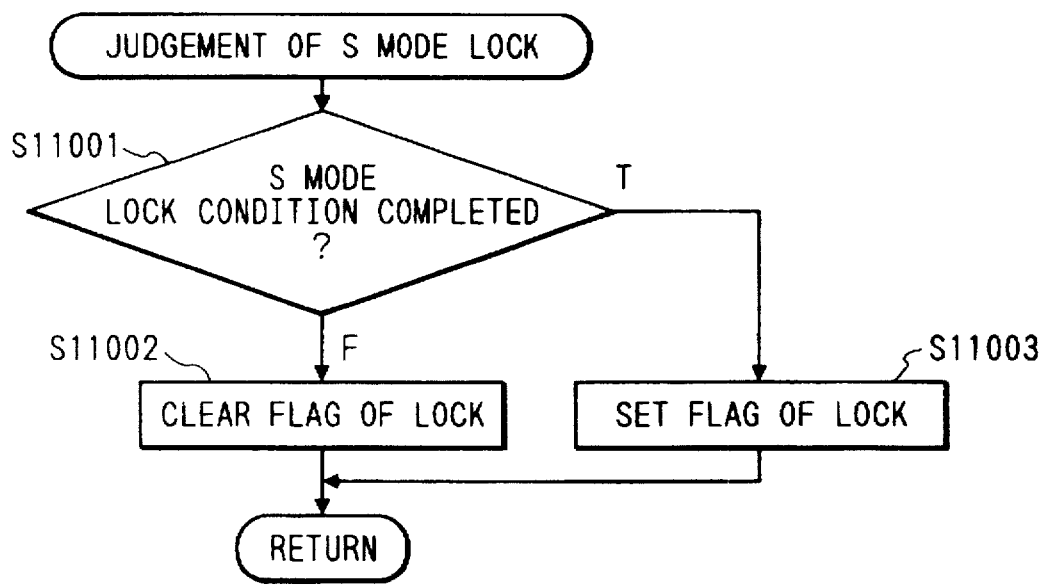
FIG. 46 is a flow chart showing a subroutine of judgement of an S mode lock according to the ninth embodiment.

The above-described judgement of the S mode lock will be described with reference to FIGS. 46 and 47. In a subroutine of judgement of S mode lock shown in FIG. 46, the CPU 1201 tests in step S11001 whether the S mode lock condition is established. If YES in step S11001, the flow advances to step S11003 to set a flag of lock. However, if NO in step S11001, the flow advances to step S11002 to clear the flag of lock. S mode lock conditions are shown in Table 1.

TABLE 1

(S Mode Lock Conditions)

| First Condition: | the distance between the previous line of sight position and the current line of sight position is equal to or less than a predetermined value. |
|---|---|
| Second Condition: | the difference between the previous eyeball rotation angle and the current eyeball rotation angle is equal to or less than a predetermined value. |
| Third Condition: | the moving speed of the line of sight position is equal to or less than a predetermined value. |
| Fourth Condition: | the first to third condition are established for a predetermined time or more. |

The first condition will be described with reference to FIG. 47. FIG. 47 shows a latest line of sight position $SP_n$, a previous line of sight position $SP_{(n-1)}$, and an mth previous line of sight position $SP_{(n-m)}$. $SP_{(n)}$ represents a coordinate position on the screen 1213 of the camera.

If the following conditions are established:

$$SP_{(n-3)}-SP_{(n-4)}, SP_{(n-2)}-SP_{(n-3)} > L,$$

and $$SP_{(n-1)}-SP_{(n-2)}, SP_{(n)}-SP_{(n-1)} \leq L,$$

the line of sight positions are not locked until the (n−2)th line of sight position, and the (n−1)th line of sight position is locked.

In this case, when a predetermined value L is extremely small, locking cannot be performed due to a small voluntary movement (even if a man is gazing at one point, the eyeball slightly oscillates around the eye-gazing point). The predetermined value L is preferably slightly larger than a value corresponding to the oscillation amount of the eyeball which is caused by a small voluntary movement.

The second condition is derived such that the distance between the two points in judgement of the first condition is replaced with the difference between two eyeball rotation angles. Note that since the predetermined value L depends on the sampling time of line of sight detection, the third condition is derived as a condition normalized by a time interval.

More specifically, when condition $(SP_{(n)}-SP_{(n-1)})/T_{(n)} < LS$, where $T_{(n)}$ is the time interval from the previous line of sight detection to the current line of sight detection, is established, the line of sight position is locked. This time interval is measured by a timer incorporated in the CPU 1201. The predetermined value LS preferably falls within the range of about 3° to 10°/sec and normally about 5°/sec. A necessary eyeball rotation angle required to observe a view (24×36 mm) of a finder of a single-lens reflex camera is generally ±15°.

The fourth condition is derived when the line of sight position is locked for the first time when the first, second, and third conditions are satisfied for the predetermined time or more. The above description has been summarized in Table 1 as described above.

(Tenth Embodiment)

FIG. 48 is a flow chart showing a subroutine of selection of a line of sight mode according to the tenth embodiment of the present invention. The tenth embodiment exemplifies switching of an AF mode on the basis of a result of a moving object judging portion for judging whether the object is moving on the basis of a plurality of previous focus detection results. When the object is judged as a moving object, this object is probably moving in the viewfield, and a possibility of a change in AF area in which the object is located is high. For this reason, when the line of sight mode is set in an EG-S mode, the photographer may miss a photo opportunity. The portion 1103 of selection of line of sight mode is arranged, as shown in FIG. 48.

In step S11201, moving object judgement known in U.S. Ser No. 350,463 is performed. If it is judged in step S11203 that the object is moving, the flow advances to step S11203. If NO in step S11202, the flow advances to step S11204. In step S11203, the line of sight mode is set to the EG-C mode. In step S11204, the line of sight mode is set to be the EG-S mode. When the line of sight modes are set in steps S11203 and S11204, the flow returns to the main routine.

Figure 45:
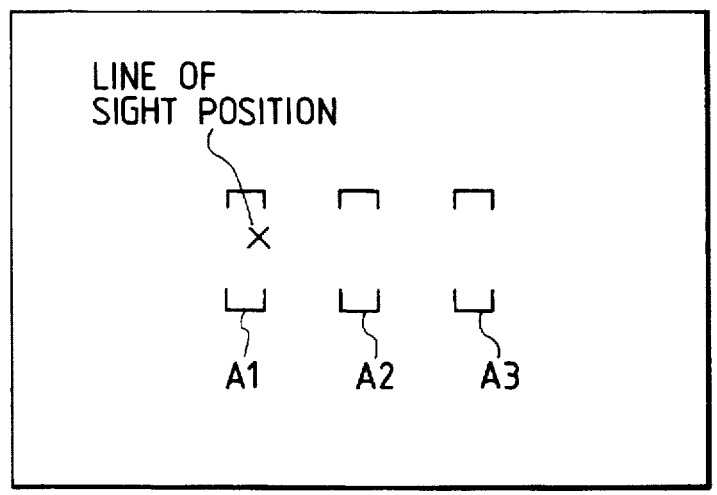
FIG. 45 is a view for explaining AF area selection according to the ninth embodiment.

Since whether the object is moving cannot be judged unless a ranging area is established and focus detection is performed, moving object judgement is performed using the area A2 in FIG. 45 as the default. This setting may be performed using an operation member in advance. Alternatively, the first line of sight mode may be the EG-S mode or may be initially set by an external operation member.

(Eleventh Embodiment)

The eleventh embodiment will be described with reference to FIG. 49. This embodiment has a multimode (EG-M mode) for locking a line of sight position as a line of sight mode until an eye-gazing position is obtained. In the EG-S mode, once an eye-gazing position is obtained, the line of sight position is fixed. However, the EG-M mode is different from the EG-S mode in that when a new eye-gazing position is obtained, the line of sight position is moved to this eye-gazing position. The difference between the EG-M mode and the EG-C mode is that when the eye-gazing position is largely moved, the line of sight movement is judged as a continuous movement in the EG-C mode while the line of sight movement is judged as a jump in the EG-M mode.

Figure 49:
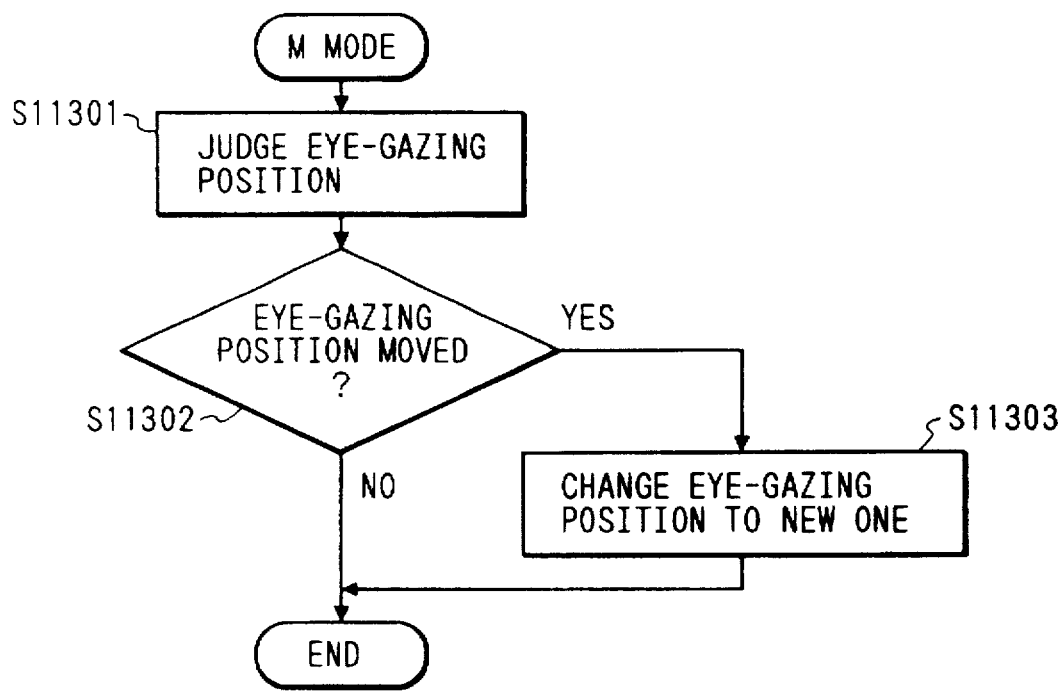
FIG. 49 is a flow chart for explaining multimode operations according to the eleventh embodiment of the present invention.

FIG. 49 is a flow chart for explaining operations in the multimode of the eleventh embodiment shown. It is judged in step S11301 whether an eye-gazing position is detected. This judgement of the eye-gazing position employs the same method as in the judgement of the S mode lock, and a detailed description thereof will be omitted. In step S11302, the presence/absence of movement of the eye-gazing position is judged. If the eye-gazing position is moved, the flow advances to step S11303. In step S11303, the line of sight position is renewed.

In step S11302, when movement of eye-gazing position is not detected or a new eye-gazing position is not obtained, the flow advances to step S11304 to fix the line of sight position. Excluding some exceptions, the eye-gazing position is always renewed as described above.

Figure 50:
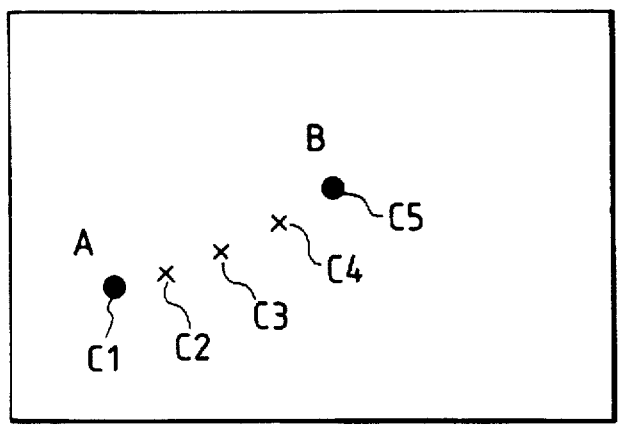
FIG. 50 is a plan view showing a state of a line of sight position movement in each mode according to the eleventh embodiment.

FIG. 50 is a plan view showing a state of the line of sight movement corresponding to each mode of this embodiment. In this case, the first eye-gazing position is defined as a point A, and a line of sight position is defined as a point B. In the EG-S mode, the line of sight position is kept fixed at a position C1. In the EG-C mode, the line of sight position is changed in an order of C1, C2, C3, C4, and C5. In the EG-M mode, the line of sight position jumps from C1 to C5. In this embodiment, when the AF mode is judged as the AF-C mode, the line of sight mode is set as the EG-C mode but can be changed to the EG-M mode. In this manner, a blink and an unnecessary movement of the eye-gazing position are not loaded, to improve the processing capability.

(Twelfth Embodiment)

Figure 51:
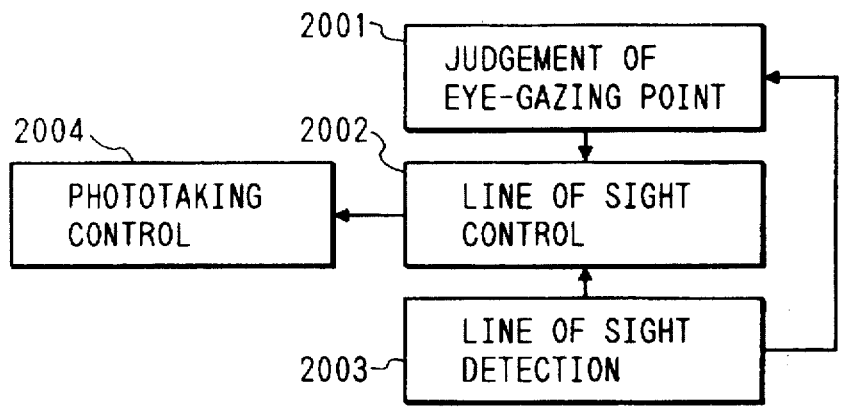
FIG. 51 is a block diagram of an arrangement according to the twelfth to sixteenth embodiments of the present invention.

FIG. 51 is a block diagram showing the twelfth embodiment of the present invention. A line of sight detection portion 2003 detects a latest line of sight position. A portion 2001 of judgement of eye-gazing position judges an eye-gazing position on the basis of the line of sight positions of a plurality of previous detection operations of the line of sight detection portion 2003. A line of sight control 2002 calculates a line of sight position for control for controlling a phototaking control 2004 on the basis of the result of the portion 2001 of judgement of eye-gazing position. The phototaking control 2004 performs phototaking control on the basis of the line of sight position for control calculated by the line of sight control 2002. The phototaking control 2004 is used to select a necessary AF area from a plurality of AF areas and judges a multi-AE weighting coefficient.

Figure 52:
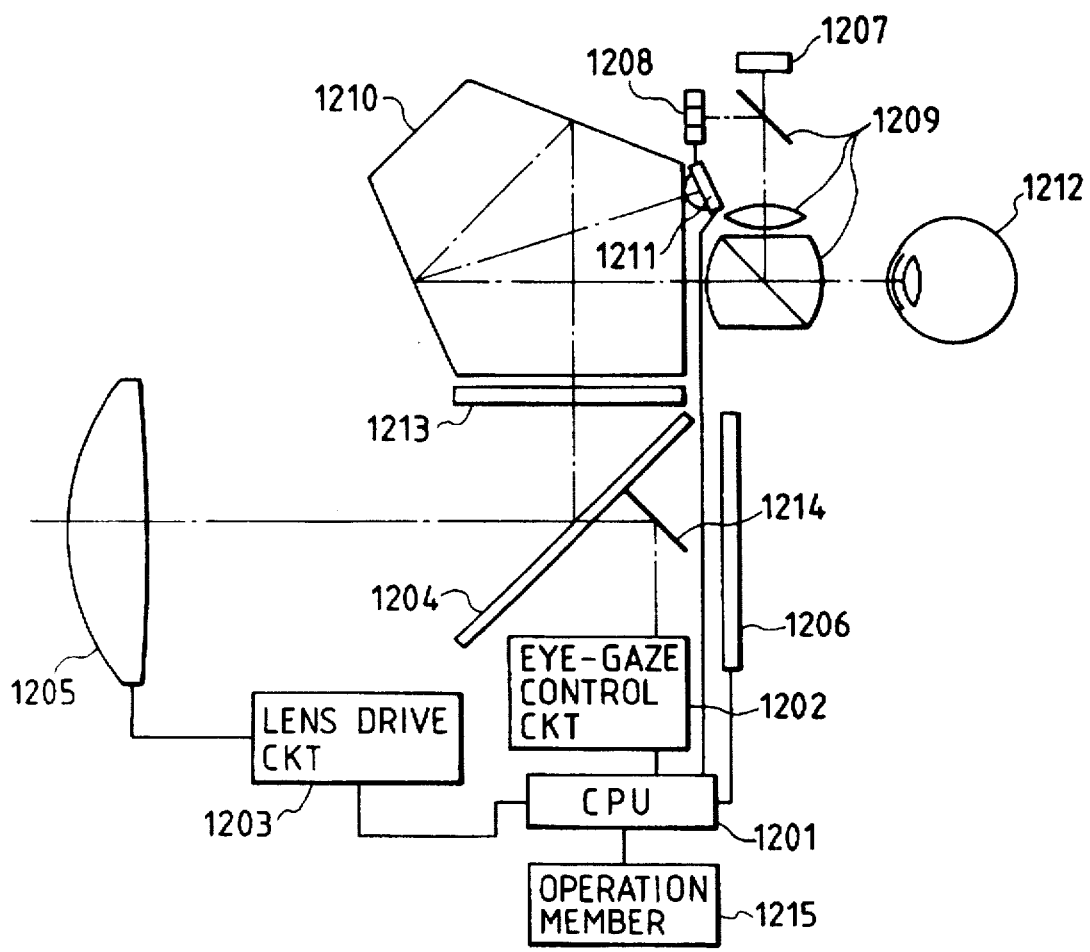
FIG. 52 is a view showing an arrangement of the twelfth to sixteenth embodiments.

An arrangement of the twelfth embodiment will be described with reference to FIG. 52. Object light passing through a phototaking lens 1205 is split by a main mirror 1204 in two directions. Light passed through the main mirror 1204 is further reflected by a submirror 1214. This light is guided to an AF sensor 1202. Light reflected by the main mirror 1204 is guided to a finder 1210, so that an object image is formed on a screen 1213. The AF sensor 1202 has a plurality of focus detection areas. A CPU 1201 generates a lens matching signal on the basis of ranging signals detected by the plurality of focus detection areas. The CPU 1201 drives the phototaking lens 1205 through a lens drive circuit 1203. An AE light-receiving element 1211 has photometering areas corresponding to the AF areas, and the CPU 1201 generates a photometering output weighted and averaged on the basis of the line of sight position, thereby controlling the exposure time of a shutter 1206.

An operation member 1215 has a plurality of switches (not shown). A switch SW1 (to be referred to as a half depression switch hereinafter) is turned on by the first stroke of a release button (not shown). A switch SW2 (to be referred to as a full depression switch hereinafter) is turned on by the second stroke of the release button. An AF mode selection switch SW3 is a switch for switching between the AF modes. When the AF mode selection switch SW3 is ON, the AF-C mode is set. However, when the AF mode selection switch SW3 is OFF, the AF-S mode is selected. The camera of this embodiment is controlled by the CPU 1201 in accordance with programs represented by flow charts in FIG. 53 and the like.

Figure 53:
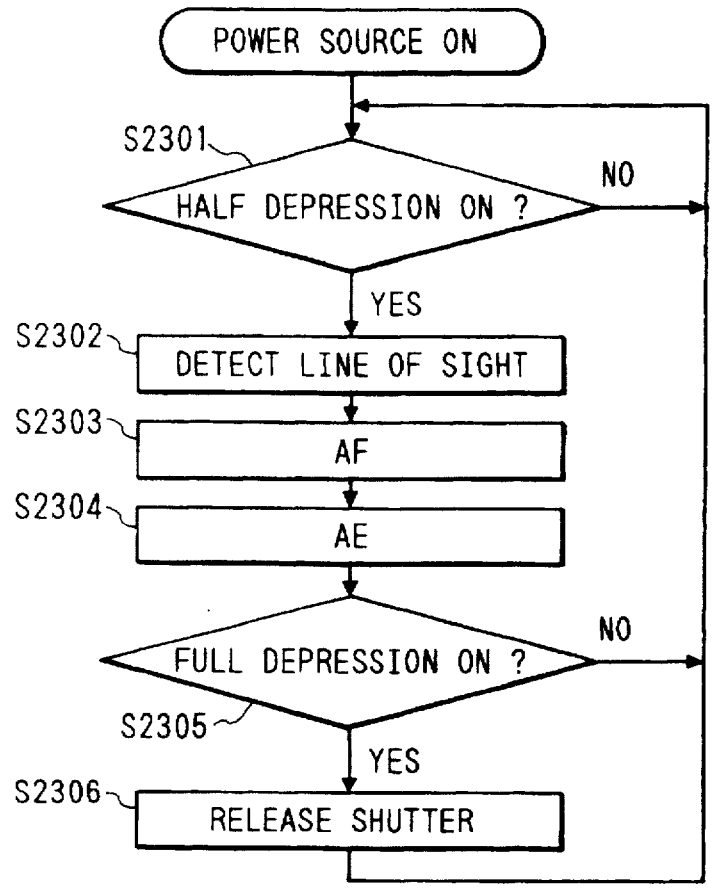
FIG. 53 is a flow chart showing a main flow of the twelfth embodiment.

Operations of this embodiment will be described centered on the flow of the CPU 1201. The main flow in FIG. 53 is executed when a power switch (not shown) is turned on. The CPU 1201 tests in step S2301 whether the half depression switch SW1 is ON. If YES in step S2301, the flow advances to step S2302. However, if NO in step S2301, the CPU 1201 waits in a loop until the switch SW1 is turned on.

Figure 54:
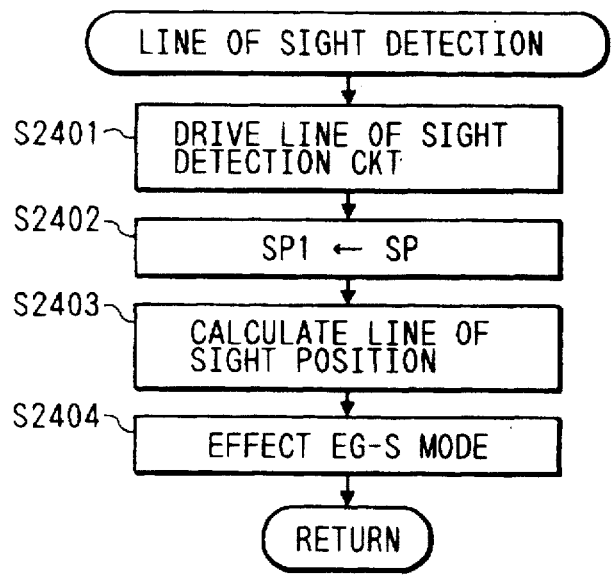
FIG. 54 is a flow chart showing a subroutine of line of sight detection controlled in an EG-S mode.

In step S2302, a subroutine of line of sight detection is executed. The subroutine of line of sight detection will be described with reference to FIG. 54. known line of sight detection operation is performed in step S2401 in FIG. 54. In this embodiment, a line of sight position is detected using Purkinje's images 1 and 4. An infrared LED as a light-emitting element 1207 in the line of sight detection portion 2003 is turned on. A line of sight light-receiving element 1208 is constituted by a two-dimensional CCD and the like. The CPU 1201 fetches data including position data of the respective bright points. The previously detected line of sight position is stored at $SP_1$ in step S2402. In this case, $SP_1$ represents a two-dimensional coordinate position of the screen 1213 having the center of the previous line of sight position on the screen as the origin. That is, $SP_1=(x_1,y_1)$.

In step S2403, a line of sight position is calculated on the basis of the data obtained by the line of sight detection portion 2003 and is stored in SP{=(x,y)}. More specifically, positions I1 and I4 of the centers of gravity of the respective bright points are calculated, and an eyeball rotation angle is obtained from a difference I4−I1. The coordinate position of an eye-gazing position of the photographer on the screen 1213 is obtained from the eyeball rotation angle. In this embodiment, a scheme using the Purkinje's images 1 and 4 has been exemplified. However, any other line of sight detection scheme may be employed if a line of sight position can be detected. In step S2404, a subroutine of an EG-S mode for locking the line of sight position at the first eye-gazing position detected upon the start of the line of sight detection is executed. When this subroutine is completed, a line of sight position (to be referred to as a line of sight position for control hereinafter) used as a variable EP for changing the camera control state in accordance with the line of sight is output. The variable EP represents a two-dimensional coordinate position $(EP=(x_e,y_e))$ on the screen as in the SP and $SP_1$. The details of the subroutine of the EG-S mode will be described later. When the subroutine of line of sight detection is completed, an AF subroutine in step S2303 is executed.

In step S2303, an AF area is determined on the basis of the variable EP representing the line of sight position for control and output in the subroutine of line of sight detection. Lens driving is performed on the basis of a ranging result of the determined AF area. This subroutine is shown in FIG. 44. In step S1801, data from the AF sensor 1202 is stored, transferred, and A/D-converted. In step S1802, an AF area closest to the line of sight position for control determined in the subroutine of line of sight detection is selected. In the case of FIG. 45, an area A1 is selected as the AF area. The AF areas consist of areas A1 to A3, and a mark x represents the line of sight position for control represented by the variable EP. In step S1803, a defocus amount of the selected AF area is calculated by a known correlation operation. The CPU 1201 judges in step S1804 whether the calculated defocus amount falls within an in-focus range. If YES in step S1804, the subroutine directly returns to the main flow. However, if NO in step S1804, the flow advances to step S1805. The CPU 1201 judges in step S1805 whether the AF mode is an AF-S or AF-C mode. If the AF-C mode is detected, the flow advances to step S1807. However, if the AF-S mode is detected, the flow advances to step S1806. The CPU 1201 tests in step S1806 whether the AF lock mode is set. If YES in step S1806, lens driving-is not performed, and the subroutine directly returns to the main flow. However, when the AF lock mode is not set, the flow advances to step S1807, and the lens is driven by a necessary amount.

The flow advances to step S2304 to calculate a metered value of mainly the selected AF area position. In the case of FIG. 45, a metered value weighted and averaged in the AE area corresponding to the AF area A1 may be calculated, or spot photometering using only the metered value of the AE area corresponding to the AF area A1 may be performed to calculate a metered value. The CPU 1201 judges in step S2305 whether the release button is fully depressed. If YES in step S2305, the flow advances to step S2306 to perform a mirror-up operation, a shutter traveling operation, and a film winding operation. The flow then returns to step S2301. If NO in step S2305, no operation is performed, and the flow directly return to step S2301. Thereafter, this cycle is repeated. The general flow of this embodiment has been described above.

Figure 55:
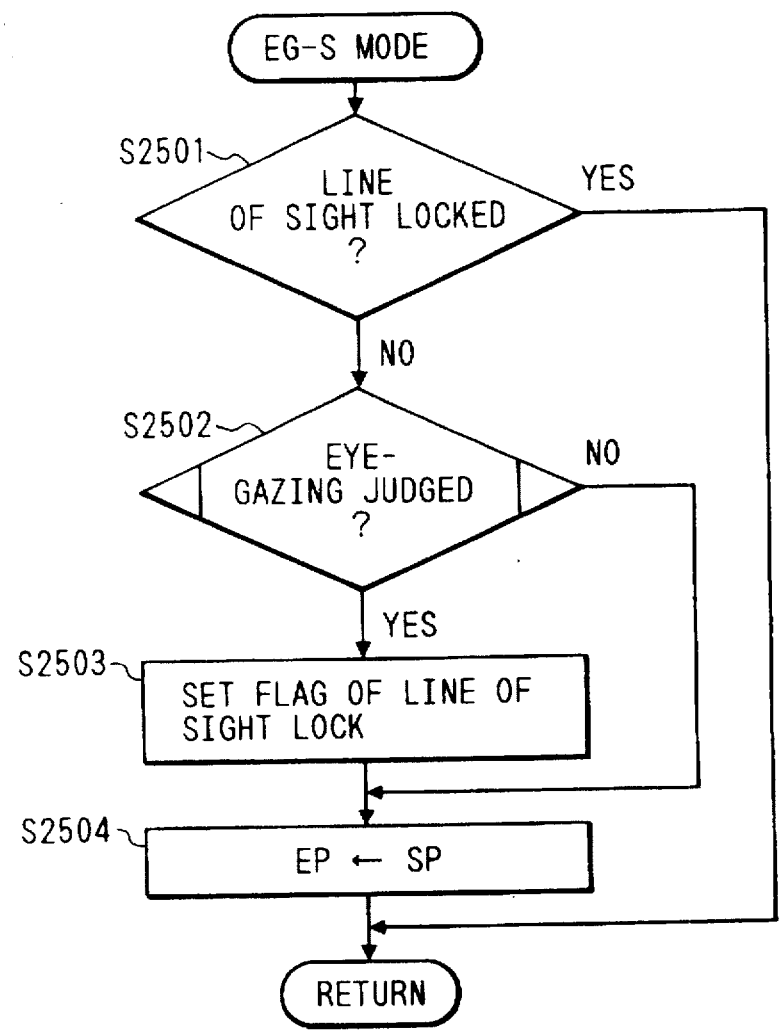
FIG. 55 is a flow chart showing a subroutine of the EG-S mode.
Figure 56:
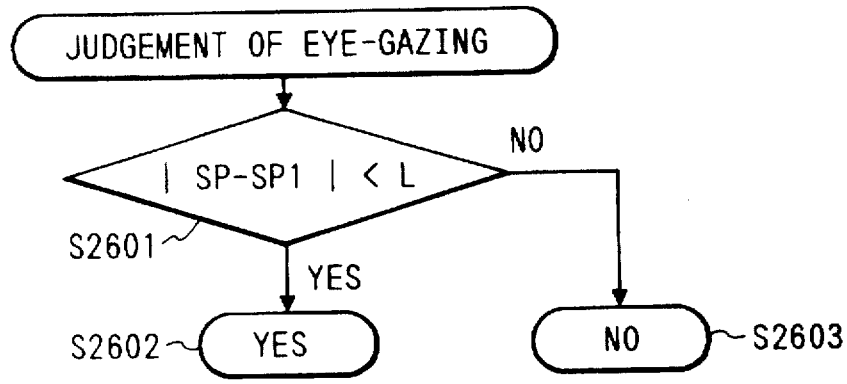
FIG. 56 is a flow chart showing a subroutine of judgement of eye-gazing according to the twelfth embodiment.

The flow of the EG-S mode as one of the line of sight control modes will be described with reference to FIG. 55. The EG-S mode is a mode for fixing a line of sight position for control to the first eye-gazing position upon half depression. The CPU 1201 judges in step S2501 whether the current line of sight position for control is locked. If YES in step S2501, the subroutine of the EG-S mode returns to the main flow, and the line of sight position for control is not renewed. If the line of sight position for control is not locked, the flow advances to step S2502 to execute a subroutine of judgement of line of sight position for judging whether the line of sight of the photographer is eye-gazed. If YES in step S2502, the flow advances to step S2503 to set a flag of line of sight lock. However, if NO in step S2502, the flow advances to step S2504. In step S2504, the latest line of sight position is set in the variable EP representing the line of sight position for control. The subroutine of the EG-S mode is completed. A subroutine of judgement of the eye-gazing position shown in FIG. 56 will be described below. The CPU 1201 judges in step S2601 whether the absolute value of the difference between the variable SP, representing the previous line of sight position and the variable SP representing the current line of sight position is smaller than a predetermined value L. If YES in step S2601, the CPU 1201 judges that the eyeball of the photographer is set in the eye-gazing position. In this case, the flow advances to step S2602. Otherwise, since the eyeball of the photographer is not set in the eye-gazing position, the flow advances to step S2603. By judging whether the absolute value of the difference (to be referred to as the amount of line of sight movement hereinafter) between the previous and current line of sight positions is larger or smaller than the predetermined value, whether the line of sight position for control is to be renewed is judged. |SP–SP$_1$| (where || represents the absolute value) is represented by the following equation:

$$|SP-SP_1|=((x-x_1)^2+(y-y_1)^2)^{1/2}.$$

Figure 47:
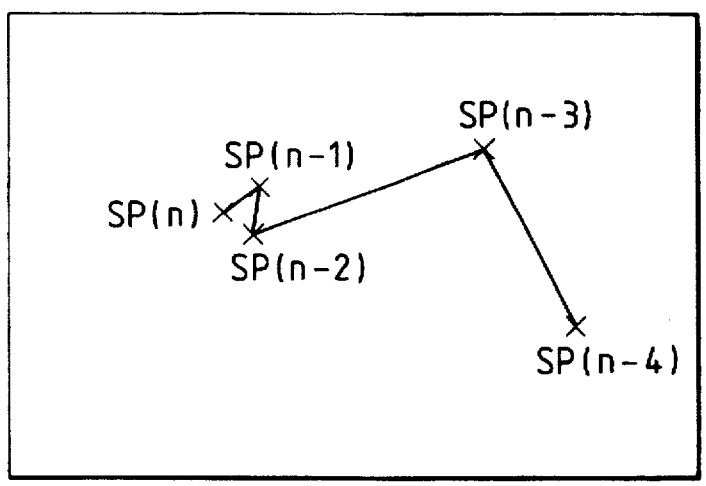
FIG. 47 is a view for explaining an S mode lock condition according to the ninth embodiment.

A change in line of sight position for control upon movement of a line of sight as shown in FIG. 47 in the EG-S mode will be described below. FIG. 47 shows a latest line of sight position SP$_n$, a previous line of sight position SP$_{(n-1)}$, and an mth previous line of sight position SP$_{(n-m)}$. SP$_{(n)}$ represents a coordinate position on the finder screen of the camera. If the following conditions are established:

$$SP_{(n-3)}-SP_{(n-4)}, SP_{(n-2)}-SP_{(n-3)}>L,$$

and $$SP_{(n-1)}-SP_{(n-2)}, SP_{(n)}-SP_{(n-1)}\leq L,$$

the line of sight positions are not locked until the (n–2)th line of sight position for control, and the (n–1)th line of sight position for control is locked. In this case, when a predetermined value L is extremely small, locking cannot be performed due to a small voluntary movement (even if a man is gazing at one point, the eyeball slightly oscillates around the eye-gazing point). The predetermined value L is preferably slightly larger than a value corresponding to the oscillation amount of the eyeball which is caused by a small voluntary movement. The variables SP$_1$ and SP are represented by the coordinate positions on the screen, but may be represented by eyeball rotation angles.

(Thirteenth Embodiment)

Figure 57:
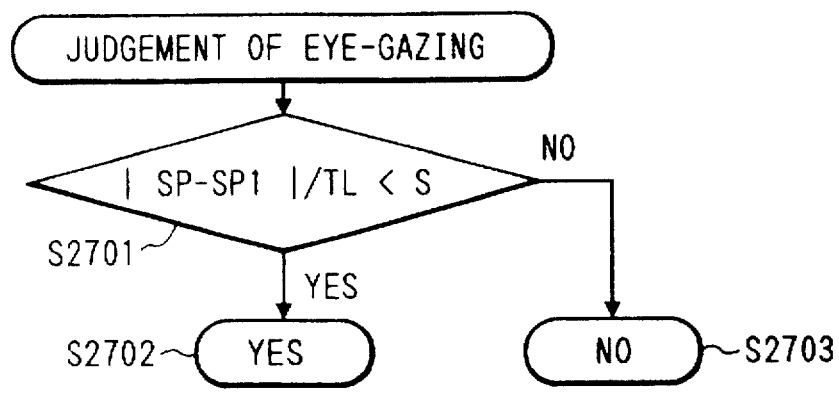
FIG. 57 is a flow chart showing a subroutine of eye-gazing according to the thirteenth embodiment.

The thirteenth embodiment exemplifies an improvement for judging with higher precision whether an eyeball of a photographer is located at an eye-gazing position. The thirteenth embodiment is different from the twelfth embodiment except for a subroutine of judgement of the line of sight position, and a description of other subroutines will be omitted. The subroutine of judgement of the line of sight position is shown in FIG. 57. In order to judge an eye-gazing position, the moving speed of the line of sight is calculated. If the calculated moving speed value is smaller than a predetermined value S, the CPU 1201 judges that the eyeball of the photographer is set in an eye-gazing position. In the twelfth embodiment, if the detection interval in line of sight detection is substantially constant, a moving amount proportional to the speed of the line of sight movement can be calculated. When the detection interval greatly varies, the amount of movement becomes small when the detection interval is reduced. As a result, an eye-gazing position is erroneously detected. In the thirteenth embodiment, however, more accurate eye-gazing position detection can be performed. In step S2701, the absolute value of the difference between a current line of sight position SP and a previous line of sight position SP$_1$ is divided by this time interval to calculate a speed of the line of sight movement. The calculated speed of the line of sight movement is judged whether to be smaller than the predetermined value S. If the calculated speed value is smaller than the predetermined value S, the CPU 1201 judges that the eyeball of the photographer is set in the eye-gazing position, and the flow advances to step S2702. Otherwise, the CPU 1201 judges that the eyeball of the photographer is not set in the eye-gazing position, and the flow advances to step S2703.

(Fourteenth Embodiment)

Figure 58:
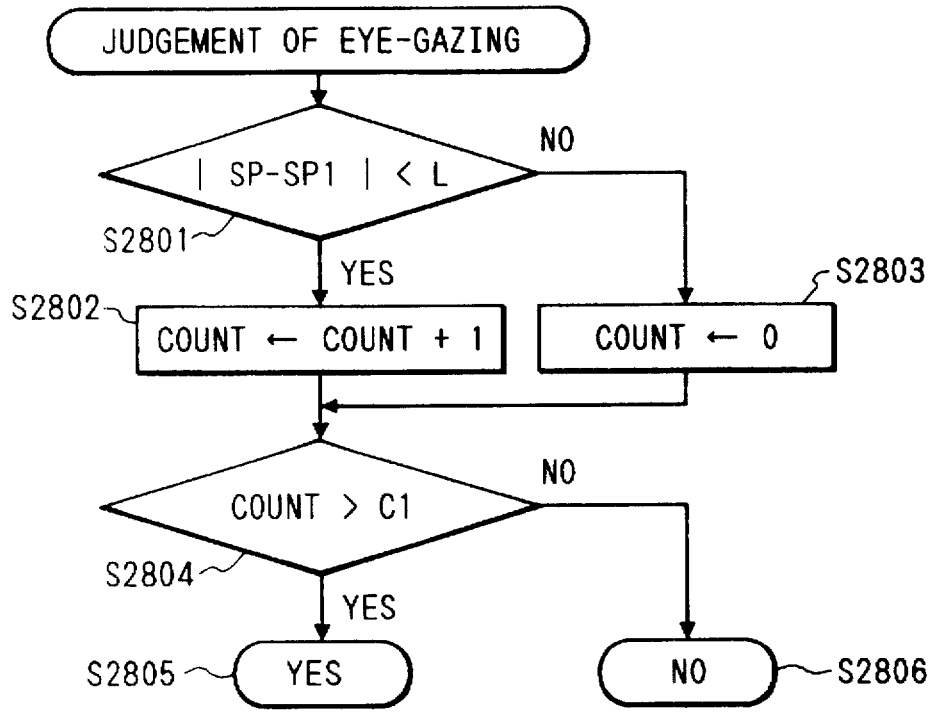
FIG. 58 is a flow chart showing a subroutine of eye-gazing according to the fourteenth embodiment.

The fourteenth embodiment using another subroutine of judgement of eye-gazing will be described with reference to FIG. 58. In this embodiment, a CPU 1201 judges eye-gazing when an amount of line of sight movement which is smaller than a predetermined value is detected by a predetermined number of times or more. The CPU 1201 judges in step S2801 whether the amount of line of sight movement is smaller than a predetermined value L. If YES in step S2801, the flow advances to step S2802. Otherwise, the flow advances to step S2803. The value of a counter Count for counting the number of times in which the amount of line of sight movement is smaller than the predetermined value is incremented by one, and the flow advances to step S2804. In step S2803, since the line of sight is moving, the counter Count is cleared to zero, and the flow advances to step S2804. The CPU 1201 judges in step S2804 whether the number of times in which the amount of line of sight movement is smaller than the predetermined value is larger than a predetermined value C1. If YES in step S2804, eye-gazing is detected, and the flow advances to step S2805. However, if NO in step S2804, eye-gazing is not detected, and the flow advances to step S2806. The photographer generally gazes at a more important object for a longer period of time than that for a less important object although the photographer gazes at both these objects. Therefore, locking at a line of sight position for control which is less important can be prevented.

(Fifteenth Embodiment)

Figure 59:
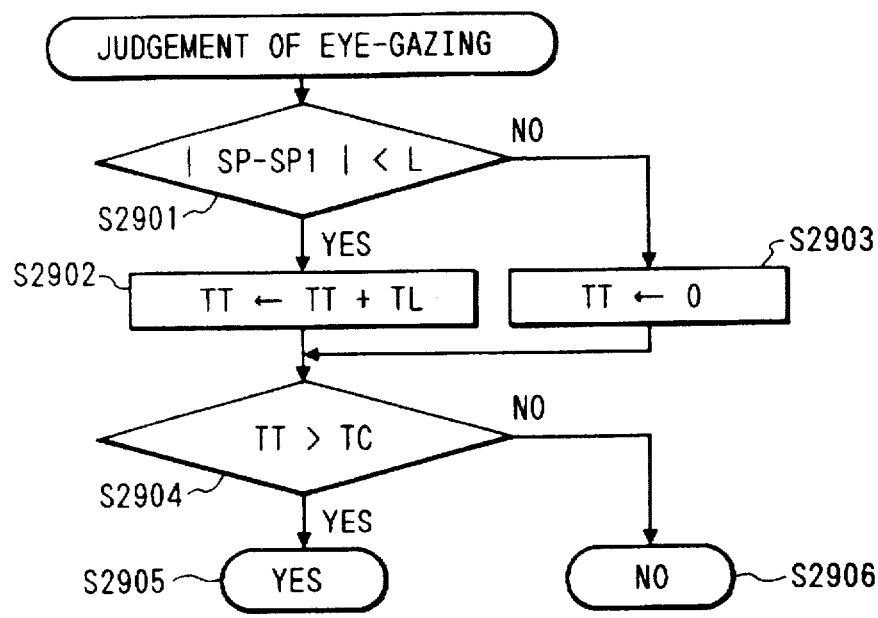
FIG. 59 is a flow chart showing a subroutine of eye-gazing according to the fifteenth embodiment.

The fifteenth embodiment exemplifies judgement using not the number of times but a sum of detection intervals when the detection interval in line of sight detection varies, although the number of times is counted in the fourteenth embodiment. FIG. 59 shows a subroutine of judgement of eye-gazing according to the fifteenth embodiment. A CPU 1201 judges in step S2901 whether the amount of line of sight movement is smaller than a predetermined value L. If YES in step S2901, the flow advances to step S2902 to add a current detection interval TL to an eye-gazing time TT and store the sum. The flow then advances to step S2904. However, if NO in step S2901, the flow advances to step S2903 to clear the eye-gazing time TT. The flow similarly advances to step S2904. The CPU 1201 judges in step S2904 whether the eye-gazing time TT is longer than a predetermined time TC. If YES in step S2904, eye-gazing is detected, and the flow advances to step S2905. Otherwise, eye-gazing is not detected, and the flow advances to step S2906.

(Sixteenth Embodiment)

Figure 60:
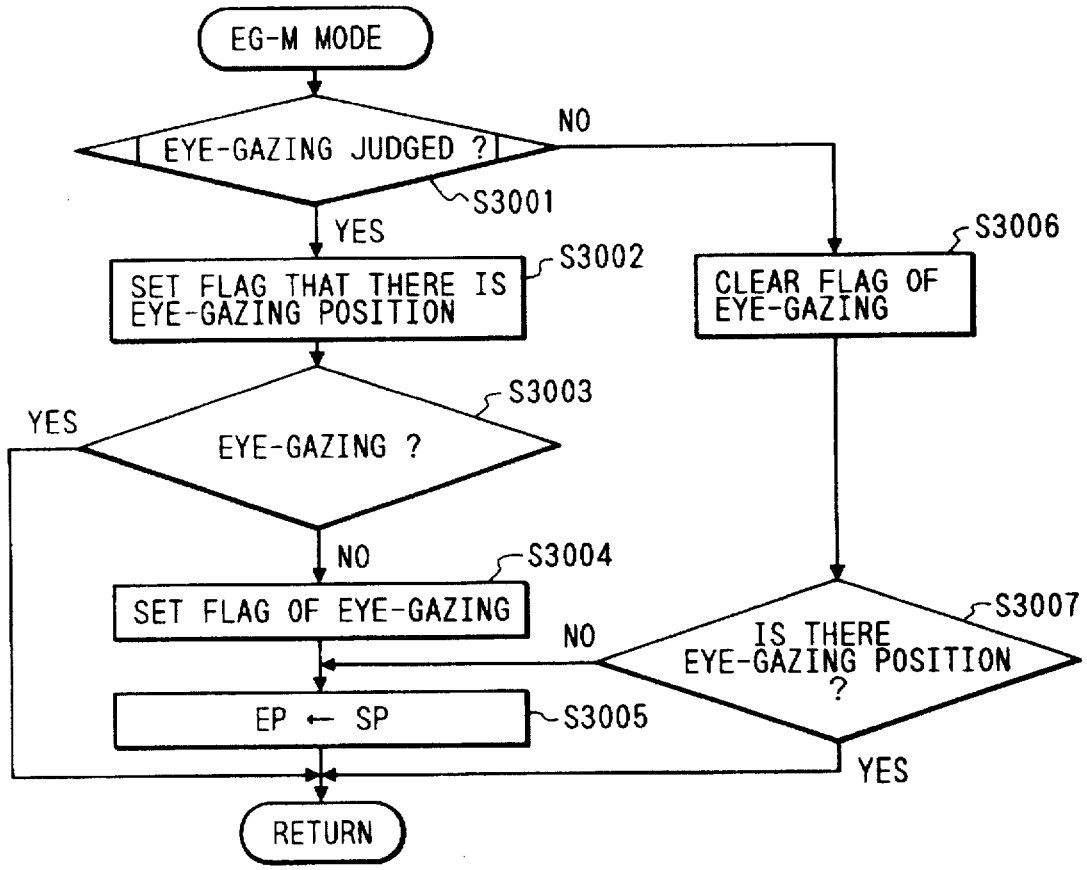
FIG. 60 is a flow chart showing a subroutine of an EG-M mode.

In the twelfth to fifteenth embodiments, once eye-gazing is judged, a line of sight mode for fixing a line of sight position for control is fixed in the subsequent operations. However, when the position of a principal object frequently moves, half depression is required to move the line of sight position for control. In the sixteenth embodiment; once an eye-gazing position is detected, the line of sight position for control is fixed to this position. However, when a new eye-gazing position is found, the line of sight position for control is moved to this new eye-gazing position, thus controlling the line of sight mode in an EG-M mode. This embodiment can be realized by replacing the subroutine of the EG-S mode in step S2404 of FIG. 54 with a subroutine of an EG-M mode in FIG. 60. The subroutine in FIG. 60 will be described below. This subroutine is the subroutine of an EG-M mode. When eye-gazing is detected in the subroutine of judgement of eye-gazing in step S3001, the flow advances to step S3002. If no eye-gazing is detected, the flow advances to step S3003. The subroutine of judgement of eye-gazing is one of the subroutines in FIGS. 56 to 59. In step S3002, a flag of eye-gazing representing that the first eye-gazing position is found is set. A CPU 1201 judges in step S3003 whether the previous eye-gazing position is detected. If YES in step S3003, the subroutine directly returns to the main flow or main routine. If NO in step S3003, the flow advances to step S3004. Since eye-gazing is judged in judgement of eye-gazing, the flag of eye-gazing is set in step S3004. In step S3005, a current line of sight position SP is set as a line of sight position EP for control.

Since eye-gazing is not judged in judgement of eye-gazing, the flag of eye-gazing is cleared in step S3006. The CPU 1201 judges in step S3007 whether the first eye-gazing position is found. If NO in step S3007, the flow advances to step S3005, and renewing is performed at the current line of sight position SP. If the first eye-gazing position has already been found, the subroutine directly returns to the main routine. In this embodiment, until the first eye-gazing position is found, the line of sight position EP for control is renewed at the latest line of sight position SP. As a modification, initialization may be performed so that the first eye-gazing position is always set to be the central position. For the first half depression, an operation of EP←0(=0.0) is performed, and the flag of eye-gazing is set. Renewing of the line of sight position for control in the EG-S mode, the EG-M mode, and a conventional line of sight mode (to be referred to as an EG-C mode hereinafter) for renewing a line of sight position for control by the detected latest line of sight position is shown in FIG. 50. In this embodiment, assume that a photographer first gazes at a point A and then a point B. In the EG-C mode, the line of sight position for control is renewed in an order of C1, C2, C3, C4, and C5. In the EG-S mode, once the line of sight position for control is fixed at the position C1, the line of sight position for control is no longer renewed. However, in the EG-M mode, once the line of sight position for control is fixed at the position C1 and the photographer gazes at the point B, the line of sight position for control is moved to the position C5 and fixed at this position.

(Seventeenth Embodiment)

Figure 61:
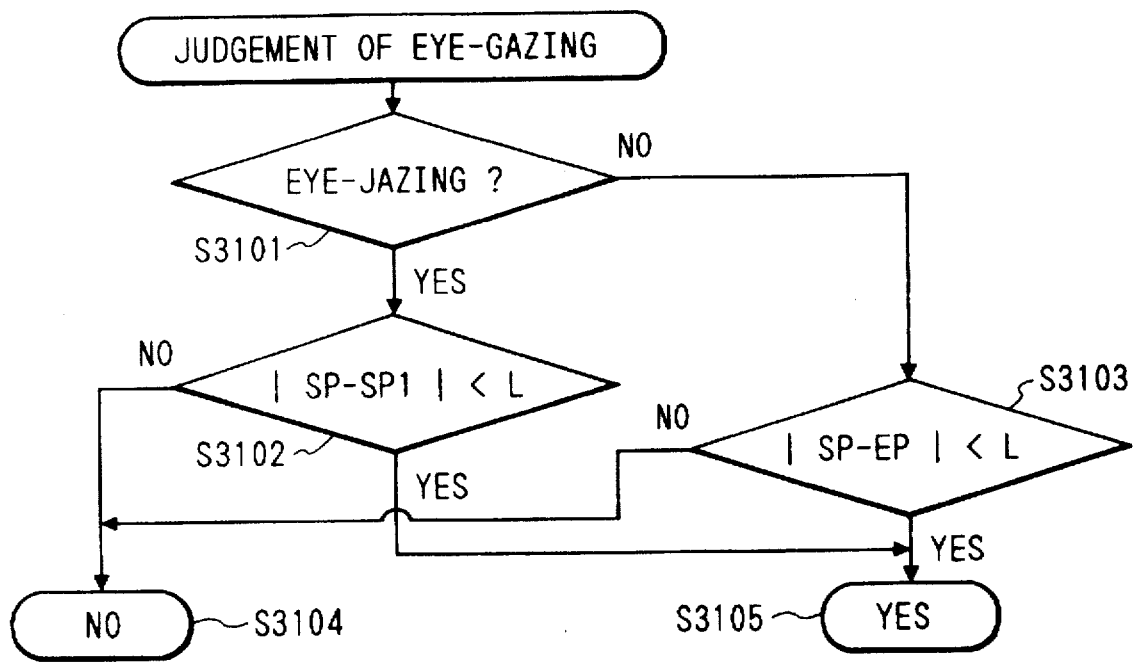
FIG. 61 is a flow chart showing a subroutine of judgement of eye-gazing according to the sixteenth embodiment.

In the sixteenth embodiment, eye-gazing is judged using the amount of line of sight movement as the difference between the previous and current line of sight positions. However, in the seventeenth embodiment, once a line of sight position for control is fixed in the EG-M mode, eye-gazing is judged by judging whether the difference between a line of sight position EP for control and a current line of sight position SP is larger than a predetermined value L. A flow chart of the seventeenth embodiment is shown in FIG. 61. A CPU 1201 judges in step S3101 whether eye-gazing is detected. If YES in step S3101, the flow advances to step S3102. However, if NO in step S3101, the flow advances to step S3103. The CPU 1201 judges in step S3102 whether the absolute value of the difference between the line of sight position EP for control representing the current line of sight position and the current light of sight position is smaller than a predetermined value L. If YES in step S3102, eye-gazing is judged. However, if NO in step S3102, eye-gazing is not detected because the line of sight position for control is greatly shifted from the current line of sight position. If the absolute value of the difference between the previous and current line of sight positions is smaller than a predetermined value in step S3103, eye-gazing is judged. However, if the absolute value is equal to or larger than the predetermined value, eye-gazing is not detected. Even if the line of sight slowly moves, the line of sight position for control can be accurately fixed. In the embodiment of the EG-M mode, the line of sight position for control is fixed to the first detected eye-gazing position. However, while the photographer gazes the same position, the line of sight position for control may be obtained by an average value of line of sight positions. That is, if both previous eye-gazing and current eye-gazing are detected, the line of sight position for control may be renewed such that EP→(EP+SP)/2.

(Eighteenth Embodiment)

Figure 62:
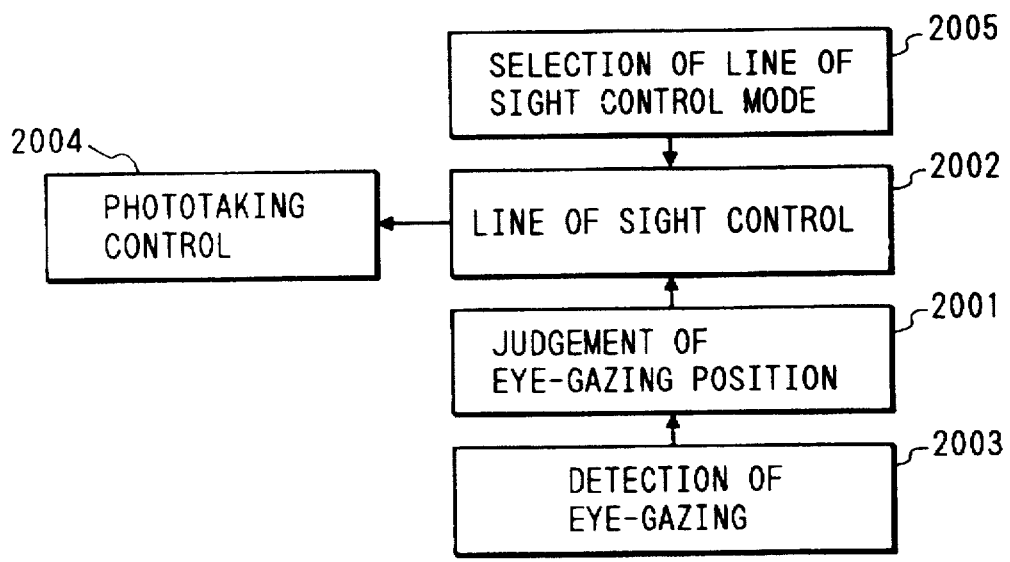
FIG. 62 is a block diagram of an arrangement according to the seventeenth embodiment of the present invention.
Figure 63:
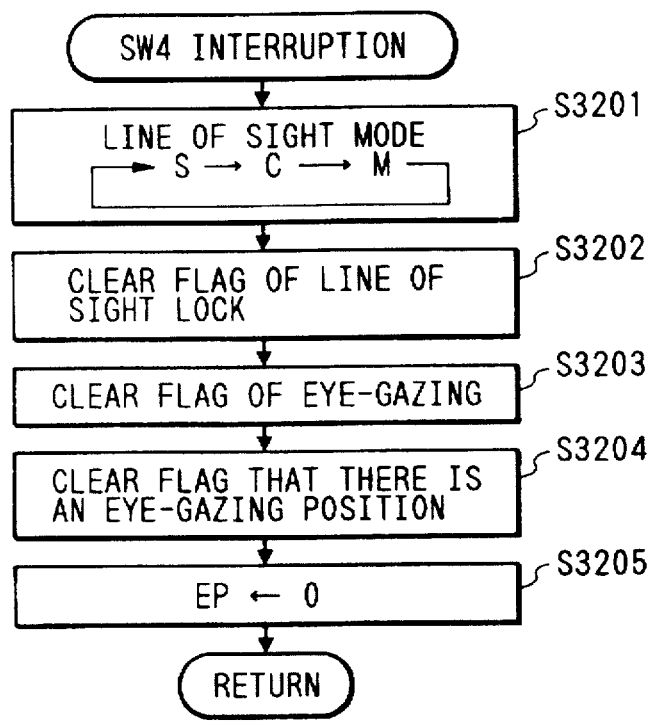
FIG. 63 is a flow chart showing a subroutine of SW4 interruption.
Figure 64:
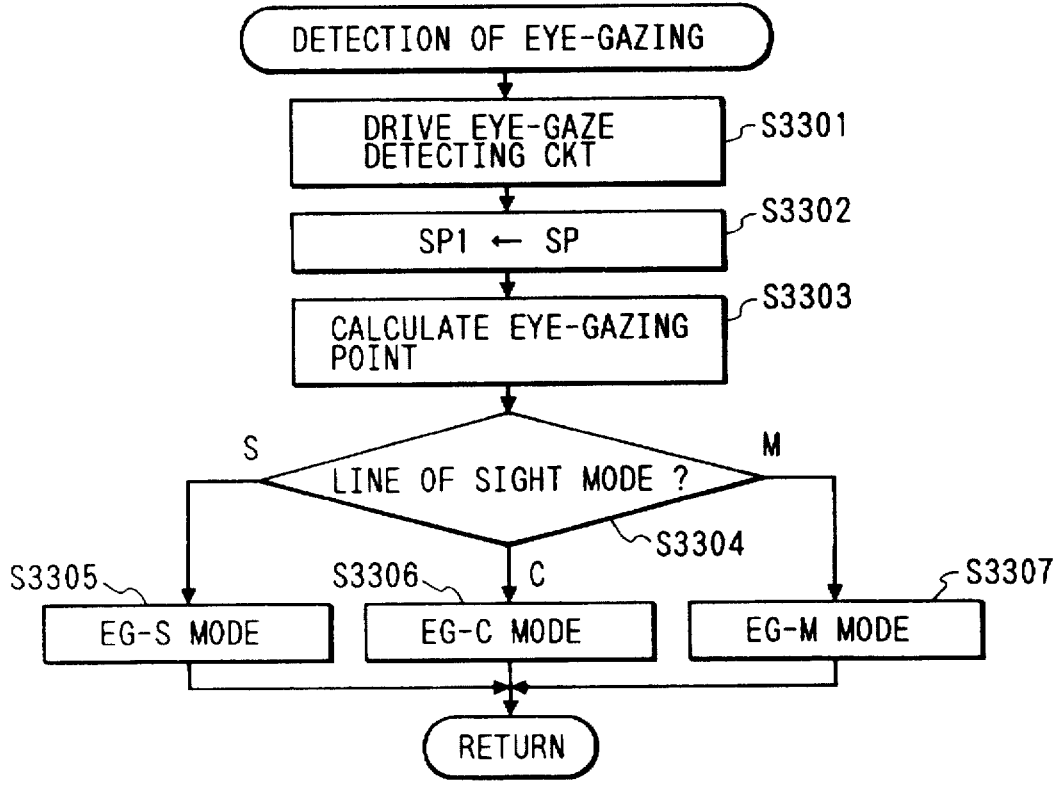
FIG. 64 is a flow chart showing a subroutine of line of sight detection according to the eighteenth embodiment of the present invention.

The eighteenth embodiment will be described with reference to FIG. 62. FIG. 62 is a block diagram of an arrangement of the eighteenth embodiment. The arrangement of the eighteenth embodiment comprises a line of sight detection portion 2003 for obtaining a line of sight position of a photographer, a portion 2001 of judgement of line of sight position for judging whether the eyeball of the photographer is set at an eye-gazing position, a line of sight control 2002 for controlling a line of sight mode for outputting a line of sight position for control for controlling a camera in accordance with a result of the portion 2001, and a portion 2005 of selection of line of sight control mode for selecting at least one of a plurality of line of sight modes. The line of sight modes are the EG-C mode, the EG-S mode, and the EG-M mode described in the twelfth to seventeenth embodiments. In the eighteenth embodiment, the portion 2005 is operated by a switch SW4, included in an operation member 1217 as shown in FIG. 52, for selecting a line of sight control mode. The flows of the portion 2005 are shown in FIGS. 63 and 64. The main flow chart of this embodiment is the same as that in FIG. 53, and a detailed description thereof will be omitted. Selection of a line of sight mode is cyclically changed in an order of the EG-S mode, the EG-C mode, and the EG-M mode in accordance with an SW4 interruption executed every time the switch SW4 is depressed. FIG. 63 is a flow chart of the SW4 interruption. In step S3201, the line of sight modes are cyclically selected. For example, when the line of sight mode is set as the EG-S mode before the switch SW4 is depressed, the line of sight mode is changed to the EG-C mode upon depression of the switch SW4. In step S3202, since the line of sight mode is changed, a flag of eye-gazing is cleared due to the following reason. Since the line of sight mode has been changed, a possibility of a change in eye-gazing position of the eyeball of the photographer is also high. In step S3203, the flag of eye-gazing is cleared. A flag representing that there is an eye-gazing position is cleared in step S3204. In step S3205, a line of sight position EP for control is moved to the central screen position as the initial position. To store "0" as the line of sight position for control is to move the line of sight position for control to the central position. The above flow is executed to cause the SW4 interruption to return to the main flow. A subroutine of line of sight detection in the eighteenth embodiment is shown in FIG. 64. In step S3301, the line of sight detection portion 2001 is driven to perform line of sight detection. In step S3302, a previous line of sight position $SP_1$ is renewed. In step S3303, a known arithmetic operation of line of sight detection is performed to calculate a current line of sight position SP. One of the line of sight modes is selected in step S3304. If the selected mode is the EG-S mode, the flow advances to step S3305. If the selected mode is the EG-C mode, the flow advances to step S3306. If the selected mode is the EG-M mode, the flow advances to step S3307. The line of sight position for control is calculated on the basis of the selected mode, and the subroutine of line of sight detection returns to the main routine.

(Nineteenth Embodiment)

Figure 65:
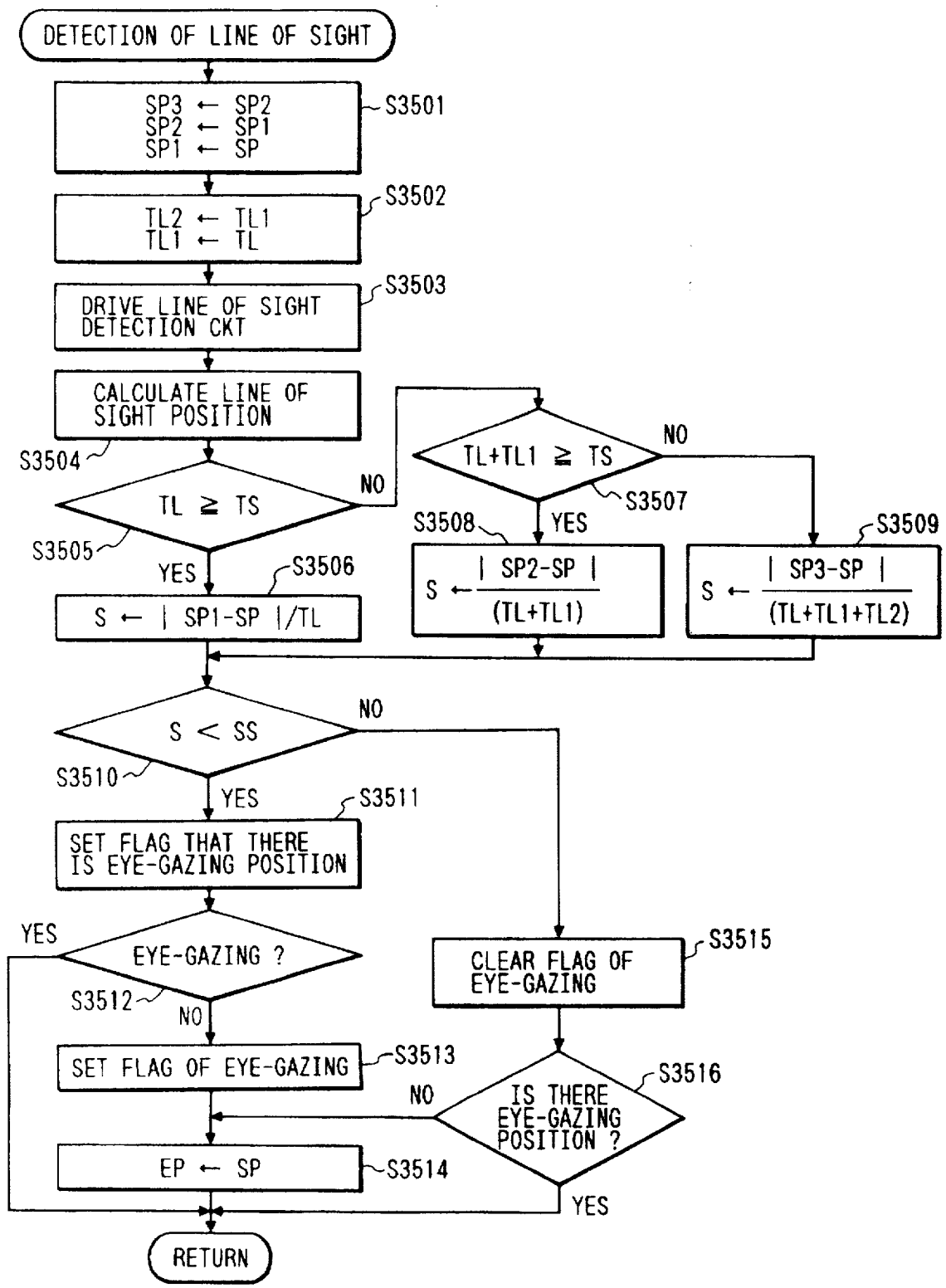
FIG. 65 is a flow chart showing a subroutine of line of sight detection according to the nineteenth embodiment of the present invention.
Figure 66:
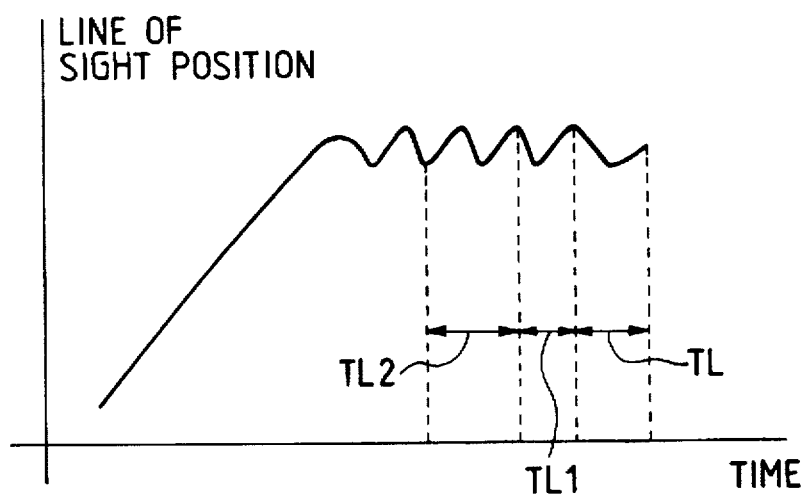
FIG. 66 is a graph for explaining a small voluntary movement of the line of sight.

The nineteenth embodiment will be described below. In the thirteenth embodiment, the speed of the line of sight movement is calculated by the difference between the previous and current line of sight positions. However, when the interval of line of sight detection is decreased, an accurate speed of the line of sight movement cannot be calculated due to an error. Even if a man gazes at one point, the eyeball slightly oscillates around the eye-gazing point (this phenomenon is called a small voluntary movement). The nineteenth embodiment will be described with reference to FIG. 66. Time is plotted along the abscissa, and the line of sight position is plotted along the ordinate in FIG. 66. It is apparent that when errors in calculation of the speed of the line of sight movement, which are caused by small voluntary movements and detection errors in the speed of the line of sight movement based on the current and previous line of sight positions and the speed of the line of sight movement based on the current and second previous line of sight positions are compared with each other, the speed errors based on the current and second previous line of sight positions are smaller than that based on the current and previous line of sight positions. Even if the eyeball of the photographer is set at an eye-gazing position, the speed of the line of sight movement within a short time interval is not always small due to the small voluntary movement, but the average speed in a predetermined time interval is low. More accurate detection can therefore be made if an eye-gazing position is judged in accordance with an average speed when the calculated time interval of the line of sight is short. For this reason, a time interval required for calculating the speed of the line of sight movement, in place of the difference of the current and previous line of sight positions, is set to be a predetermined time interval or more. If the time interval between the present and previous line of sight positions is shorter than the predetermined time interval, whether the time interval between the current and second previous line of sight opsitions is longer than the predetermined time interval is judged. If so, the speed of the line of sight movement is calculated in accordance with the difference between the current and second previous line of sight positions. If not, a time interval between the current line of sight position and the third previous line of sight position is compared with a predetermined value. The speed of the line of sight movement is calculated from the previous and current line of sight position data such that the time interval between the previous and current line of sight position data is longer than the predetermined time. The nineteenth embodiment will be described with reference to a flow chart of FIG. 65. In step S3501, variables $SP_1$, $SP_2$, and $SP_3$ representing three previous line of sight positions are renewed. In step S3502, variables TL1 and TL2 representing time intervals in line of sight detection are renewed. In step S3503, a line of sight detection portion is driven to perform line of sight detection. In step S3504, a known arithmetic operation of line of sight detection is performed to calculate a current line of sight position SP. A time interval TL between the previous line of sight detection and the current line of sight detection is calculated. A CPU judges in step S3505 whether the time interval TL between the previous line of sight detection and the current line of sight detection is equal to or larger than a predetermined value TS. If YES in step S3505, the flow advances to step S3506. Otherwise or if NO in step S3505, the flow advances to step S3507. In step S3506, a speed S of the line of sight movement is calculated in accordance with the previous and current line of sight positions and the time interval therebetween. The CPU judges in step S3507 whether a time interval (TL+TL1) between the current and second previous line of sight positions is equal to or larger than the predetermined value TS. If YES in step S3507, the flow advances to step S3508. Otherwise, the flow advances to step S3509. In step S3508, the speed S of the line of sight movement is calculated in accordance with $|SP_2-SP|/(TL+TL1)$. In step S3509, the speed S of the line of sight movement is calculated in accordance with $|SP_3-SP|/(TL+TL1+TL2)$. The CPU determines in step S3510 whether the speed S of the line of sight movement is less than a predetermined value SS. If YES in step S3510, the flow advances to step S3511. Otherwise, the flow advances to step S3515. In step S3511, a flag of eye-gazing which represents there is an eye-gazing position is set. The flag of eye-gazing is a flag representing whether the first eye-gazing position upon half depression is found. This flag is cleared in an initialization flow (not shown). In step S3512, the flag of eye-gazing is checked to determine whether previous eye-gazing is set. If YES in step S3512, a line of sight position EP for control is not renewed, and this routine returns to the main flow. However, if NO in step S3512, the flow advances to step S3513. In step S3513, the flag of eye-gazing representing that current eye-gazing is set is set. In step S3514, the line of sight position EP for control is renewed by the current line of sight position SP. In step S3515, the flag of eye-gazing is cleared because current eye-gazing is not detected. The CPU judges in step S3516 whether an eye-gazing position is present. If YES in step S3516, the line of sight position for control is not renewed, and this subroutine returns to the main flow. However, if NO in step S3516, the flow advances to step S3514 because the line of sight position for control is renewed by the latest line of sight position until the first eye-gazing position-is found. In this embodiment, line of sight position data which represent a time interval for calculating the speed of the line of sight movement to be a predetermined time interval or more are searched. However, if an interval in line of sight detection is known in advance, no search operation is performed, and the speed of line of sight movement may be calculated in accordance with the current line of sight position and a line of sight position which is previous by a predetermined number of times.

The line of sight modes consist of the EG-S mode for locking the line of sight position when a line of sight is set at an eye-gazing position, the EG-C mode for continuous renewing a line of sight position for control, and the EG-M mode for locking a line of sight position for control to the previous eye-gazing position during movement of the line of sight. In addition, since the line of sight mode is changed in synchronism with the AF mode, the photographer can concentrate himself on phototaking operations by a small number of button operations.

(Twentieth Embodiment)

Figure 68:
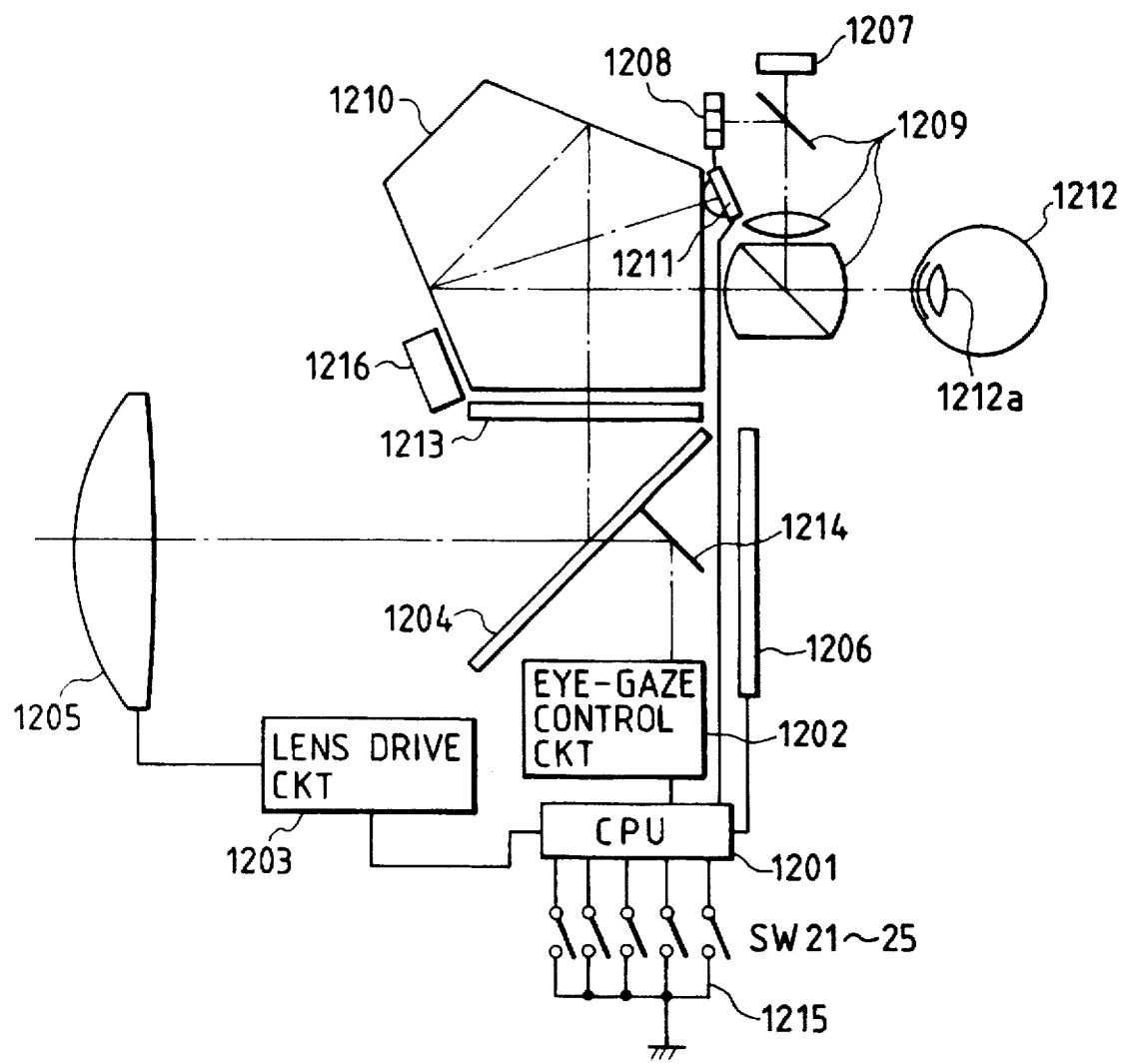
FIG. 68 is a view showing an arrangement including an optical system of a camera according to the twentieth embodiment.

FIG. 67 is a block diagram showing a camera having a line of sight detecting device according to the twentieth embodiment of the present invention. FIG. 68 is a view showing an arrangement including an optical system of the camera.

The overall operation of the camera having the line of sight detecting device is controlled by a computer CPU 1201, as shown in FIG. 67. The CPU 1201 receives detection data from various detection portions such as a line of sight detection portion 3102 for detecting a line of sight of a photographer, a focus detection portion 3103 for measuring a distance to an object to be photographed, and an exposure detection portion 3104 for photometering the object.

The CPU 1201 receives command data from various operation members such as a control mode setting portion 3105 for selecting a control mode for setting a phototaking condition in accordance with the line of sight position of a photographer, an AF mode setting portion 3106 for selecting one of AF modes (to be described later), a release portion 3108 including half and full depression switches turned on upon half depression and full depression of a release button 3107, and the like.

The CPU 1201 is a computer control unit for performing various camera control operations in accordance with installed programs. Processing portions associated with the present invention are a portion 1201a of selection of line of sight mode for selecting one of two modes (to be described later) and a taking control 1201b for setting the phototaking condition of the camera in accordance with the line of sight position.

The portion 1201a of selection of line of sight mode automatically selects a predetermined line of sight mode in accordance with a control mode selected by the control mode setting portion 3105 or the AF mode selected by the AF mode setting portion 3106 and judges a line of sight position of the photographer in accordance with the selected line of sight mode. The line of sight modes are a single mode (to be referred to as an EG-S mode hereinafter) for locking a line of sight position when several previous line of sight positions satisfy the predetermined eye-gazing condition and a continuous mode (to be referred to as an EG-C mode hereinafter) for always renewing the line of sight position to the latest line of sight position.

The taking control 1201b sets a camera phototaking condition in accordance with the line of sight position judged by the portion 1201a of selection of line of sight mode in the control mode selected by the control mode setting portion 3105. The taking control 1201b controls a lens drive portion 3109, a shutter drive portion 3110, and an aperture drive portion 3111 in accordance with the set result.

The line of sight detection portion 3102 is a portion for detecting a line of sight position of a photographer in accordance with a scheme of "Purkinje's image 1+Purkinje's image 4", "Purkinje's image 1+center of pupil", a "boundary of white and black regions", or the like.

The control mode selected by the control mode setting portion 3105 is a mode for setting conditions associated with exposure, such as a shutter speed, an f-number, an exposure mode (e.g., an aperture priority mode, a shutter priority mode, a program mode, or a manual mode, and the like). The AF mode selected by the AF mode setting portion 3106 is an AF-C mode for continuously driving a phototaking lens to an in-focus position on the basis of the latest detection result of the focus detection portion 3103 or an AF-S mode for inhibiting driving of the phototaking lens once an in-focus state is obtained.

Figure 69:
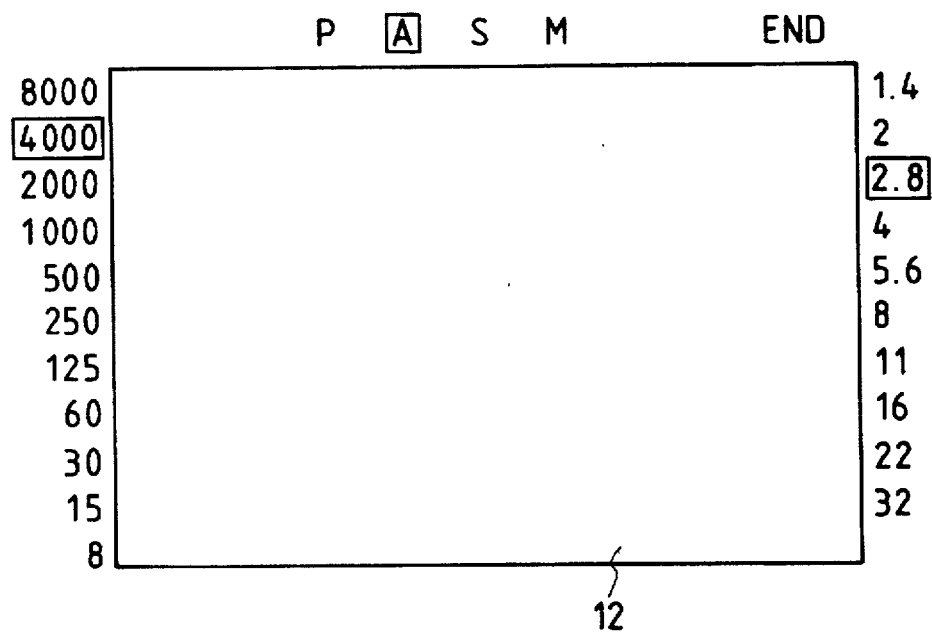
FIG. 69 is a view showing display contents within a finder in a control mode.

For example, when the control mode is selected by the control mode setting portion 3105, the line of sight mode is automatically set to be an EG-C mode by the portion 1201 of selection of line of sight mode. The latest line of sight position detected by the line of sight detection portion 3102 is supplied to the taking control 1201b. The taking control 1201b causes a liquid crystal display (LCD) 3112 in the finder to perform a display shown in FIG. 69 so as to perform exposure control at the line of sight position of the photographer. The taking control 1201b sets an f-number, a shutter speed, and the like at this line of sight position.

In this case, the right display in the view frame of the LCD 3112 represents the f-number, and the left display represents the shutter speed. This display represents one of the modes, i.e., the aperture priority mode (A), the shutter priority mode (S), the program mode (P), and the manual mode (M). The reversal display indicates the current set state. In the display contents in FIG. 69, the f-number is 2.8, the shutter speed is 1/4000 sec., and the exposure mode is the aperture priority mode.

In this state, if the line of sight position reaches the display position of the f-number of "8", the f-number is changed from "2.8" to "8". In order to complete this control mode, the line of sight position must be moved to the display of "END" at the upper right corner of the view frame. After the end of the control mode, when the full depression switch of the release portion 3108 is turned on, the taking control 1201b determines a shutter speed corresponding to the f-number of "8" on the basis of the metered output from the exposure detection portion 3104. The taking control 1201b outputs an exposure control signal to the shutter drive portion 3110 and the aperture drive portion 3111.

This embodiment will be described in more detail with reference to an arrangement shown in FIG. 68. The same reference numerals as in FIG. 52 denote the same parts in FIG. 68.

Referring to FIG. 68, the line of sight detection portion 3102 is incorporated in a finder 1210 of the camera, and the optical system of the portion 3102 also serves as an optical system for the finder 1210. An infrared ray emitted from an infrared light-emitting diode (LED) 1207 in the line of sight detection portion 3102 is collimated through an optical system 1209 and is projected on the cornea of an eyeball 1212 in an intraocular optical system 1212a.

Figure 40:
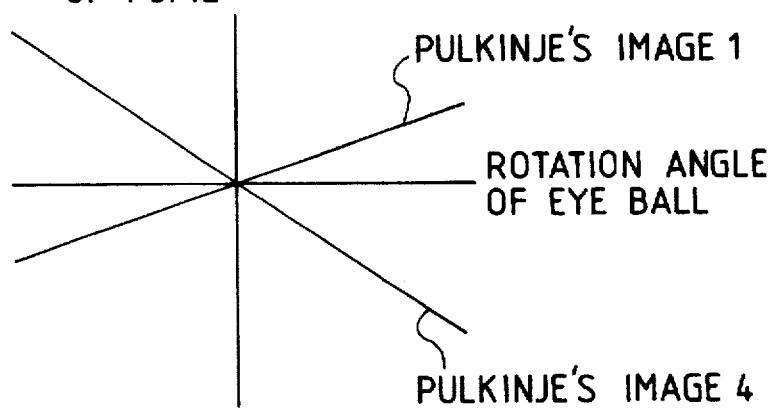
FIG. 40 is a view for explaining the principle of line of sight detection.
Figure 43:
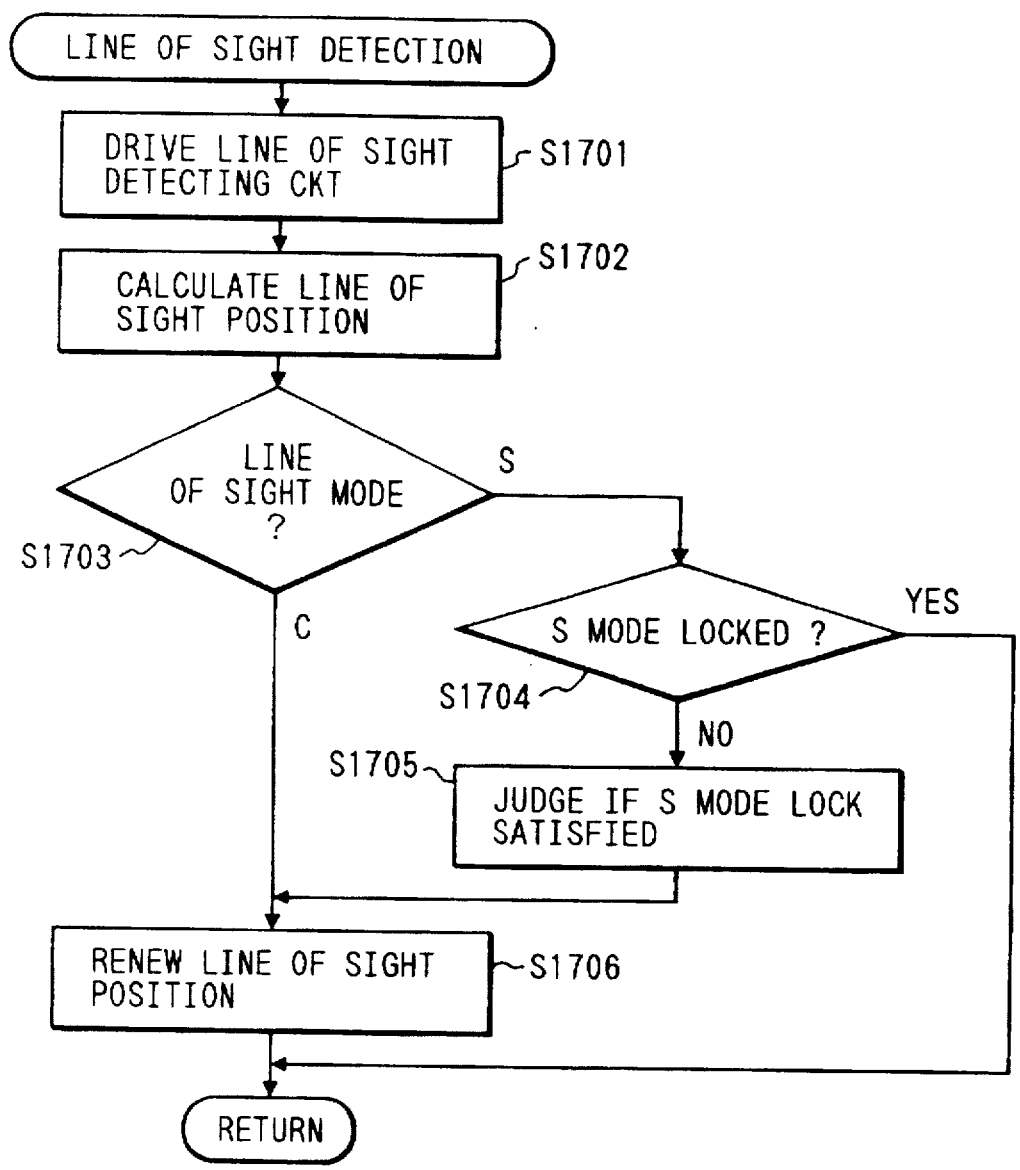
FIG. 43 is a flow chart showing a subroutine of detection of a line of sight according to the ninth embodiment.

As a result, four Purkinje's images as described above are observed in the intraocular optical system 1212a. The bright points of the Purkinje's images are focused on a light-receiving element 1208 comprising a two-dimensional CCD and the like through the optical system 1209. Position data of the respective bright points focused on the light-receiving element 1208 are supplied to the CPU 1201. The CPU 1201 calculates positions of the centers of gravity of the respective bright points to obtain an eyeball rotation angle in accordance with the relationship shown in FIG. 40, thereby detecting an eye-gazing position of the photographer within the finder 1210.

On the other hand, object light is processed in the same manner as described with reference to FIG. 38. In addition, an LCD 1216 is arranged in front of the finder 1210.

The CUP 1201 is connected to a half depression switch SW21 and a full depression switch SW22 which constitute the release portion 3108, a control mode setting switch SW23 constituting the control mode setting portion 3105, an AF mode setting switch SW24 constituting the AF mode setting portion 3106, and a line of sight lock switch SW25.

The half depression switch SW21 is a switch turned on by the first stroke of the release button 3107. The full depression switch SW22 is a switch turned on by the second stroke of the release button 3107. The control mode setting switch SW23 is a switch for selecting the control mode for setting a phototaking condition at an ON position. The AF mode setting switch SW24 is a switch for selecting an AF-C mode at an ON position and an AF-S mode at an OFF position. The line of sight lock switch SW25 is a switch for locking a line of sight position at an ON position.

Figure 70:
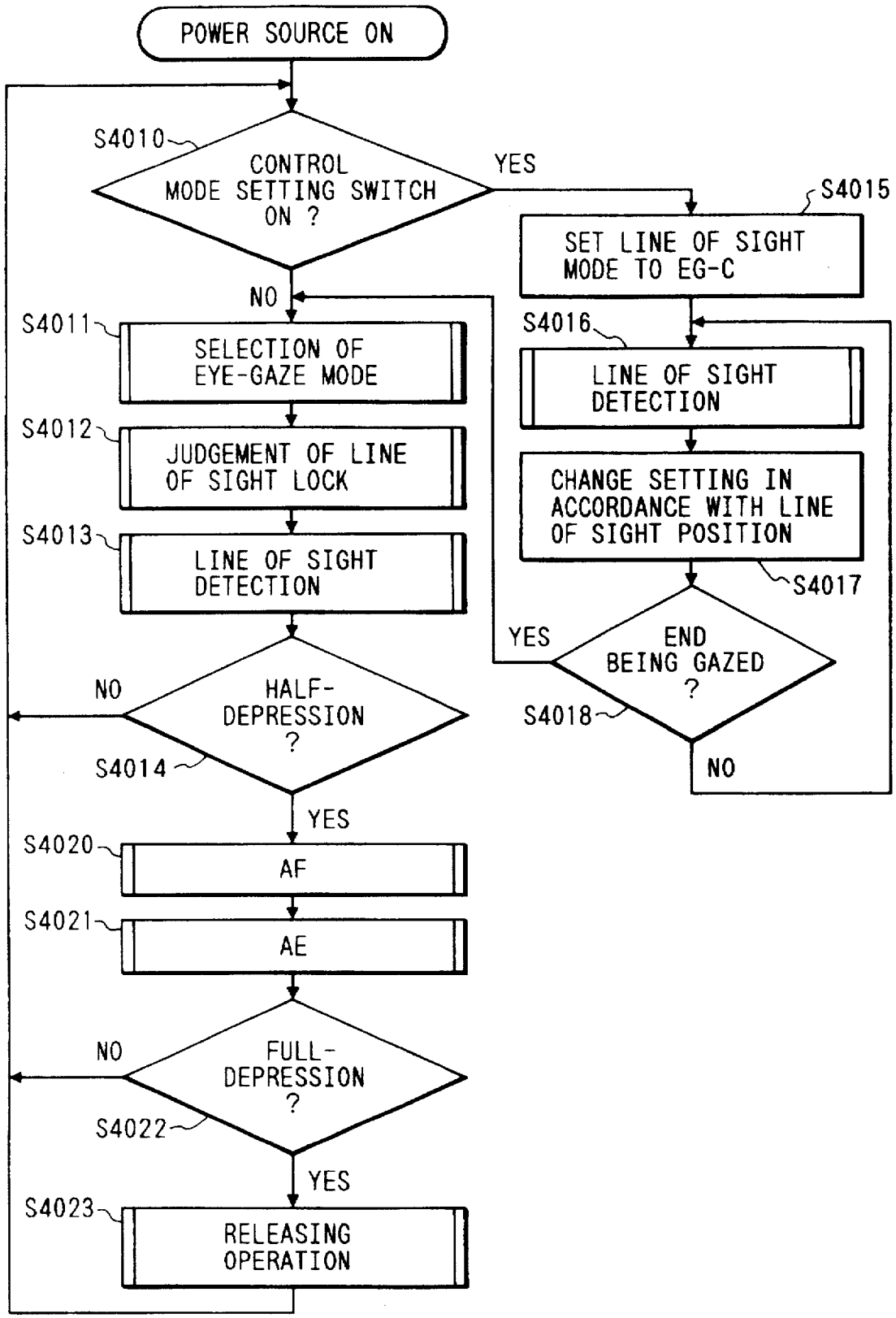
FIG. 70 is a flow chart for explaining operations of this embodiment.

Operations of this embodiment will be described with reference to a flow chart in FIG. 70. The main routine shown in FIG. 70 is executed by turning on a power switch (not shown). The CPU 1201 judges in step S4010 whether the control mode setting switch SW23 is ON or OFF.

Figure 71:
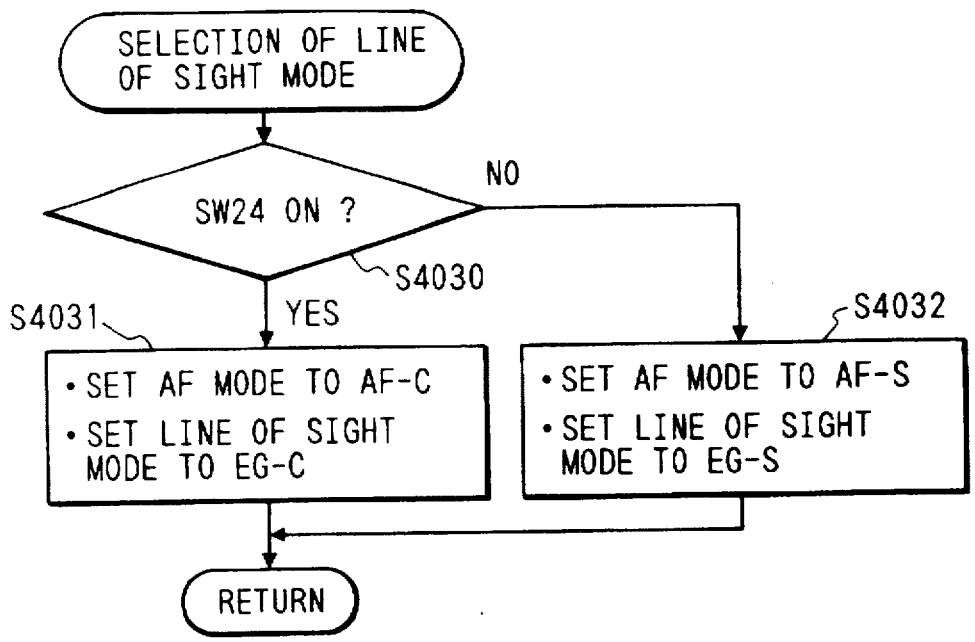
FIG. 71 is a flow chart showing a subroutine of selection of a line of sight mode.

If the switch SW23 is judged to be OFF, selection of a line of sight mode (step S4011) is executed. This selection is performed by executing a subroutine shown in FIG. 71. The CPU 1201 judges in step S4030 whether the AF mode setting switch SW24 is ON or OFF. If the switch SW24 is judged to be ON, the AF mode is set to be the AF-C mode, and the line of sight mode is set to be an EG-C mode (step S4031). However, if the switch SW24 is judged to be OFF, the AF mode is set to be the AF-S mode, and the line of sight mode is set to be an EG-S mode (step S4032).

Figure 72:
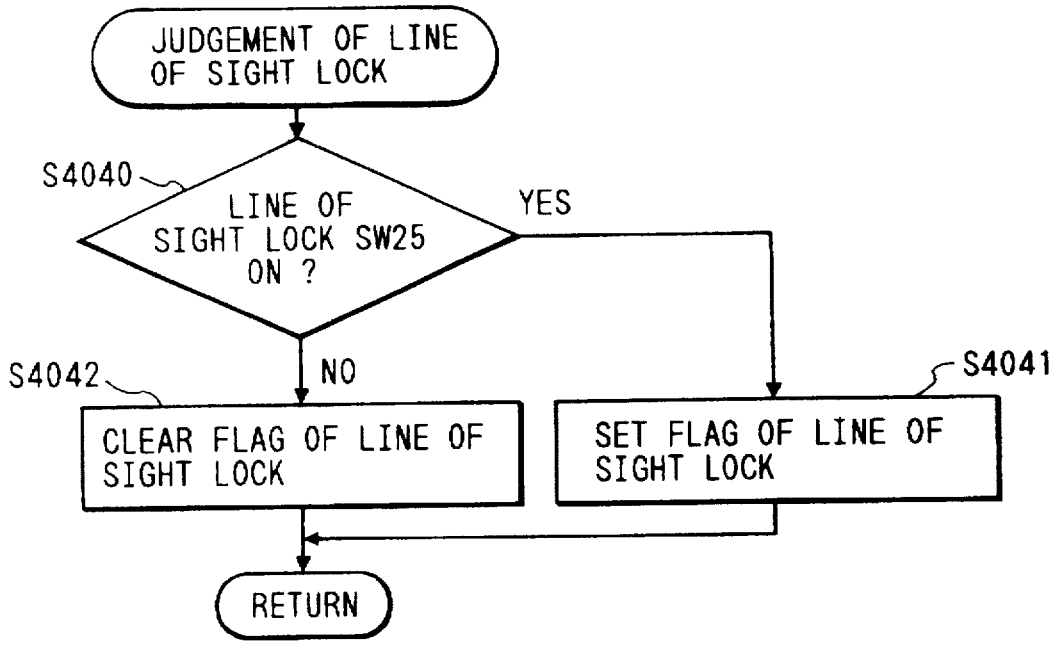
FIG. 72 is a flow chart showing a subroutine of judgement of line of sight lock.

This routine returns to the main routine, and judgement of line of sight lock (step S4012) is executed. This judgement is executed by a subroutine shown in FIG. 72. The CPU 1201 judges in step S4040 whether the line of sight lock switch SW25 is ON or OFF. If the switch SW25 is judged to be ON, a flag of line of sight lock is set (step S4041). However, if the switch SW25 is judged to be OFF, the flag of line of sight lock is reset (step S4042).

Figure 73:
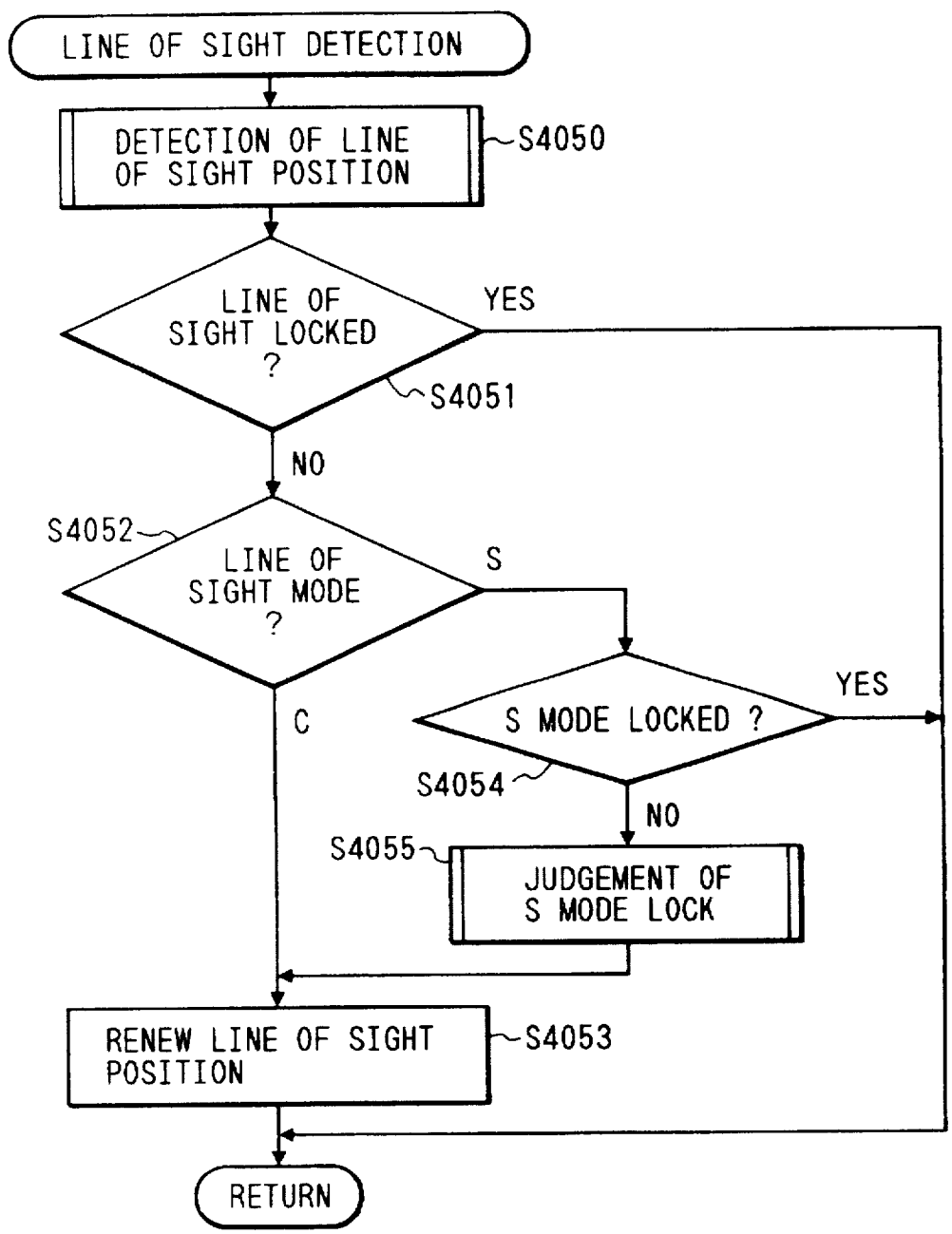
FIG. 73 is a flow chart showing a subroutine of line of sight detection.

This subroutine returns to the main routine, and line of sight detection is then performed (step S4013). This detection is executed by a subroutine shown in FIG. 73. Detection of a line of sight position is performed (step S4050). This detection is performed as follows. Line of sight position data detected by the line of sight detection portion 3102, i.e., position data of the Purkinje's images 1 and 4 focused on the two-dimensional light-receiving element 1208, are used to calculate the positions of the centers of gravity of the respective bright points. An eyeball rotation angle is obtained from the difference between the positions of the respective bright points, thereby detecting the line of sight position of the photographer.

The CPU 1201 judges in step S4051 whether the flag of line of sight lock is set. If YES in step S4051, the line of sight lock mode is set, and this subroutine returns to the main routine. If this flag is cleared, the CPU 1201 judges in step S4052 whether the current line of sight mode is the EG-S or EG-C mode. If the EG-C mode is judged to be set, the line of sight position of the photographer which is detected in step S4050 is renewed as the latest line of sight position (step S4053), and this subroutine returns to the main routine. However, when the EG-S mode is judged to be set, the CPU 1201 judges in step S4054 whether a flag of S mode lock (to be described later) is set. If YES in step S4054, the condition of the S mode lock is satisfied, and this subroutine returns to the main routine. However, if the flag is cleared, judgement of S mode lock is executed (step S4055).

The judgement of S mode lock is the same as that described with reference to FIG. 46, and a detailed description thereof will be omitted.

Referring back to FIG. 73, when the judgement of S mode lock (step S4055) is completed, the line of sight position is renewed to the latest line of sight position (step S4053), and this subroutine returns to the main routine. In this case, the latest line of sight position is a line of sight position detected at the moment closest to the current time. Note that since an error is included in the detected line of sight position, a plurality of previous line of sight positions are statistically processed, and the processing result may be renewed as the latest line of sight position.

When the detection of the line of sight position is completed (step S4013), the CPU 1201 judges in step S4014 whether the half depression switch SW21 of the release portion 3108 is ON or OFF. If the switch SW21 is judged to be OFF, the flow returns to step S4010. The CPU 1201 judges again whether the control mode setting switch SW23 is ON or OFF.

Processing for the ON state of the control mode setting switch SW23 will be described below. If the switch SW23 is judged to be ON (step S4010), the camera is set in the control mode, and the line of sight mode is set to be EG-C mode (step S4015).

Detection of line of sight (step S4016) is performed. This detection is the same processing as the above-described detection of line of sight and is executed by a subroutine shown in FIG. 73. In this case, however, since the line of sight mode is the EG-C mode, if the flag of line of sight lock is not set, the latest line of sight position detected by the line of sight detection portion 3102 is always renewed in step S4053.

When the above processing is completed, a set value is renewed by the detected line of sight position (step S4017).

In this renewing, the LCD 1216 displays the contents shown in FIG. 70, and an f-number, a shutter speed, and an exposure mode are set in accordance with the line of sight position. Details of this processing have been described in detail, and a description thereof will be omitted.

The CPU 1201 judges in step S4018 whether the line of sight position of the photographer is set on the display of "END" displayed in the LCD 1216. If NO in step S4018, the flow returns to detection of line of sight in step S4016, and steps S4016 to S4018 are repeated. When the line of sight position is judged to have reached the display of "END", the control mode is ended, and selection of a line of sight mode in step S4011 is executed.

In this manner, during the OFF period of the half depression switch SW21, steps S4010 to S4018 are repeated. When the half depression switch SW21 is turned on (step S4014), the AF processing (step S4020) is executed.

This processing is performed by executing the subroutine shown in FIG. 44.

When the subroutine is ended, the flow returns to the main routine to calculate a metered value of mainly the selected AF area (step S4021). For example, in the case of FIG. 45, a metered value weighted and averaged in the AE area corresponding to the AF area A1 may be calculated, or spot photometering using only the metered value of the AE area corresponding to the AF area A1 may be performed to calculate a metered value.

The CPU 1201 judges in step S4022 whether the full depression switch SW22 is turned on by the release button 3107. If NO in step S4022, the flow returns to step S4010, and steps S4010 to S4022 are repeated. When the full depression switch SW22 is turned on (step S4022), a series of release operations such as a mirror-up operation, a shutter traveling operation, a mirror-down operation, a film feeding operation, and a shutter charge operation are performed (step S4023). When the series of release operations are ended, the flow returns to step S4010 again, and this routine (steps S4010 to S4023) is repeated until the power switch is turned off.

In the above embodiment, the phototaking condition set in the control mode is the condition associated with the exposure. However, the condition set in the main mode may be a condition associated with the zoom ratio of a lens or an electronic flash or any other phototaking condition. Selection of the control mode and the AF mode may be performed not by the switch but by the line of sight position.

According to the present invention, there is provided a camera having a line of sight detecting device having as line of sight modes a single mode for locking a line of sight position obtained when the photographer gazes at a point and a continuous mode for continuously renewing the line of sight position, wherein when a control mode for setting a phototaking condition in accordance with the line of sight position is selected, the continuous mode suitable for setting of the phototaking condition is automatically selected. Therefore, an operation for selecting a line of sight mode can be omitted, and the photographer can concentrate himself on phototaking by a small number of button operations.

(Twenty-First Embodiment)

The twenty-first embodiment exemplifies a method of presetting start conditions in line of sight detection of the twentieth embodiment.

Figure 74:
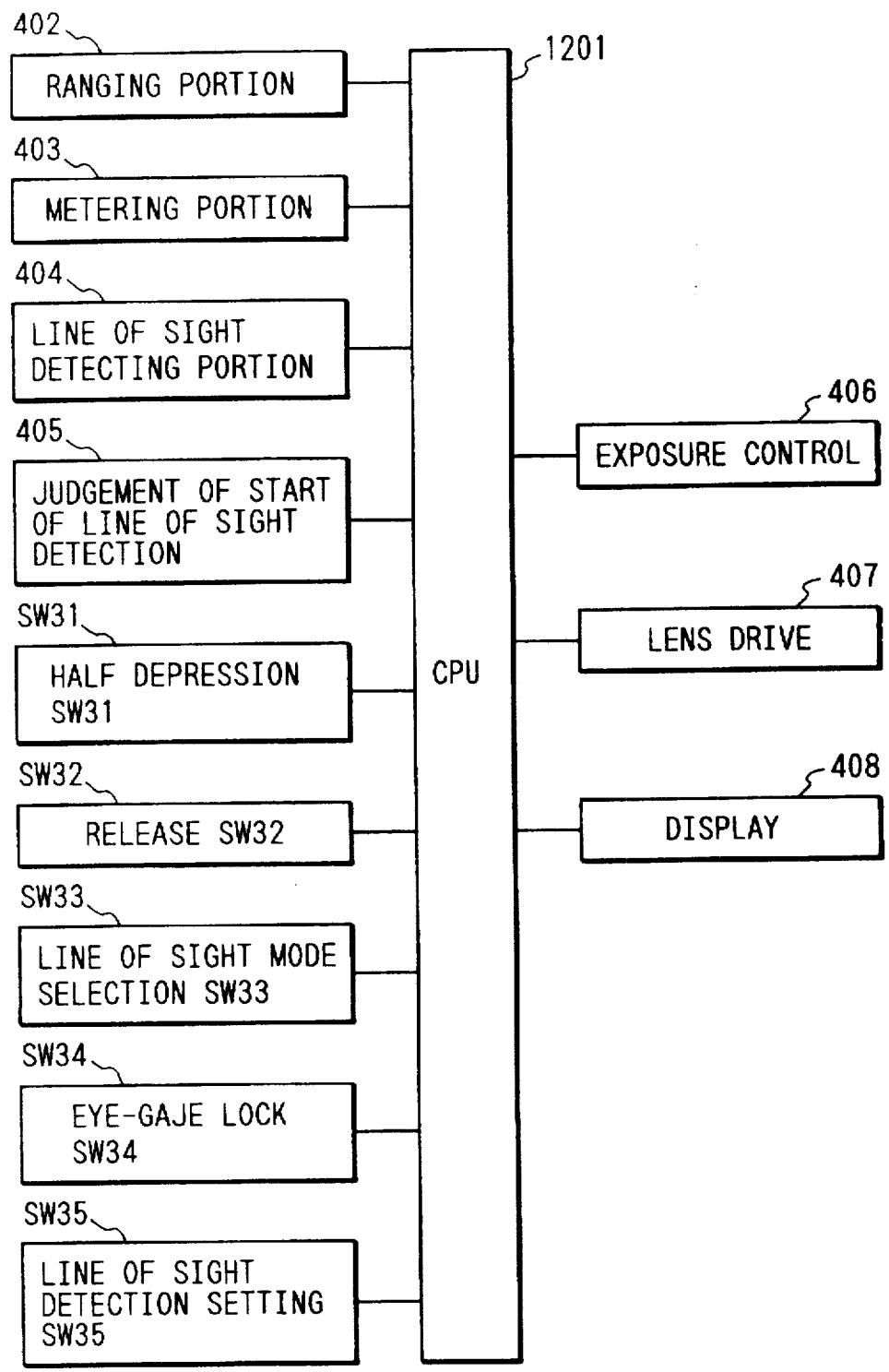
FIG. 74 is a block diagram showing a camera having a line of sight detecting device according to the twenty-first embodiment of the present invention.

FIG. 74 is a block diagram of a camera having a line of sight detecting device according to the twenty-first embodiment.

Referring to FIG. 74, a control portion (CPU) 1201 controls the overall operation of the camera having the line of sight detecting device of this embodiment. The CPU 1201 is constituted by, e.g., a microcomputer.

A ranging portion 402 measures distances to objects located in a plurality of regions within the phototaking frame.

A metering portion 403 performs photometering of a plurality of regions obtained by dividing the phototaking frame.

A line of sight detecting portion 404 detects an eye-gazing position of a line of sight of a photographer within a finder.

The line of sight detecting portion 404 comprises a known arrangement described in the prior art.

A portion 405 of judgement of start of line of sight detection judges whether detection of a line of sight position by the line of sight detecting portion 404 is to be executed, and a detailed description thereof will be given.

An exposure control 406 controls the shutter speed and the f-number on the basis of an exposure value calculated by the CPU 1201.

A lens drive portion 407 controls and drives a phototaking lens in accordance with the amount of movement of a focus adjustment lens which is calculated by the CPU 1201.

A display portion 408 displays an eye-gazing position detected by the line of sight detecting portion 404, AF data, and AE data within the finder.

A half depression switch SW31 is turned on by half depression of the release button, and a release switch SW32 is turned on by full depression of the release button.

A line of sight mode selection switch SW33 selects an EG-S or EG-C mode as a line of sight mode.

The EG-S mode is a mode for locking a line of sight position when the line of sight movement satisfies a predetermined condition. The EG-C mode is a mode for always renewing a line of sight position to the latest line of sight position.

A line of sight lock switch SW34 is turned on to lock a line of sight position.

A line of sight detection setting switch SW35 is operated by the photographer to perform line of sight detection. When the line of sight detection setting switch SW35 is ON, line of sight detection is performed. However, when the line of sight detection setting switch SW35 is OFF, line of sight detection is not performed.

Figure 75:
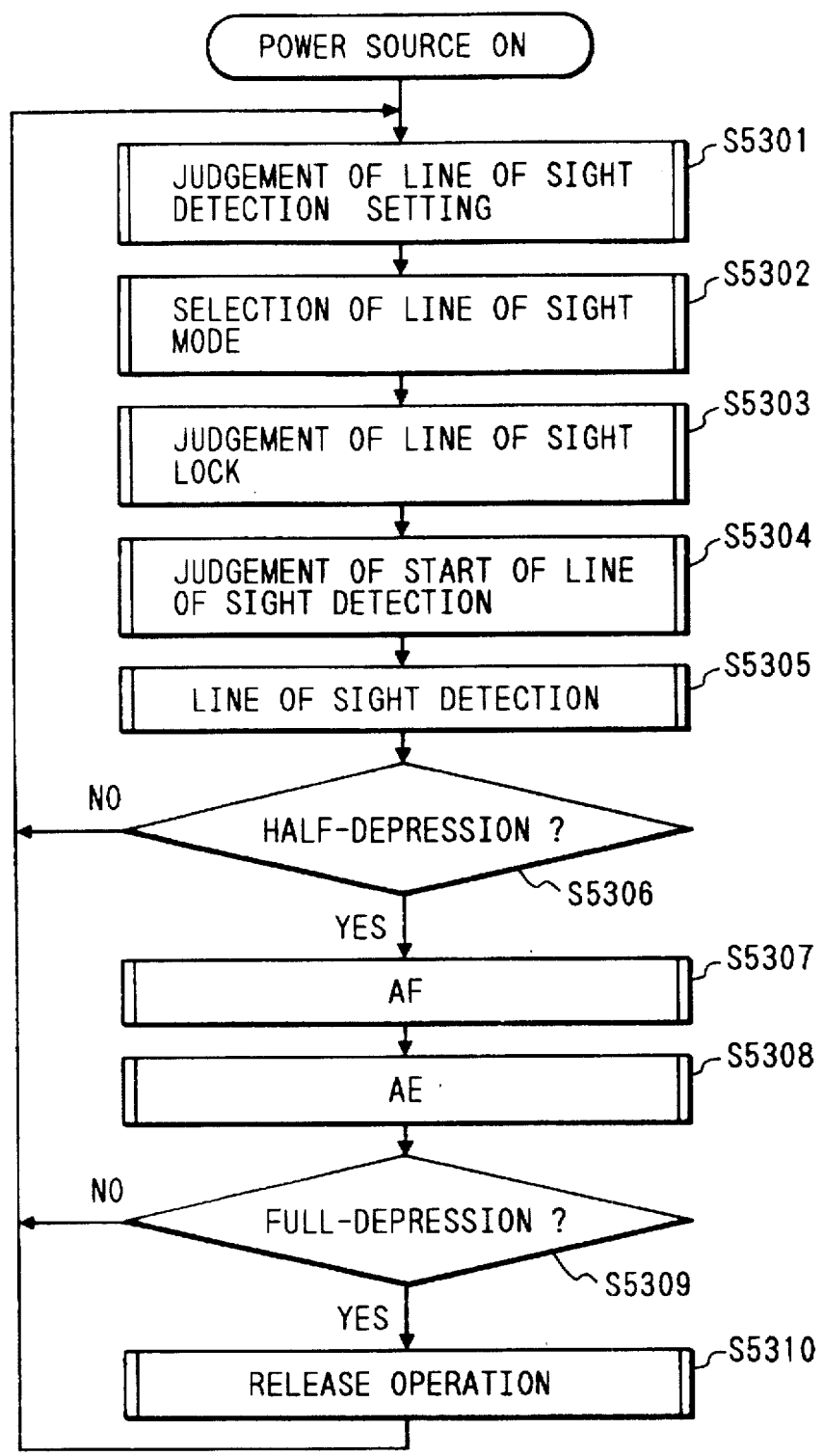
FIG. 75 is a flow chart showing operations of the camera having the line of sight detecting device shown in FIG. 74.

FIG. 75 is a flow chart showing operations from a power-ON operation to a release operation in phototaking using the camera having the line of sight detecting device. When the power switch is turned on, the flow is executed.

Step S5301: A subroutine of judgement of line of sight detection is executed to judge whether line of sight detection is to be performed. In this embodiment, this setting is performed using the line of sight detection setting switch SW35, and details thereof will be described later.

Step S5302: In this step, the line of sight mode is set to be the EG-S or EG-C mode.

Step S5303: A subroutine of judgement of external lock is performed to judge whether a line of sight is locked by an external factor. An external lock condition is exemplified by depression of a line of sight lock button or the like, and details thereof will be described later.

Step S5304: It is judged in this step whether a condition of start of line of sight detection is established. If a predetermined condition is established, line of sight detection is performed, and details thereof will be described later.

Step S5305: A subroutine of line of sight detection for performing a known line of sight detection operation in this step, and details thereof will be described later. In this embodiment, a line of sight position is detected using Purkinje's images 1 and 4 as described in the prior art.

More specifically, an eyeball rotation angle can be detected by using only Purkinje's image 1. However, Purkinje's image 1 is moved even by translation of the eyeball. In a finder of a camera having a large degree of freedom of eyeball movement, the above translation generally results in a large error. The translation is canceled using Purkinje's image 4.

When two or three discrete line of sight positions are to be measured, Purkinje's image 4 need not be used in addition to Purkinje's image 1. Alternatively, a method of detecting a line of sight may be a method using Purkinje's image 1 and the center of the pupil if such a method can detect a line of sight.

Step S5306: It is judged in this step whether the half depression switch SW31 is depressed. If the half depression switch SW31 is judged to be depressed, the flow advances to step S5307 to perform AE and AF operations to be described later. However, if the half depression switch SW31 is judged not to be depressed, the flow returns to step S5301.

Step S5307: A known AF subroutine is executed for an AF area based on the line of sight position judged in step S5305.

In this embodiment, a description will be given under the condition that the finder has AF areas (A1, A2, and A3) as shown in FIG. 45. The line of sight position determined in step S5305 is represented by a mark x. In this case, the area A1 is judged as the AF area, and the lens is driven on the basis of the metered value of the AF area A1. In this embodiment, discrete AF areas are provided, but a continuous AF area may be used in place of the discrete AF areas.

Step S5308: As a photometering arithmetic operation, AE is performed using a weighted average of a sum of metered values using the line of sight position obtained in step S5305 as the center of gravity.

Step S5309: It is judged in this step whether the release switch SW32 is depressed. If the release switch SW32 is judged to be depressed, the flow advances to step S5310, and a release operation is performed. However, when the release switch SW32 is judged not to be depressed, the flow returns to step S5301.

Step S5310: A series of release operations such as a mirror-up operation, a shutter traveling operation, a mirror-down operation, a film feeding operation, and a shutter charge operation are performed. When the release operations are completed, the flow returns to step S5301. This routine continues until the power switch is turned off.

Figure 76:
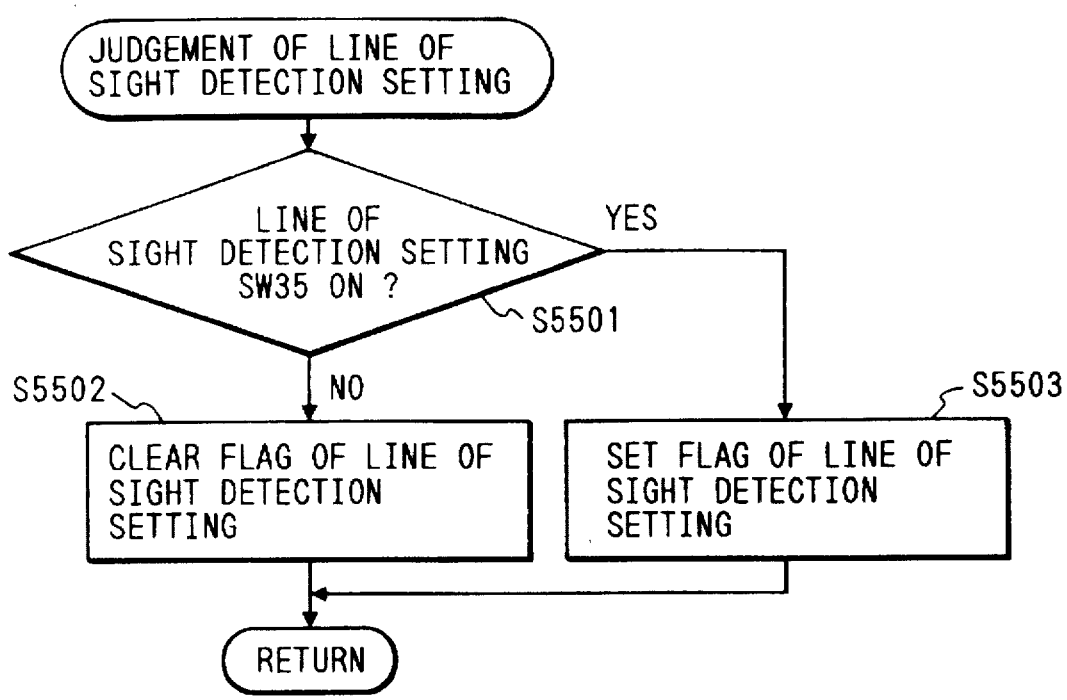
FIG. 76 is a flow chart showing a subroutine of judgement of a line of sight detection setting of the main flow in FIG. 75.

The subroutine of judgement of line of sight detection setting (step S5301) will be described with reference to FIG. 76.

This subroutine is set by the photographer. In this embodiment, the photographer sets this subroutine with the line of sight detection setting switch SW35.

Step S5501: It is judged in this step whether the switch SW35 is ON. If the switch SW35 is judged to be ON, the flow advances to step S5503 to set a flag of line of sight detection setting, and this subroutine returns to the main routine. In this state, line of sight detection can be performed. However, if the switch SW35 is judged to be OFF, the flow advances to step S5502 to clear the flag of line of sight detection setting, and this subroutine returns to the main routine.

Figure 77:
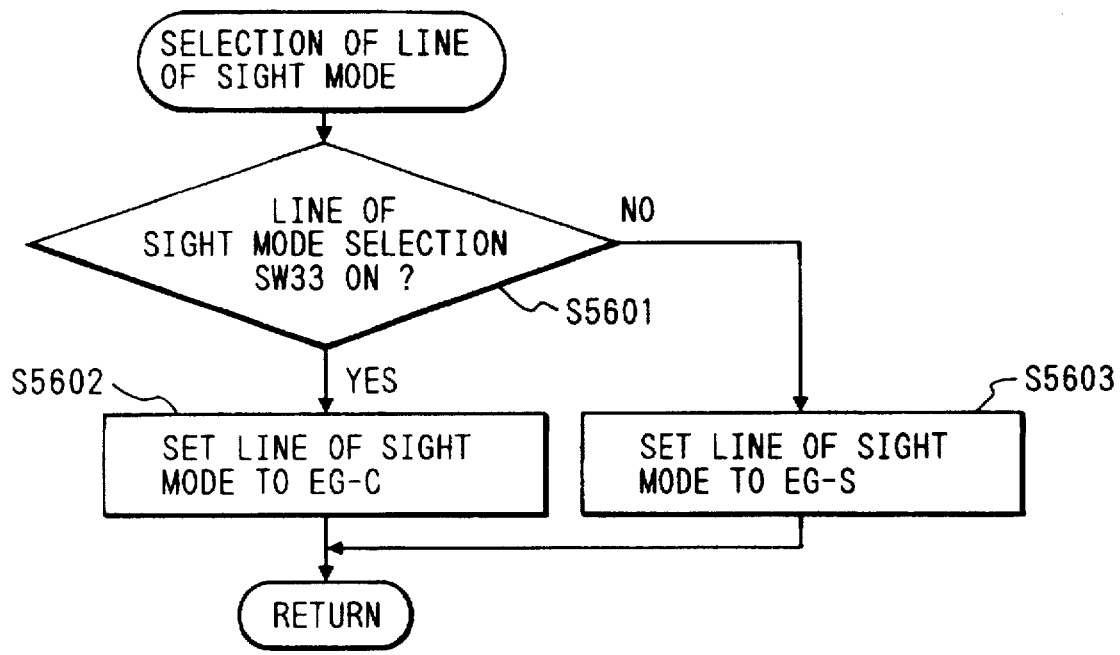
FIG. 77 is a flow chart showing a subroutine of selection of a line of sight mode of the main flow in FIG. 75.

The subroutine of selection of a line of sight mode (step S5302) will be described with reference to FIG. 77.

In this embodiment, selection of a line of sight mode is set with the line of sight mode selection switch SW33.

Step S5601: It is judged in this step whether the switch SW33 is ON. If the switch SW33 is judged to be ON, the flow advances to step S5602 to set the line of sight mode to be the EG-C mode, and this subroutine returns to the main routine. However, if the switch SW33 is judged to be OFF, the flow advances to step S5603 to set the line of sight mode to be the EG-S mode, and this subroutine returns to the main routine.

Figure 78:
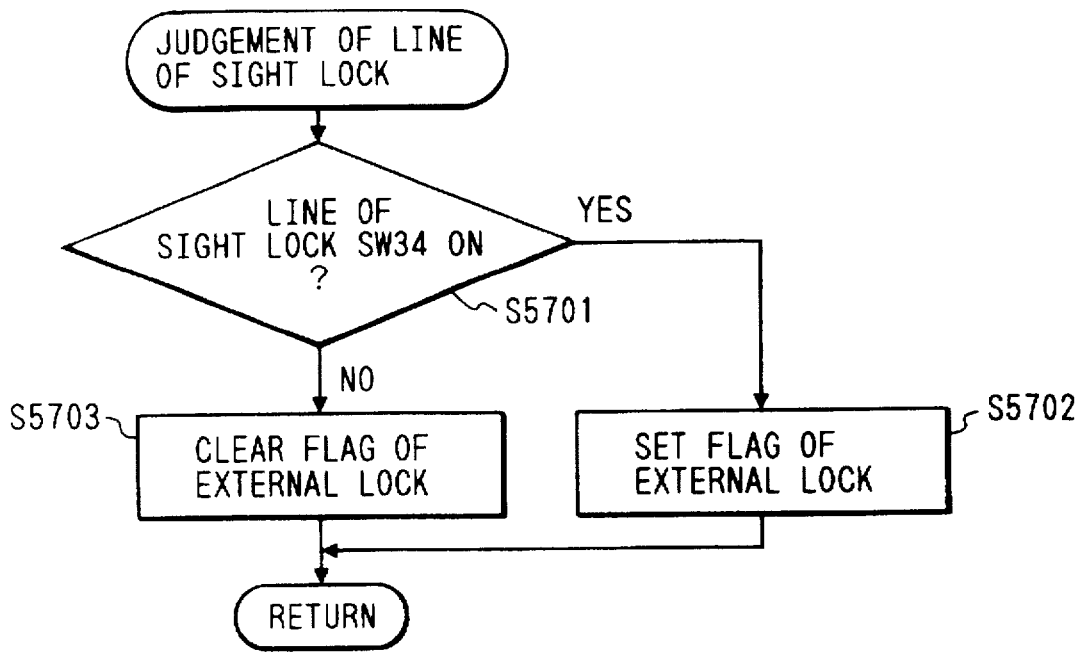
FIG. 78 is a flow chart showing a subroutine of judgement of line of sight lock of the main flow in FIG. 75.

The subroutine of judgement of line of sight lock (step S5303) will be described with reference to FIG. 78.

This subroutine is executed to lock a line of sight position by an external factor.

Step S5701: It is judged in this step whether the line of sight lock switch SW34 is ON. If the switch SW34 is judged to be ON, the flow advances to step S5702 to set a flag of external lock. However, if the switch SW34 is judged to be OFF, the flow advances to step S5703 to clear the flag of external lock.

The subroutine of judgement of start of line of sight detection (step S5304) will be described with reference to FIGS. 79, 80, and 81.

This subroutine is executed to start line of sight detection in a line of sight detectable state.

[FIG. 79]

Step S5801: It is judged in this step whether a photographer is viewing an image through a finder. If the photographer is judged to be viewing the image through the finder, the flow advances to step S5804 to set a flag of start of line of sight detection, and this subroutine returns to the main routine. If NO in step S5801, the flow advances to step S5805 to clear the flag of start of light of sight detection, and this subroutine returns to the main routine.

Detection for judging whether the photographer is viewing the image through the finder can be performed using an output from the line of sight detecting portion 404. More specifically, if line of sight data such as Purkinje's images 1 and 4 can be detected, viewing through the finder is judged. Otherwise, viewing through the finder is not judged.

A conventional external light passive AF may be provided in part of the finder portion, or a touch sensor may be arranged in an eyecup mount to detect whether the photographer is viewing the image through the finder.

[FIG. 80]

Step S5802: It is judged in this step whether preparation of a taking operation is completed. If YES in step S5802, the flow advances to step S5804. If NO in step S5802, the flow advances to step S5805.

Completion of preparation of the taking operation is detected as follows. The presence/absence of a film is detected utilizing a DX code. Film winding is detected by shutter charge. Finally, mounting of a phototaking lens is detected by a signal exchanged between the lens and the body. Any other detecting mechanism may be used if it can pursue the detection purpose.

[FIG. 81]

Step S5803: It is judged in this step whether a finger of the photographer contacts or touches a release button. If YES in step S5803, the flow advances to step S5804 to set the flag of start of line of sight detection, and this subroutine returns to the main routine. However, if NO in step S5803, the flow advances to step S5805. Whether the finger contacts the release button can be detected by arranging a touch sensor on the release button.

Figure 79:
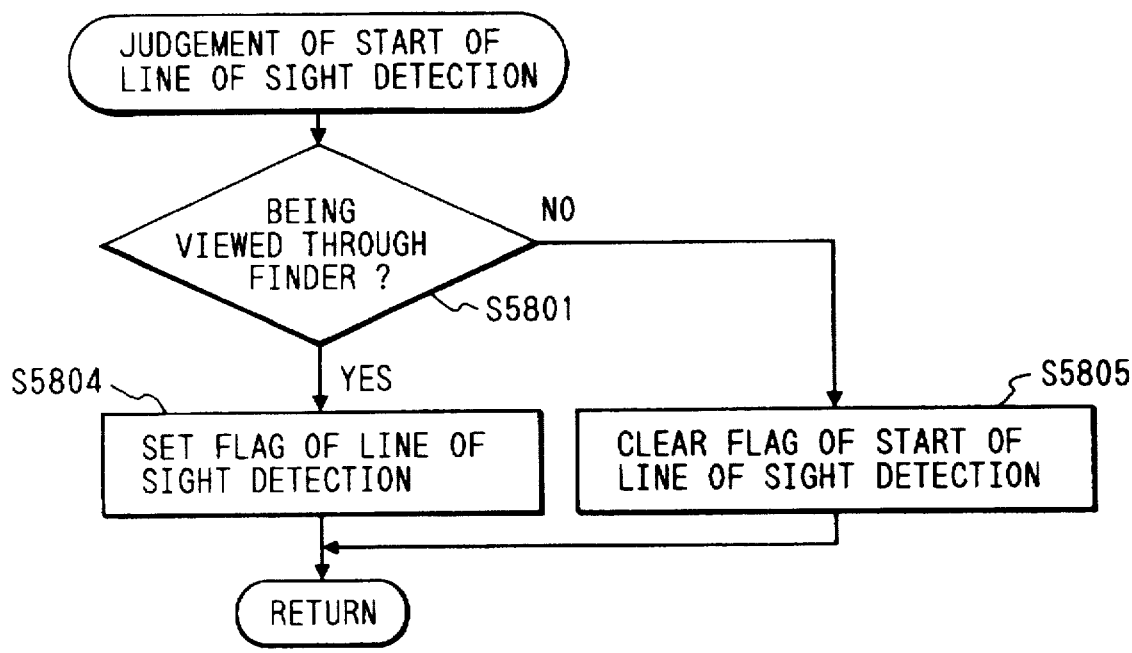
FIG. 79 is a flow chart showing a subroutine of judgement of start of line of sight detection of the main flow in FIG. 75.
Figure 80:
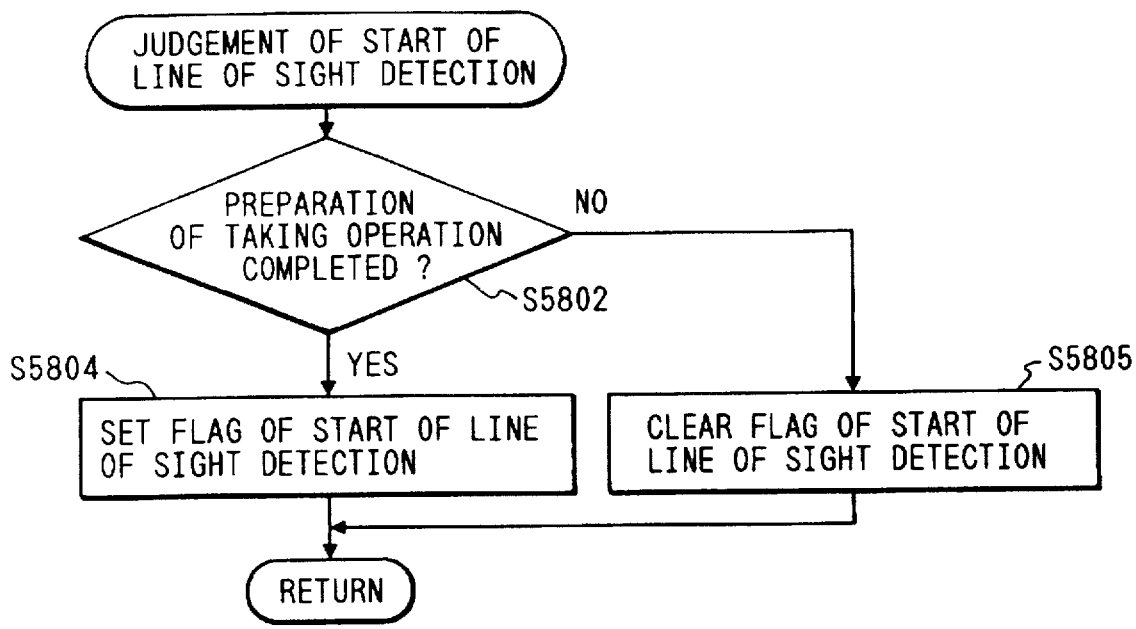
FIG. 80 is a flow chart showing another subroutine of judgement of start of line of sight detection of the main flow in FIG. 75.
Figure 81:
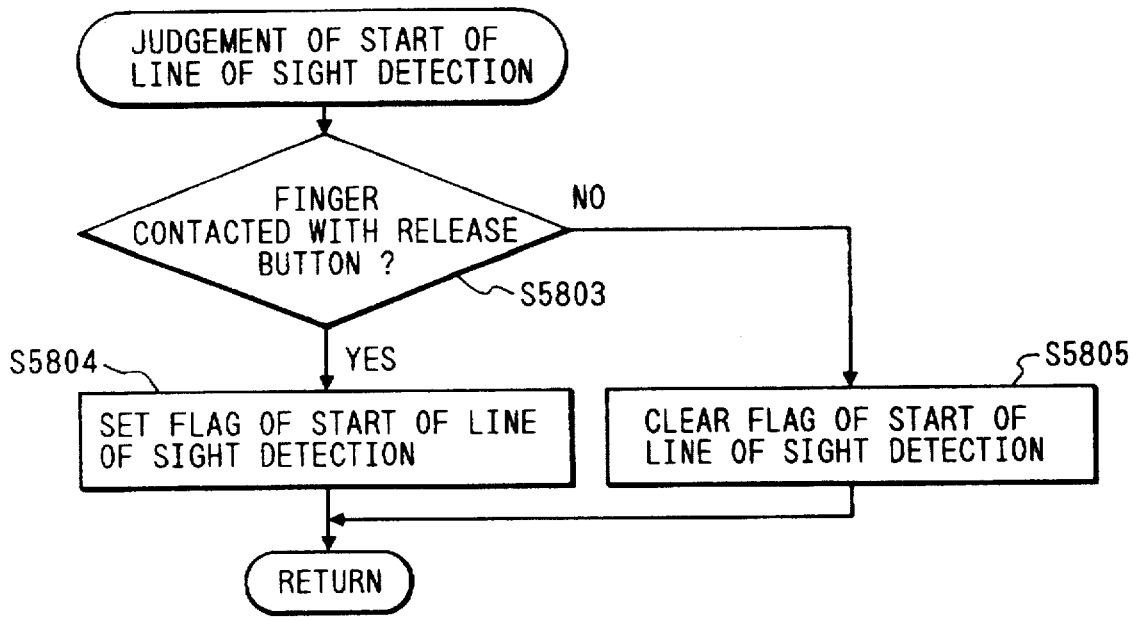
FIG. 81 is a flow chart showing still another subroutine of judgement of start of line of sight detection of the main flow in FIG. 75.

The subroutine of judgement of start of line of sight detection may be achieved by one of the above subroutines in FIGS. 79 to 81 or any combination thereof.

Figure 82:
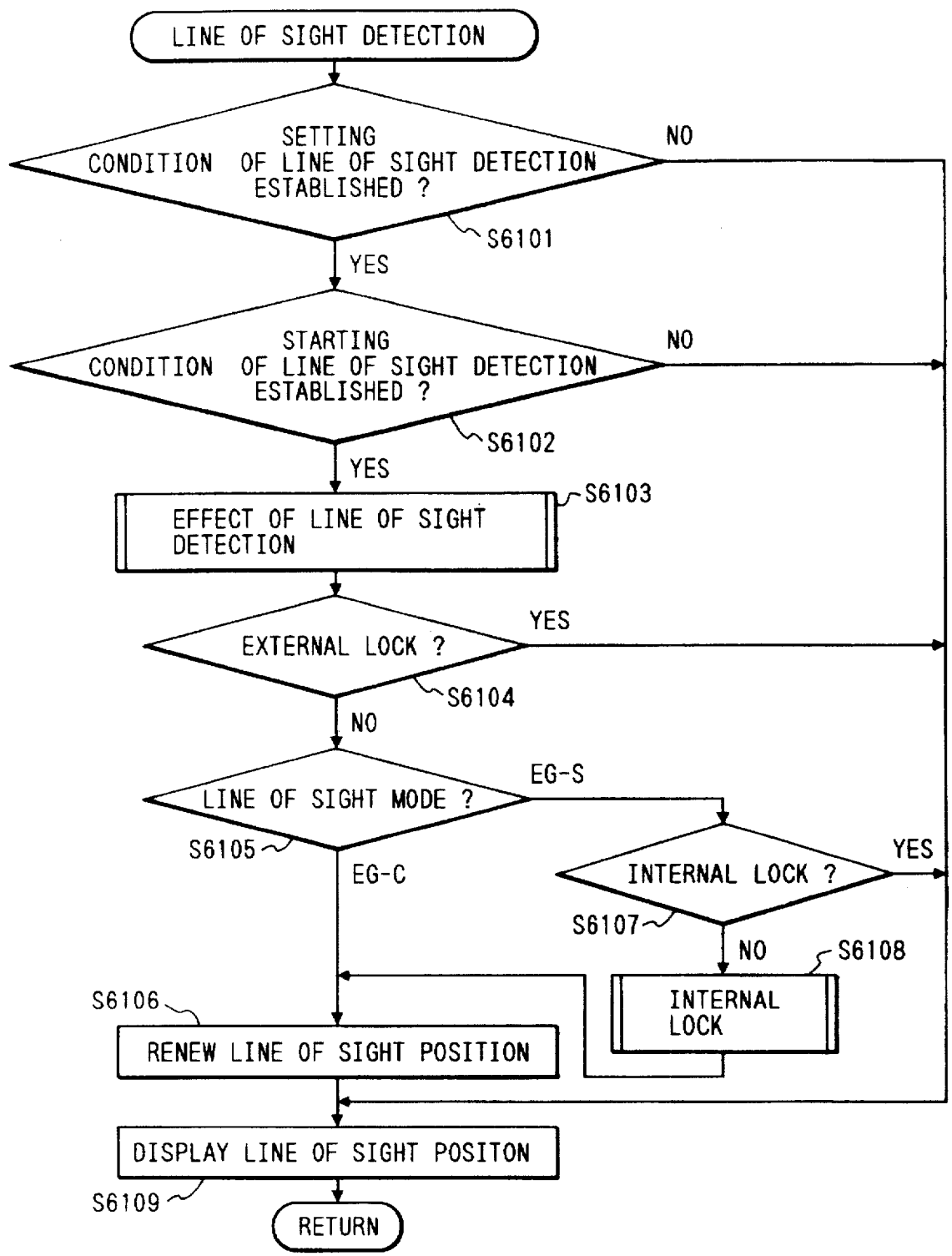
FIG. 82 is a flow chart showing a subroutine of line of sight detection of the main flow in FIG. 75.

The subroutine of line of sight detection (step S5305) will be described with reference to FIG. 82.

Step S6101: It is judged in this step whether the flag of line of sight detection setting is set. If YES in step S6101, the flow advances to step S6102. However, if the flag is judged to be cleared, the flow advances to step S6109.

Step S6102: It is judged in this step whether the flag of start of line of sight detection is set. If YES in step S6102, the flow advances to step S6103. However, if the flag is judged to be cleared, the flow advances to step S6109.

Step S6103: The line of sight detection operation described above is executed to detect a line of sight position.

Step S6104: It is judged in this step whether the flag of external lock is set. If YES in step S6104, the flow advances to step S6109. However, if the flag is judged to be cleared, the flow advances to step S6105.

Step S6105: It is judged in this step whether the line of sight mode is the EG-S or EG-C mode. If the EG-S mode is judged, the flow advances to step S6107. However, when the EG-C mode is judged, the flow advances to step S6106.

Step S6107: Since the line of sight mode is judged as the EG-S mode, it is judged in this step whether the flag of internal lock representing lock is set in this mode. If YES in step S6107, the line of sight position is not renewed, and the flow advances to step S6109. However, if NO in step S6107, the line of sight position is not yet locked in the EG-S mode, so that the flow advances to step S6108.

Step S6108: A subroutine of internal lock shown in FIG. 84 is executed. The subroutine of internal lock will be described in detail later. After execution of this subroutine, the flow advances to step S6106.

Step S6106: The line of sight position is renewed on the basis of the latest line of sight detection result.

The AF and AE are performed by selecting or moving the AF area on the basis of the renewed line of sight position. Alternatively, in consideration of detection errors, the line of sight position may be renewed to a position obtained by statistical processing such as weighted averaging or time averaging of a plurality of previous line of sight detection results.

When the line of sight position is renewed, the flow advances to step S6109 to display the line of sight position in the finder, and this subroutine returns to the main routine.

A subroutine of internal lock (step S6108) will be described with reference to FIG. 83.

Figure 83:
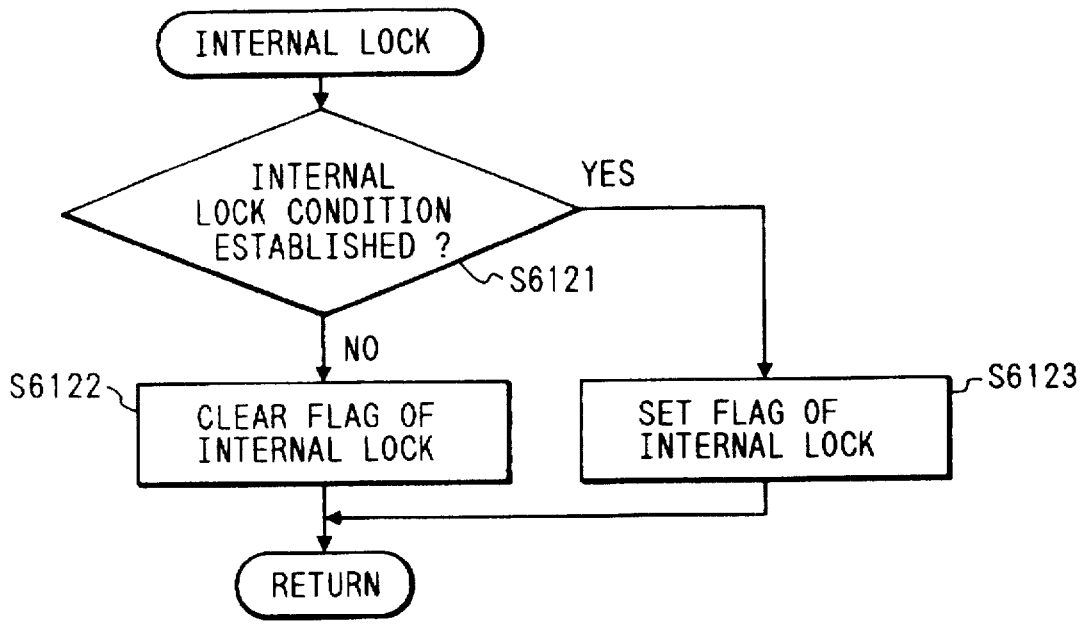
FIG. 83 is a flow chart showing a subroutine of internal lock of the subroutine in FIG. 82.

In the subroutine of internal lock in FIG. 83, it is judged in step S6121 whether an internal lock condition is established. If YES in step S6121, the flow advances to step S6123 to set the flag of internal lock. However, if NO in step S6121, the flow advances to step S6122 to clear the flag of internal lock.

This embodiment has the following four internal lock conditions.

(1) The distance between the current and previous line of sight positions is equal to or less than a predetermined value.

(2) The difference between the current and previous line of sight positions is equal to or less than a predetermined value.

(3) The speed of line of sight movement is equal to or less than a predetermined value.

(4) The eye-gazing time is equal to or more than a predetermined value.

Condition (1) will be described with reference to FIG. 47.

FIG. 47 shows a latest line of sight position $SP_n$, a previous line of sight position $SP_{(n-1)}$, and an mth previous line of sight position $SP_{(n-m)}$. $SP_{(n)}$ represents a coordinate position on the finder screen of the camera. If the following conditions are established:

$$SP_{(n-3)}-SP_{(n-4)}, SP_{(n-2)}-SP_{(n-3)}>L,$$

and $$SP_{(n-1)}-SP_{(n-2)}, SP_{(n)}-SP_{(n-1)} \leq L,$$

the line of sight positions are not locked until the (n−2)th line of sight position, and the (n−1)th line of sight position is locked. In this case, when a predetermined value L is extremely small, locking cannot be performed due to a small voluntary movement (even if a man is gazing at one point, the eyeball slightly oscillates around the eye-gazing point). The predetermined value L is preferably slightly larger than a value corresponding to the oscillation amount of the eyeball which is caused by a small voluntary movement.

Condition (2) is derived such that the distance between the two points in judgement of condition (1) is replaced with the difference between two eyeball rotation angles. Note that since the predetermined value L depends on the sampling time of line of sight detection, condition (3) is derived as a condition normalized by a time interval.

More specifically, when condition $(SP_{(n)}-SP_{(n-)})/T_{(n)}$ <LS, where $T_{(n)}$ is the time interval from previous line of sight detection to the current line of sight detection, is established in condition (3), the line of sight position is locked.

This time interval is measured by a timer incorporated in the CPU 1201.

When conditions (1), (2), and (3) are satisfied for a predetermined time or more, condition (4) is established to lock the line of sight.

One of conditions (1) to (4) or any combination thereof may be used to establish the internal lock condition.

In the camera having the line of sight detecting device with the above arrangement, when the line of sight detection setting switch SW35 is turned on by the photographer, it is judged in accordance with a predetermined judgement condition whether line of sight detection by the line of sight detecting portion 404 is to be started. If the start of line of sight detection is judged to be started, the line of sight detecting portion 404 is operated. Therefore, line of sight detection can be easily and automatically performed only when line of sight detection is required.

Unlike in the conventional camera, the infrared LED does not emit an infrared ray when the photographer does not view an image through the finder or when a phototaking lens is not mounted on the body. The service life of the battery or the infrared LED can be greatly prolonged as compared with the conventional arrangement.

In the camera having the line of sight detecting device, when the photographer views an image through the finder, when preparation of a taking operation is completed, or when the photographer contacts the release button, line of sight detection is started. Therefore, line of sight detection can be easily, properly, and automatically performed as required.

(Twenty-Second Embodiment)

The twenty-second embodiment allows replacement of a finder to another body. Except for judgement of start of line of sight detection, this embodiment is the same as the twenty-first embodiment, and a detailed description thereof will be omitted.

Judgement of start of line of sight detection will be described with reference to FIGS. 84 and 85.

[FIG. 84]

Step S6131: It is judged in this step whether the photographer is viewing an image through the finder. If YES in step S6131, the flow advances to step S6132. However, if NO in step S6131, the flow advances to step S6136 to clear the flag of start of line of sight detection, and this subroutine returns to the main routine.

A conventional external light passive AF may be provided in part of the finder portion, or a touch sensor may be arranged in an eyecup mount to detect whether the photographer is viewing the image through the finder.

Step S6132: It is judged in this step whether preparation of a taking operation is completed. If YES in step S6132, the flow advances to step S6133. However, if NO in step S6132, the flow advances to step S6136.

Completion of preparation of the taking operation is detected as follows. The presence/absence of a film is detected utilizing a DX code. Film winding is detected by shutter charge. Finally, mounting of a phototaking lens is detected by a signal exchanged between the lens and the body. Any other detecting mechanism may be used if it can pursue the detection purpose.

Step S6133: It is judged in this step whether a finger of the photographer contacts or touches the release button. If YES in step S6133, the flow advances to step S6134. However, if NO in step S6133, the flow advances to step S6136. Whether the finger contacts the release button can be detected by arranging a touch sensor on the release button.

Step S6134: It is judged in this step whether the camera body is an AF body. If YES in step S6134, the flow advances to step S6135. However, if NO in step S6134, the Step S6135: to step S6136.

Step S6135: The flag of start of line of sight detection is set, and this subroutine returns to the main routine.

Step S6136: The flag of start of line of sight detection is cleared, and this subroutine returns to the main routine. [FIG. 85]

Steps S6131 to S6133 are the same as those in FIG. 85.

Step S6201: It is judged in this step whether the mounted lens is an AF lens. If YES in step S6201, the flow advances to step S6202. However, if NO in step S6201, the flow advances to step S6203.

Step S6202: It is judged in this step whether a focus detection mode is an AF or manual mode. If the AF mode is judged, the flow advances to step S6135 to set the flag of start of line of sight detection, and this subroutine returns to the main routine. However, if the manual mode is judged, the flow advances to step S6203. Setting of the AF or manual mode can be performed by using an AF mode setting switch (not shown) arranged on the camera body.

Step S6203: Focus detection is performed. It is then judged whether an FA mode for manually driving the lens is set. If YES in step S6203, the flow advances to step S6135. Otherwise, the flow advances to step S6136.

Step S6135: The flag of start of line of sight detection is set, and this subroutine returns to the main routine.

Step S6136: The flag of start of line of sight detection is cleared, and this subroutine returns to the main routine.

Steps S6131 and S6132 are independently set as in the twenty-first embodiment.

In the twenty-second embodiment, line of sight detection is started upon detection of an AF set state. However, the line of sight detection may be started in correspondence with a photometering mode. For example, in multi-divisional photometering or spot photometering, line of sight detection is performed. However in centralized photometering on the frame central position, line of sight detection is inhibited. The AF and photometering operations may be combined to judge the start of line of sight detection.

The same effect as in the twenty-first embodiment can be obtained even in the camera having the line of sight detecting device having the above arrangement. In the twenty-second embodiment, a given type of finder can be easily used in different types of camera bodies.

(Twenty-Third Embodiment)

The twenty-third embodiment can be obtained by adding a line of sight detection forced start switch SW36 to the arrangement of each of the twenty-first and twenty-second embodiment.

Figure 86:
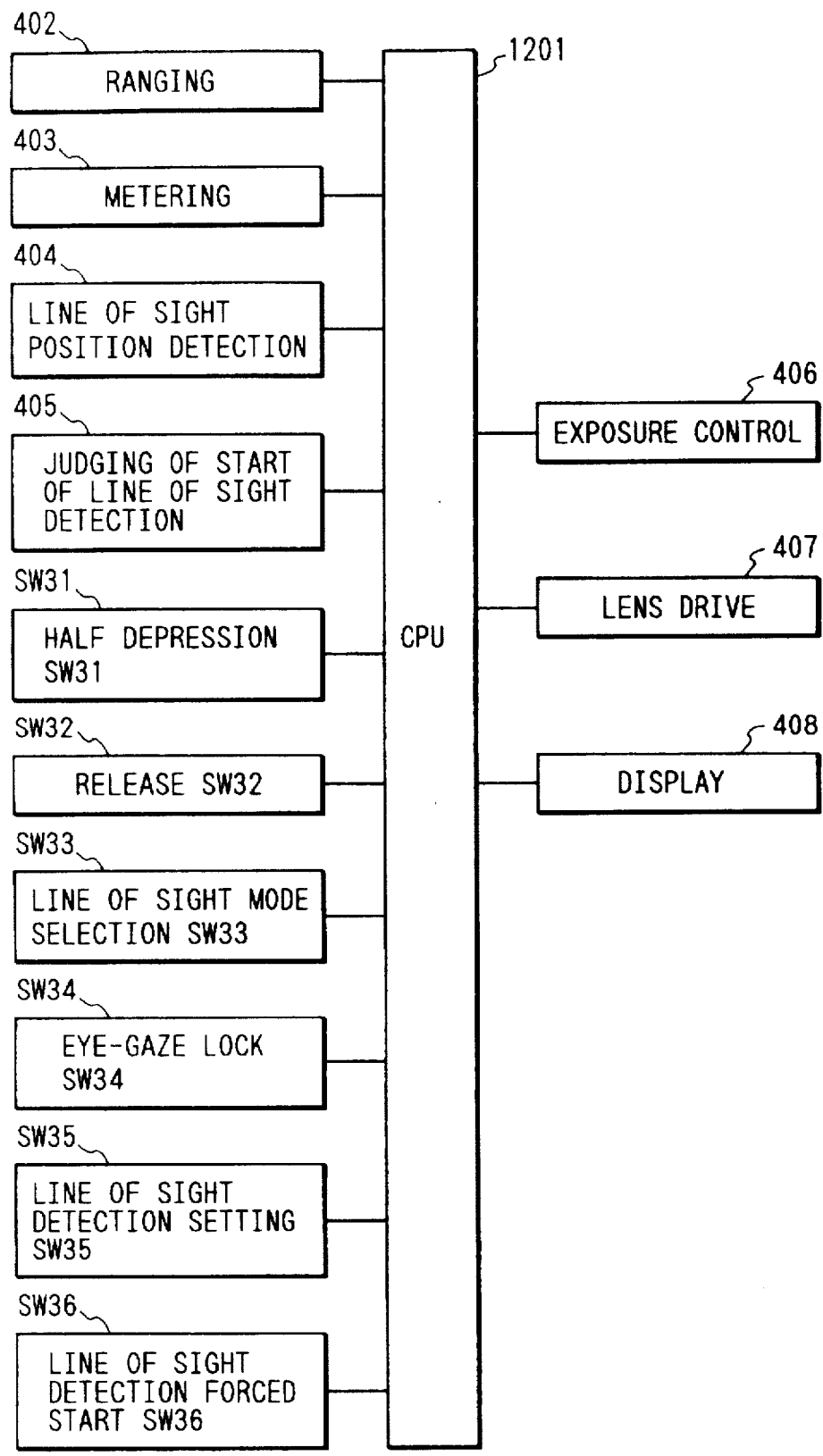
FIG. 86 is a block diagram of a camera having a light of sight detecting device according to the twenty-third embodiment of the present invention.

FIG. 86 is a block diagram of the twenty-third embodiment, and the line of sight detection forced start switch SW36 is provided in the block diagram in FIG. 86.

Figure 87:
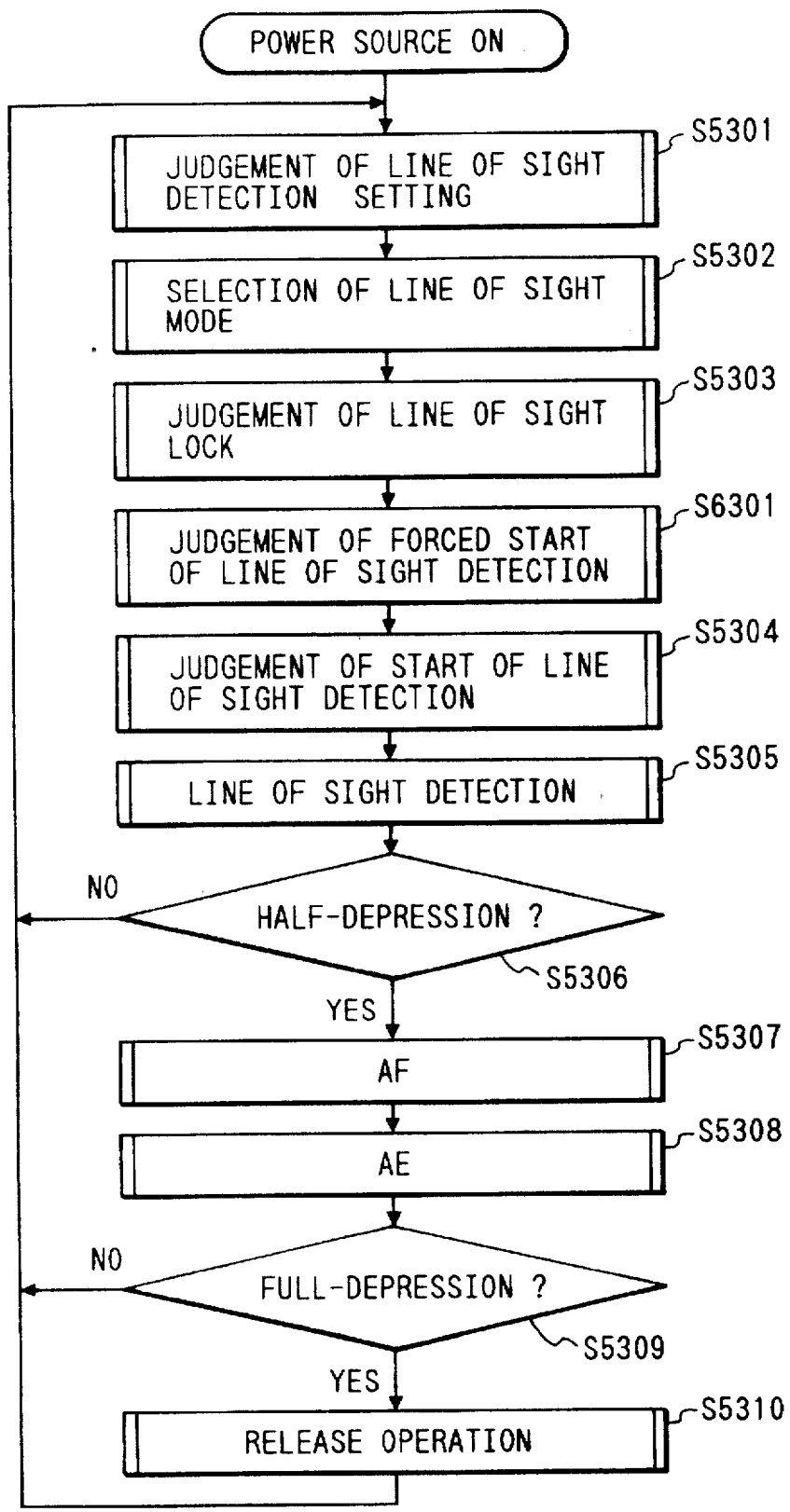
FIG. 87 is a flow chart showing a main flow of the camera having the line of sight detecting device shown in FIG. 86.

FIG. 87 is a flow chart showing a main flow of the twenty-third embodiment.

Judgement of forced start of line of sight detection is newly added as step S6301 to judge whether line of sight detection is to be forcibly performed. Whether line of sight detection is to be forcibly performed is set by the line of sight detection forced start switch SW36. Other arrangements are the same as those of each of the twenty-first and twenty-second embodiments, and a detailed description thereof will be omitted.

Figure 88:
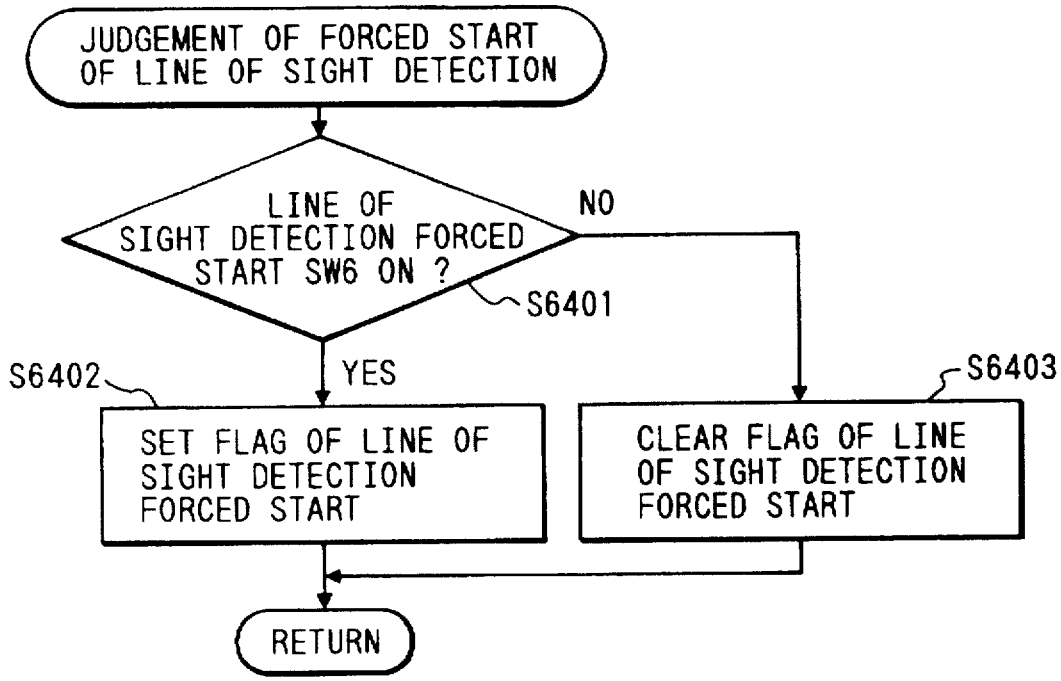
FIG. 88 is a flow chart showing a subroutine of judgement of forced start of line of sight detection of the main flow in FIG. 87.

FIG. 88 shows a subroutine of judgement of forced start of line of sight detection (step S6301).

This subroutine is executed by the photographer with the line of sight detection forced start switch SW36.

Step S6401: It is judged in this step whether the line of sight detection forced start switch SW36 is ON. If YES in step S6401, the flow advances to step S6402 to set a flag of line of sight detection forced start. However, if NO in step S6401, the flow advances to step S6403 to set a flag of line of sight detection forced start, and this subroutine returns to the main flow.

Figure 89:
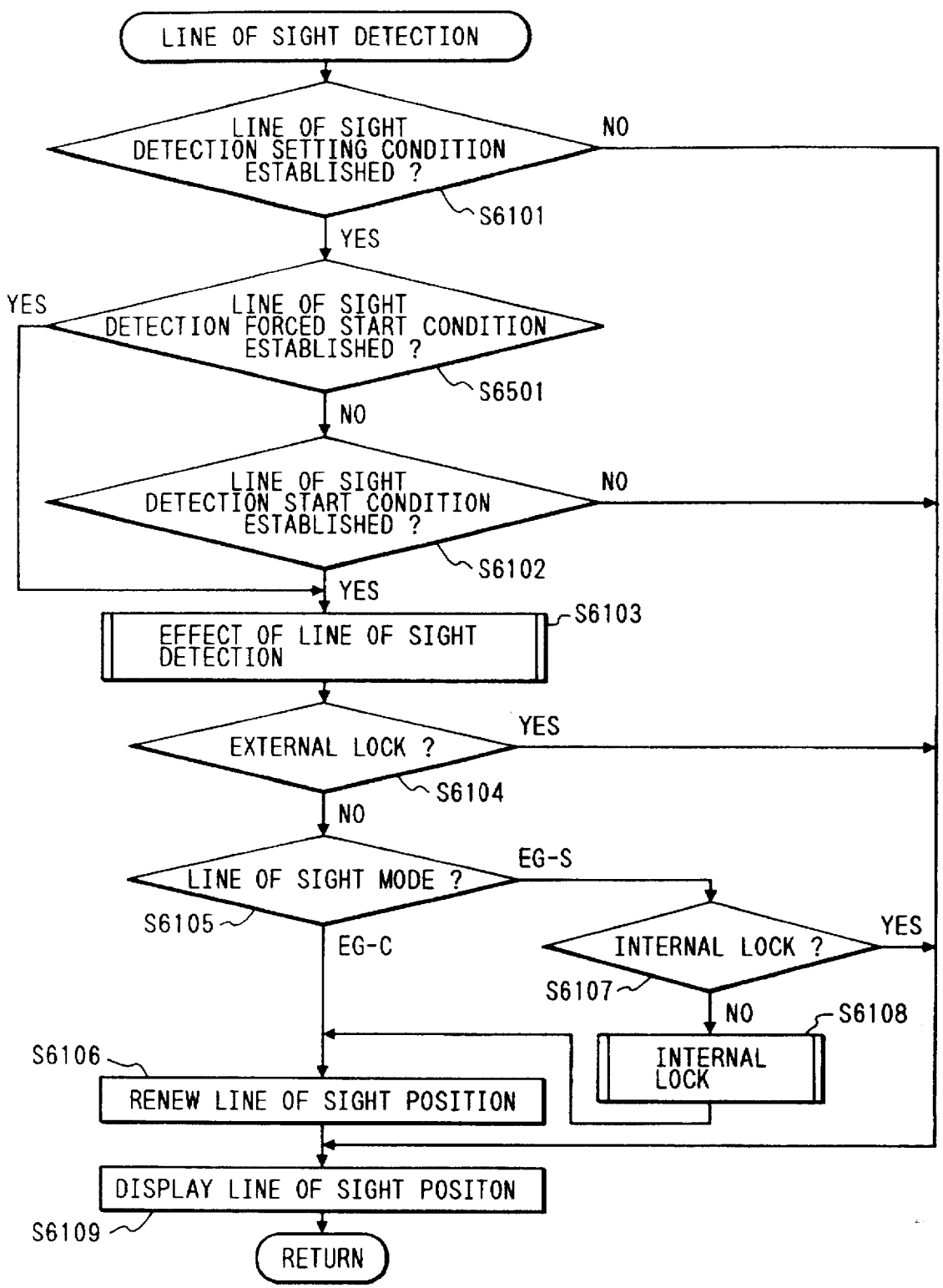
FIG. 89 is a flow chart showing a subroutine of line of sight detection.

FIG. 89 shows a subroutine of line of sight detection according to the twenty-third embodiment.

Step S6501 for judging whether a line of sight detection forced start condition is established is added to the above main flow. Other arrangements are the same as those of each of the twenty-first and twenty-second embodiments.

Step S6501: It is judged in this step whether the flag of forced start of line of sight detection is set. If YES in step S6501, judgement of line of sight detection start condition is not performed, and the flow advances to step S6103. However, if NO in step S6501, the flow advances to step S6102.

The same effect as in the twenty-first embodiment can be obtained in the camera having the line of sight detecting device with the above arrangement. In addition, in the twenty-third embodiment, detection of the line of sight position can be forcibly started.

As has been described above, in a camera having a line of sight detecting device according to the present invention, the portion of judgement of start of line of sight detection judges whether line of sight detection by the line of sight detection or detecting portion is to be started. If the start of line of line of sight detection is judged, the line of sight detection or detecting portion is operated. Therefore, line of sight detection can be automatically and easily performed only when line of sight detection is required.

Whether detection of the line of sight position is to be started can be easily and properly judged.

In addition, the present invention has an advantage in that detection of the line of sight position can be forcibly started.

What is claimed is:

1. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area in a portion of a view field to be photographed, for at least a predetermined finite period of time, based on a plurality of past line of sight positions provided by said line of sight detecting circuit;

an eye-gazing position setting circuit which sets a point in the particular finite area, first judged by said eye-gazing judging circuit as being eye-gazed, to an eye-gazing position; and a focus detecting circuit which effects focus detection at the eye-gazing position set by said eye-gazing position setting circuit.

2. A camera having a line of sight detecting device according to claim 1, wherein said eye-gazing judging circuit judges that the photographer is eye-gazing at the particular finite area for at least the predetermined finite period of time when there is satisfied at least one of a first condition in which a distance between the previous line of sight position and the present line of sight position is smaller than a predetermined value, a second condition in which a difference between the previous rotation angle and the present rotation angle of an eyeball of the photographer is smaller than a predetermined value, and a third condition in which speed of movement of said eyeball is smaller than a predetermined value.

3. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area in a portion of a view field to be photographed, for at least a predetermined finite period of time, based on a plurality of past line of sight positions provided by said line of sight detecting circuit;

an eye-gazing position setting circuit which sets a point in the particular finite area, judged by said eye-gazing judging circuit as being eye-gazed, to an eye-gazing position; and a focus detecting circuit which effects a focus detection at a line of sight position detected by said line of sight position detecting circuit, before an eye-gazing is judged by said eye-gazing judging circuit, and effects a focus detection at the eye-gazing position set by said eye-gazing position setting circuit, after an eye-gazing is judged.

4. A camera having a line of sight detecting device comprising:

a line of sight detecting circuit which detects line of sight positions of a photographer, based on light reflected by an eye of the photographer;

an eye-gazing judging circuit which Judges whether or not the photographer is eye-gazing at a particular finite area in a portion of a view field to be photographed, for at least a predetermined finite period of time, based on a plurality of past line of sight positions provided by said line of sight detecting circuit;

an eye-gazing position setting circuit which sets a point in the particular finite area, judged by said eye-gazing judging circuit as being eye-gazed, to an eye-gazing position; and a focus detecting circuit having a first mode in which focus detection is effected at the eye-gazing position first set by said eye-gazing position setting circuit and a second mode in which focus detection is effected at a new eye-gazing position each time when said eye-gazing position setting circuit sets a new eye-gazing position; and a mode selector for selecting either the first mode or the second mode.

5. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area in a portion of a view field to be photographed, for at least a predetermined finite period of time, based on a plurality of past line of sight positions provided by said line of sight detecting circuit;

an eye-gazing position setting circuit which sets a point in the particular finite area, judged by said eye-gazing judging circuit as eye-gazed, to an eye-gazing position; and a focus detecting circuit which effects focus detection at a focus detecting position corresponding to the eye-gazing position set by said eye-gazing position setting circuit or at a region surrounding the eye-gazing position and which detects in-focus or out-of-focus at either said focus detecting position or region; and a fixing circuit which fixes either said focus detecting position or region after at least a predetermined finite period of time, when, after said focus detecting circuit detects in-focus, the eye-gazing position judged by said eye-gazing judging circuit is coincident with the eye-gazing position set by said eye-gazing position setting circuit for at least said predetermined finite period of time.

6. A camera having an eye-gazing detecting device comprising:

a line of sight detecting circuit which detects line of sight positions of a photographer, based on light reflected by an eye of the photographer;

a focus detection circuit which effects focus detection at either a focus detecting position corresponding to a line of sight position detected by said line of sight detecting circuit or at a region surrounding said line of sight position to detect in-focus or out-of-focus at the focus detecting position or region; and a fixing circuit which fixes either said focus detecting position or region once said focus detection circuit has detected in-focus.

7. A camera having a line of sight detecting device, comprising:

a line of sight detecting circuit which detects line of sight positions of a photographer in a phototaking field formed by a phototaking lens provided on said camera;

a region setting circuit which sets a plurality of focus detecting regions in said phototaking field in response to respective line of sight positions detected by said line of sight detecting circuit; and a focus detecting circuit which effects focus detection at focus detecting regions set by said region setting circuit.

8. A camera having a line of sight detecting device comprising:

a line of sight detecting circuit which detects line of sight positions of a photographer in a phototaking field formed by a phototaking lens provided on said camera;

a movement amount detecting circuit which detects amount of movement of a line of sight position detected by said line of sight detecting circuit; and a focus detecting circuit which alters the size of a focus detecting region in said phototaking field based on an amount of movement detected by said movement amount detecting circuit and which detects focus at the altered focus detecting region.

9. A camera having a line of sight detecting device comprising:

a line of sight detecting circuit which detects line of sight positions of a photographer in a phototaking field formed by a phototaking lens provided on said camera;

a movement amount detecting circuit which detects amount of movement of a line of sight position detected by said line of sight detecting circuit;

a focus detecting circuit which effects focus detection at a focus detecting region in said phototaking field to detect in-focus or out-of-focus of the region; and a lens drive circuit having at least two lens drive modes including a continuous mode in which, based on a result of detection by said focus detecting circuit, and phototaking lens is continuously driven, and a single mode in which, based on a result of detection by said focus detecting circuit, said phototaking lens is driven to reach in-focus and drive of said phototaking lens is prohibited after the in-focus is reached, the lens drive circuit changing said lens drive modes in accordance with the amount of movement detected by said movement amount detecting circuit.

10. A camera having a line of sight detecting device according to claim 9, wherein said focus detecting circuit effects focus detection in a focus detecting region corresponding to a detected line of sight position.

11. A camera having a line of sight detecting device comprising:

a camera angle detecting circuit which detects an amount of rotation of the camera;

a line of sight detecting circuit which detects line of sight positions of a photographer in a phototaking field formed by a phototaking lens provided on the camera;

a line of sight angle detecting circuit which detects an amount of rotation of line of sight from an amount of movement of the line of sight position detected by said line of sight detecting circuit; and a line of sight lock detecting circuit which detects a line of sight lock state in which a same object is continuously watched by the photographer, based on the amount of rotation of the camera detected by said camera angle detecting circuit and the amount of rotation of line of sight detected by said line of sight angle detecting circuit.

12. A camera according to claim 11 further comprising:

a focus detecting circuit which effects focus detection in a focus detecting region in said phototaking field;

a lens drive device which drives said phototaking lens based on a result of the focus detection effected by said focus detecting circuit; and a focus lock circuit which prohibits lens drive by said lens drive device when a line of sight locked state is detected by said line of sight lock detecting circuit.

13. A camera according to claim 11 further comprising:

a photometering circuit which photometers in a photometering region in the phototaking field; and a photometering locking circuit which locks a photometric value by said photometering circuit when said line of sight lock state is detected by said line of sight lock detecting circuit.

14. A camera having a line of sight detecting device comprising:

an exposure control circuit which controls exposure operation to expose a film loaded in the camera to a phototaking field formed by a phototaking lens provided on the camera;

a line of sight detecting circuit which detects line of sight positions of a photographer in said phototaking field;

a focus detecting circuit which effects focus detection in a focus detecting region in said phototaking field to detect in-focus or out-of-focus of the region; and an exposure starting circuit which starts exposure operation by said exposure control circuit when, after said focus detecting circuit detects in-focus in said focus detecting region and within a predetermined finite period of time, a line of sight position detected by said line of sight detecting circuit coincides with said focus detecting region.

15. A camera having a line of sight detecting device comprising:

a line of sight detecting circuit which detects line of sight positions of a photographer in a phototaking field formed by a phototaking lens provided on the camera;

a focus detecting circuit which effects focus detection in a focus detecting region in said phototaking field to detect in-focus or out-of-focus of the region;

a lens drive device which drives said phototaking lens based on a result of focus detection by said focus detecting circuit; and a lens drive prohibiting circuit which prohibits lens drive by said lens drive device when, after said focus detecting circuit detects in-focus in said focus detecting region and within at least a predetermined finite period of time, the line of sight position detected by said line of sight detecting circuit coincides with said focus detecting region.

16. A camera having a line of sight detecting device comprising:

a line of sight detecting circuit which detects line of sight positions of a photographer in a phototaking field formed by a phototaking lens provided on the camera;

a line of sight setting device operable by a photographer for setting whether or not said line of sight detecting circuit is operated; and an allowing circuit which allows line of sight detecting by said line of sight detecting circuit only when operation of said line of sight detecting circuit is set by said line of sight setting device and a predetermined photographing condition is satisfied.

17. A camera having a line of sight detecting device according to claim 16, wherein said camera includes a finder, and said photographing condition is a condition in which a photographer watches through said finder.

18. A camera having a line of sight detecting device according to claim 16, wherein said camera includes a film loading portion for loading a film in the camera and a shutter device that is charged to control light reaching said film from the phototaking lens; and said photographing condition is a condition in which said film is loaded in said film and said shutter device is charged.

19. A camera having a line of sight detecting device according to claim 16, further comprising:

a release button, wherein upon operation of said release button an exposure operation is started, and wherein said photographing condition is a condition in which a photographer is in contact with the release button.

20. A camera comprising:

a line of sight detecting device which detects line of sight positions of a photographer in a phototaking field formed by a phototaking lens provided on the camera and outputs a result of line of sight position detection;

an optical system detecting device which detects whether or not an optical system is present between said line of sight detecting device and an eye of the photographer; and a correcting circuit which corrects the result of line of sight position detection by said line of sight detecting device, based on a result of detection by said optical system detecting device.

21. A camera comprising:

a line of sight detecting device which detects line of sight positions of a photographer in a phototaking field formed by a phototaking lens provided on the camera and outputs a result of line of sight position detection;

an optical system detecting device which detects whether or not an optical system is present between said line of sight detecting device and an eye of the photographer; and a correcting circuit which corrects the result of line of sight position detection by said line of sight detecting device, based on a result of detection by said optical system detecting device, wherein said correcting circuit, when said optical system detecting device detects an optical system, makes the result of line of sight position detection by said line of sight detecting device a line of sight position at a central region of said phototaking field.

22. A method of operating a camera, comprising:

detecting line of sight positions of a photographer, based on light reflected by an eye of the photographer;

judging whether or not the photographer is eye-gazing at a particular finite area in a portion of a view field to be photographed, for at least a predetermined finite period of time, based on a plurality of detected line of sight positions;

setting a point in the particular finite area, judged as being eye-gazed, to an eye-gazing position; and effecting focus detection at the eye-gazing position.

23. A method according to claim 22, wherein it is judged that the photographer is eye-gazing at the particular finite area for at least the predetermined finite period of time when there is satisfied at least one of a first condition in which a distance between a previous line of sight position and the present line of sight position is smaller than a predetermined value, a second condition in which a difference between a previous rotation angle and the present rotation angle of an eyeball of the photographer is smaller than a predetermined value, and the third condition in which speed of movement of said eyeball is smaller than a predetermined value.

24. A method according to claim 22, wherein focus detection is effected at a new eye-gazing position each time a new eye-gazing position is set.

25. A method according to claim 22, wherein focus detection is effected at either an eye-gazing position first set, or a new eye-gazing position each time a new eye-gazing position is set.

26. A method of operating a camera, comprising:

detecting line of sight positions of a photographer, based on light reflected by an eye of the photographer;

judging whether or not the photographer is eye-gazing at a particular finite area in a portion of a view field to be photographed, for at least a predetermined finite period of time, based on a plurality of detected line of sight positions;

setting a point in the particular finite area, judged as being eye-gazed, to an eye-gazing position; and effecting focus detection at either a focus detecting position corresponding to the set eye-gazing position or at a region surrounding the eye-gazing position; and fixing either said focus detecting position or region after at least a predetermined finite period of time, when, after said focus detecting detects in-focus, the judged eye-gazing position is coincident with the set eye-gazing position for at least said predetermined finite period of time.

27. A method of operating a camera, comprising:

detecting line of sight positions of a photographer, based on light reflected by an eye of the photographer;

detecting in-focus or out-of-focus at either a focus detecting position corresponding to a detected line of sight position or at a region surrounding the detected line of sight position; and fixing either said focus detecting position or region once in-focus is detected.

28. A method of operating a camera, comprising:

detecting line of sight positions of a photographer, based on light reflected by an eye of the photographer;

judging whether the photographer is eye-gazing at a particular finite area which is a portion of a view field to be photographed, based on a plurality of detected line of sight positions; and selecting either of a first line of sight detecting mode, in which a line of sight position detected for a first time is fixed, and a second line of sight detecting mode, in which line of sight detecting is performed continuously.

29. A method according to claim 28, further comprising detecting in-focus or out-of-focus of a focus detecting region in said view field; and selecting either a first focus detecting mode, in which once in-focus is detected further focus detecting is prohibited, and a second focus detecting mode, in which focus detecting is performed continuously; and wherein said first line of sight detecting mode is selected when said first focus detecting mode is selected, and said second line of sight detecting mode is selected when said second focus detecting mode is selected.

30. A method of operating a camera according to claim 28, wherein it is judged that the photographer is eye-gazing at a particular finite area for at least a predetermined finite period of time when there is satisfied at least one of a first condition in which a distance between the previous line of sight position and the present line of sight position is smaller than a predetermined value, a second condition in which a difference between a previous rotation angle and the present rotation angle of an eyeball of the photographer is smaller than a predetermined value, and a third condition in which speed of movement of said eyeball is smaller than a predetermined value.

31. A method of operating a camera according to claim 28, further comprising:

judging whether or not an object to be photographed is a moving body;

wherein said second line of sight detecting mode is selected when it is judged that the object to be photographed is a moving body.

32. A method of operating a camera, comprising:

detecting line of sight positions of a photographer, based on light reflected by an eye of the photographer;

judging whether or not the photographer is eye-gazing at a particular finite area in a view field to be photographed for at least a predetermined finite period of time, based on a plurality of detected line of sight positions; and selecting either a first line of sight detecting mode in which a detected line of sight position is fixed until a new line of sight position is detected, or a second line of sight detecting mode in which line of sight detecting is performed continuously.

33. A method of operating a camera, comprising:

detecting line of sight positions of a photographer in a phototaking field;

setting a plurality of focus detection regions in said phototaking field in response to respective detected line of sight positions; and effecting focus detection at said focus detecting regions.

34. A method of operating a camera, comprising:

detecting line of sight positions of a photographer in a phototaking field;

detecting an amount of movement of a detected line of sight position; and effecting focus detection in a focus detection region the size of which is altered based on the detected amount of movement.

35. A method of operating a camera, comprising:

detecting line of sight positions of a photographer in a phototaking field;

detecting an amount of movement of a detected line of sight position;

detecting in-focus or out-of-focus at a focus detecting region in said phototaking field; and selecting either a first lens drive mode in which, based on a result of focus detecting, a phototaking lens is driven continuously, or a second lens drive mode in which, based on a result of focus detecting, the phototaking lens is driven to reach in-focus and then lens driving is prohibited, the selected lens drive mode being based on an amount of movement detected.

36. A method of operating a camera according to claim 35, wherein said focus detecting is effected in a focus detecting region corresponding to a detected line of sight position.

37. A method of operating a camera, comprising:

detecting line of sight positions of a photographer in a phototaking field, in order to determine an eye-gazing position of the photographer;

selecting either a first mode, in which a detected line of sight position is locked, when a plurality of detected line of sight positions satisfy a predetermined eye-gazing condition, or a second mode, in which line of sight detecting is performed continuously, said second mode being selected depending upon a predetermined phototaking condition of the camera and eye-gazing position of the photographer.

38. A method of operating a camera, comprising:

detecting an amount of rotation of the camera;

detecting line of sight positions of a photographer in a phototaking field;

detecting an amount of rotation of a line of sight from an amount of movement of a detected line of sight position; and detecting a line of sight lock state in which a same object is continuously watched by the photographer, based on an amount of detected rotation of the camera and an amount of detected rotation of the line of sight.

39. A method of operating a camera according to claim 38, further comprising:

effecting focus detection in a focus detecting region in said phototaking field;

providing a lens drive signal based on a result of the focus detection; and inhibiting said lens drive signal when the line of sight lock state is detected.

40. A method of operating a camera according to claim 38, further comprising:

photometering in a region in the phototaking field; and locking a photometric value obtained by said photometering when said line of sight lock state is detected.

41. A method of operating a camera, comprising:

detecting line of sight positions of a photographer in a phototaking field;

effecting focus detection to detect in-focus or out-of-focus in a focus detecting region in said phototaking field; and starting an exposure operation when, after in-focus is detected in said focus detecting region and within a predetermined finite period of time, a line of sight position is detected which coincides with said focus detecting region.

42. A method of operating a camera, comprising:

detecting line of sight positions of a photographer in a phototaking field;

effecting focus detection to detect in-focus or out-of-focus in a focus detecting region in said phototaking field;

providing a lens drive signal based on a result of said focus detection; and inhibiting said lens drive signal when, after in-focus is detected in said focus detecting region and within a predetermined finite period of time, a detected line of sight position coincides with said focus detecting region.

43. A method of operating a camera, comprising:

providing a line of sight detecting device for detecting line of sight positions of a photographer in a photographing field;

providing a device for setting whether or not said line of sight detecting device is operated; and allowing said line of sight detecting only when operation of said line of sight detecting device is set by said line of sight setting device and a predetermined photographing condition is satisfied.

44. A method of operating a camera according to claim 43, further comprising:

providing said camera with a finder, and wherein said photographing condition is a condition in which a photographer watches through said finder.

45. A method of operating a camera according to claim 43, wherein said camera is provided with a film loading portion for loading a film in the camera and a shutter device that is charged to control light reaching said film, and wherein said phototaking condition is a condition in which said film is loaded in said film loading portion and said shutter device is charged.

46. A method of operating a camera according to claim 43, wherein said camera is provided with a release button and said phototaking condition is a condition in which a photographer half-depresses the release button.

47. A method according to claim 43, wherein an exposure operation of said camera is started by operation of a release button, and wherein said photographing condition is a condition in which a photographer is in contact with the release button.

48. A method of operating a camera, comprising:

providing a camera with a line of sight detecting device which detects line of sight positions of a photographer in a phototaking field and outputs a result of line of sight position detection;

detecting whether or not an optical system is present between said line of sight detecting device and an eye of the photographer; and correcting the result of line of sight detection based on whether an optical system is present between said line of sight detecting device and said eye of the photographer.

49. A method of operating a camera according to claim 48, wherein said correcting makes the result of line of sight position detection a line of sight position at a central region of said phototaking field.

50. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area to be photographed based on a plurality of past line of sight positions provided by said line of sight detecting circuit;

a line of sight information determination circuit which determines line of sight information for controlling the camera based on the line of sight of the photographer; and a line of sight control circuit which controls said line of sight information determination circuit so as to set a line of sight position detected by said line of sight detecting circuit as said line of sight information before eye-gazing is judged by said eye-gazing judging circuit, and to fix said line of sight information to a line of sight position at the time of judgment of the eye-gazing after eye-gazing is judged.

51. A camera having a line of sight detecting device according to claim 50, wherein said eye-gazing judging circuit judges that the photographer is eye-gazing at a particular finite area for at least a predetermined finite period of time when there is satisfied at least one of a first condition in which a distance between the previous line of sight position and the present line of sight position is smaller than a predetermined value, a second condition in which a difference between the previous rotation angle and the present rotation angle of an eyeball of the photographer is smaller than a predetermined value, and a third condition in which speed of movement of said eyeball is smaller than a predetermined value.

52. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area to be photographed based on a plurality of past line of sight positions detected by said line of sight detecting circuit;

a line of sight information determination circuit which determines line of sight information for controlling the camera based on the line of sight of the photographer;

a first line of sight control circuit which controls said line of sight information determination circuit so as to set a line of sight position detected by said line of sight detecting circuit as said line of sight information; and a second line of sight control circuit which controls said line of sight information determination circuit so as to set a line of sight position detected by said line of sight detecting circuit as said line of sight information before eye-gazing is judged by said eye-gazing judging circuit, and to fix said line of sight information to a line of sight position at the time of judgment of the eye-gazing after eye-gazing is judged.

53. A camera having a line of sight detecting device according to claim 52, further comprising:

a line of sight mode selector which selects one of said first line of sight control circuit and second line of sight control circuit.

54. A camera according to claim 53, further comprising:

a focus detecting circuit which detects in-focus or out-of-focus of a focus detecting region which is a portion of a phototaking field formed by a phototaking lens provided on said camera;

an AF control circuit which effects focus control of said phototaking lens, which has an AF single mode in which once said focus detecting circuit detects in-focus of the phototaking lens, further focus control of the phototaking lens is prohibited, and which has an AF continuous mode in which the phototaking lens is always focus-controlled based on output from said focus detecting circuit; and an AF mode selector for selecting at least one of said AF modes of said AF control circuit;

wherein said line of sight mode selector selects said second line of sight control circuit when said AF mode selector selects said AF single mode and selects said first line of sight control circuit when said AF continuous mode is selected.

55. A camera according to claim 53, further comprising:

a moving body judging circuit which judges whether or not an object to be photographed is a moving body;

wherein said line of sight mode selector selects said first line of sight control circuit when it is judged that the object to be photographed is a moving body.

56. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area to be photographed based on a plurality of past line of sight positions provided by said line of sight detecting circuit;

a line of sight information determination circuit which determines line of sight information for controlling the camera based on the line of sight of the photographer;

a first line of sight control circuit which controls said line of sight information determination circuit so as to set a line of sight position detected by said line of sight detecting circuit as said line of sight information;

a second line of sight control circuit which controls said line of sight information determination circuit so as to set a line of sight position detected by said line of sight detecting circuit as said line of sight information before eye-gazing is judged by said eye-gazing judging circuit, and to fix said line of sight information to a line of sight position at the time of judgment of the eye-gazing after eye-gazing is judged;

a third line of sight control circuit which controls said line of sight information determination circuit so as to set a line of sight position detected by said line of sight detecting circuit as said line of sight information before eye-gazing is judged by said eye-gazing judging circuit, and to fix said line of sight information after eye-gazing is judged until eye-gazing is judged the next time; and a line of sight mode selector which selects one of said first, second and third line of sight control circuits.

57. A camera having a line of sight detecting device comprising:

a line of sight detecting circuit which detects line of sight positions of a photographer, based on light reflected by an eye of the photographer;

an eye-gazing judging circuit which judges whether or not the photographer is eye-gazing at a particular finite area to be photographed based on a plurality of past line of sight positions provided by said line of sight detecting circuit;

a line of sight information determination circuit which determines line of sight information for controlling the camera based on the line of sight of the photographer;

a first line of sight control circuit which controls said line of sight information determination circuit so as to set a line of sight position detected by said line of sight detecting circuit as said line of sight information;

a second line of sight control circuit which controls said line of sight information determination circuit so as to set a line of sight position detected by said line of sight detecting circuit as said line of sight information before eye-gazing is judged by said eye-gazing judging circuit, and to fix said line of sight information to a line of sight position at the time of judgment of the eye-gazing after eye-gazing is judged;

a camera function setting circuit which renders a function of the camera able to be set by said line of sight detecting circuit;

a manual operation member which starts said camera function setting circuit upon operation thereof; and a line of sight mode selector which selects one of said first line of sight control circuit and second line of sight control circuit, the line of sight mode selector selecting said first line of sight control circuit while said camera function setting circuit operates.

58. A method of operating a cameras comprising:

detecting line of sight positions of a photographer;

judging whether or not the photographer is eye-gazing at a particular finite area to be photographed based on a plurality of detected line of sight positions;

determining line of sight information for controlling the camera based on the line of sight of the photographer; and controlling said line of sight information determining so as to set a detected line of sight position as said line of sight information before eye-gazing is judged, and to fix said line of sight information to a line of sight position at the time of judgment of the eye-gazing after eye-gazing is judged.

59. A method of operating a camera, comprising:

detecting line of sight positions of a photographer;

judging whether or not the photographer is eye-gazing at a particular finite area to be photographed based on a plurality of detected line of sight positions;

determining line of sight information for controlling the camera based on the line of sight of the photographer;

controlling said line of sight information determining, in a first control mode, so as to set a detected line of sight position as said line of sight information; and controlling said line of sight information determining, in a second control mode, so as to set a detected line of sight position as said line of sight information before eye-gazing is judged, and to fix said line of sight information to a line of sight position at the time of judgment of the eye-gazing after eye-gazing is judged.

60. A method according to claim 59, further comprising: selecting one of said first and second modes.

61. A method according to claim 60, further comprising:

detecting in-focus or out-of-focus of a focus detecting region which is a portion of a phototaking field formed by a phototaking lens provided on said camera;

providing focus control of said phototaking lens in an AF single mode in which once said focus detecting detects in-focus of the phototaking lens, further focus control of the phototaking lens is prohibited, and in an AF continuous mode in which the phototaking lens is always focus-controlled by said focus detecting; and selecting said second control mode when said AF single mode is selected and selecting said first control mode when said AF continuous mode is selected.

62. A method according to claim 61, further comprising:

judging whether or not an object to be photographed is a moving body;

wherein said first control mode is selected when it is judged that the object to be photographed is a moving body.

63. A method of operating a camera, comprising:

detecting line of sight positions of a photographer;

judging whether or not the photographer is eye-gazing at a particular finite area in a portion of a view field to be photographed, at least for a predetermined finite period of time, based on a plurality of detected line of sight positions;

determining line of sight information for controlling the camera based on the line of sight of the photographer; and controlling said line of sight information determining so as to set a detected line of sight position as said line of sight information before eye-gazing is judged, and to fix said line of sight information after eye-gazing is judged until eye-gazing is judged the next time.

64. A method of operating a camera, comprising:

detecting line of sight positions of a photographer;

judging whether or not the photographer is eye-gazing at a particular finite area in a portion of a view field to be photographed, at least for a predetermined finite period of time, based on a plurality of detected line of sight positions;

determining line of sight information for controlling the camera based on the line of sight of the photographer;

controlling said line of sight information determining, in a first control mode, so as to set a detected line of sight position as said line of sight information;

controlling said line of sight information determining, in a second control mode, so as to set a detected line of sight position as said line of sight information before eye-gazing is judged, and to fix said line of sight information to a line of sight position at the time of judgment of the eye-gazing after eye-gazing is judged;

controlling said line of sight information determining, in a third control mode, so as to set a detected line of sight position as said line of sight information before eye-gazing is judged, and to fix said line of sight information after eye-gazing is judged until eye-gazing is judged the next time; and selecting one of said first, second and third control modes.

65. A method of operating a camera, comprising:

detecting line of sight positions of a photographer;

judging whether or not the photographer is eye-gazing at a particular finite area in a portion of a view field to be photographed, at least for a predetermined finite period of time, based on a plurality of detected line of sight positions;

determining line of sight information for controlling the camera based on the line of sight of the photographer;

controlling said line of sight information determining, in a first control mode, so as to set a detected line of sight position as said line of sight information;

controlling said line of sight information determining, in a second control mode, so as to set a detected line of sight position as said line of sight information before eye-gazing is judged, and to fix said line of sight information to a line of sight position at the time of judgment of the eye-gazing after eye-gazing is judged;

rendering a function of the camera able to be set by said line of sight detecting, in response to a manual operation; and selecting one of said first and second control modes, said first control mode being selected in response to said manual operation.

* * * * *